(12) United States Patent
Lee et al.

(10) Patent No.: US 12,461,624 B2
(45) Date of Patent: Nov. 4, 2025

(54) DISPLAY DEVICE

(71) Applicant: SAMSUNG DISPLAY CO., LTD., Yongin-si (KR)

(72) Inventors: Jeong Yoon Lee, Yongin-si (KR); Ok Kyung Park, Yongin-si (KR); Young Seok Seo, Yongin-si (KR); Yu Jin Choe, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 55 days.

(21) Appl. No.: 18/143,132

(22) Filed: May 4, 2023

(65) Prior Publication Data

US 2024/0118765 A1    Apr. 11, 2024

(30) Foreign Application Priority Data

Oct. 7, 2022  (KR) ........................ 10-2022-0128542

(51) Int. Cl.
| | | |
|---|---|---|
| *G06F 3/041* | (2006.01) | |
| *G06F 3/042* | (2006.01) | |
| *H10K 59/40* | (2023.01) | |
| *H10K 59/80* | (2023.01) | |
| *H10K 59/88* | (2023.01) | |

(52) U.S. Cl.
CPC ........ *G06F 3/04164* (2019.05); *G06F 3/0412* (2013.01); *G06F 3/0421* (2013.01); *H10K 59/40* (2023.02); *H10K 59/873* (2023.02); *H10K 59/88* (2023.02)

(58) Field of Classification Search
None
See application file for complete search history.

(56) References Cited

U.S. PATENT DOCUMENTS

2018/0329555 A1*  11/2018  Kim ...................... G06F 3/0418
2021/0333942 A1*  10/2021  Zhang .................. G06F 3/0445

FOREIGN PATENT DOCUMENTS

| KR | 10-2021-0106039 | 8/2021 |
| KR | 10-2021-0109694 | 9/2021 |
| KR | 10-2022-0005246 | 1/2022 |

* cited by examiner

*Primary Examiner* — Ifedayo B Iluyomade
(74) *Attorney, Agent, or Firm* — F. CHAU & ASSOCIATES, LLC

(57) ABSTRACT

A display device includes: a substrate; a light emitting element layer disposed on the substrate; and a sensor electrode layer disposed on an encapsulation layer and including: a plurality of first touch electrode groups extending along a first direction; a plurality of first touch electrodes, of the plurality of first touch electrode groups, arranged along the first direction; a plurality of second touch electrode groups extending along the second direction and arranged along the first direction; a first contact electrode connected to any one of the plurality of first touch electrodes of any one of the plurality of first touch electrode groups; and a second contact electrode connected to any one of the plurality of first touch electrodes of another of the plurality of first touch electrode groups, and wherein an area of the first contact electrode is greater than an area of the second contact electrode.

22 Claims, 34 Drawing Sheets

DISPLAY DEVICE

CROSS-REFERENCE TO RELATED APPLICATION

This application claims priority under 35 U.S.C. § 119 to Korean Patent Application No. 10-2022-0128542 filed on Oct. 7, 2022 in the Korean Intellectual Property Office, the disclosure of which is incorporated by reference herein in its entirety.

TECHNICAL FIELD

The present invention relates to a display device.

DISCUSSION OF THE RELATED ART

Display devices may be classified as liquid crystal displays (LCDs), organic light emitting diode (OLED) displays, plasma display panels (PDPs), and electrophoretic displays, and the like, according to driving methods of display panels of the display devices.

Generally, a sensing unit is a type of information input device, and may be provided and used in the display device. A touch sensor may be attached to a display panel of the display device or may be manufactured to be integrated with the display panel. A user may input information by pressing or touching the sensing unit while viewing an image displayed on a screen of the display device.

SUMMARY

According to an embodiment of the present invention, a display device includes: a substrate; a light emitting element layer disposed on the substrate and including light emitting elements; an encapsulation layer disposed on the light emitting element layer; and a sensor electrode layer disposed on the encapsulation layer, wherein the sensor electrode layer includes: a plurality of first touch electrode groups extending along a first direction and arranged along a second direction crossing the first direction; a plurality of first touch electrodes, of each of the plurality of first touch electrode groups, arranged along the first direction; a plurality of second touch electrode groups extending along the second direction and arranged along the first direction; a first contact electrode connected to any one of the plurality of first touch electrodes of any one of the plurality of first touch electrode groups; and a second contact electrode connected to any one of the plurality of first touch electrodes of another of the plurality of first touch electrode groups, and wherein an area of the first contact electrode is greater than an area of the second contact electrode.

In an embodiment of the present invention, the sensor electrode layer further includes: a first connection line connected to the first contact electrode; and a second connection line connected to the second contact electrode, the sensor electrode layer has a sensing area and a peripheral area at least partially surrounding the sensing area, wherein each of the sensing area, the first connection line and the second connection line extend along the second direction, and wherein a length of the first connection line in the second direction is greater than a length of the second connection line in the second direction.

In an embodiment of the present invention, each the first contact electrode and the second contact electrode are disposed at a different layer from the first touch electrode and the second touch electrode, and each of the first contact electrode and the second contact electrode are disposed at the same layer as the first connection line and the second connection line.

In an embodiment of the present invention, the sensor electrode layer further includes: a plurality of dummy electrodes positioned at the same layer as the plurality of first touch electrodes, and a plurality of second touch electrodes included in each of the plurality of second touch electrode groups, wherein each of the plurality of first touch electrodes includes a first opening, each of the plurality of second touch electrodes includes a second opening, the plurality of dummy electrodes are positioned in the first opening and the second opening, respectively, and the plurality of dummy electrodes overlap the first contact electrode and the second contact electrode.

In an embodiment of the present invention, the first contact electrode includes a first electrode opening and a first contact electrode part surrounding the first electrode opening, the second contact electrode includes a second electrode opening and a second contact electrode part surrounding the second electrode opening, and an area of the first contact electrode part is greater than an area of the second contact electrode part.

In an embodiment of the present invention, the plurality of dummy electrodes overlap each of the first electrode opening and the second electrode opening, and the plurality of dummy electrodes do not overlap each of the first contact electrode part and the second contact electrode part.

According to an embodiment of the present invention, a display device includes: a substrate; a light emitting element layer disposed on the substrate and including light emitting elements; an encapsulation layer disposed on the light emitting element layer; and a sensor electrode layer disposed on the encapsulation layer, wherein the sensor electrode layer includes: a plurality of first touch electrodes extending along a first direction and arranged along a second direction crossing the first direction; a plurality of second touch electrodes extending along the second direction and arranged along the first direction, first dummy electrodes positioned in the plurality of first touch electrodes and the plurality of second touch electrodes; a contact electrode connected to any one of the plurality of first touch electrodes; a second dummy electrode positioned in any one first touch electrodes, and having an area different from that of the first dummy electrodes, wherein the second dummy electrode overlaps the contact electrode, and is surrounded by the first dummy electrodes; a first touch electrode part surrounding the first dummy electrode in any one first touch electrodes; a second touch electrode part surrounding the first dummy electrodes in the other first touch electrodes; and a third touch electrode part surrounding the first dummy electrodes in the second touch electrodes.

In an embodiment of the present invention, the sensor electrode layer has a sensing area and a peripheral area at least partially surrounding the sensing area, wherein the sensor electrode layer further includes: a connection line connected to the contact electrode in the sensing area and extending in the second direction; and a dummy pattern disposed on the connection line in the sensing area, and the dummy pattern is disposed in the second direction and includes an island shape.

In an embodiment of the present invention, a width of the first touch electrode part is greater than each of a width of the second touch electrode part and a width of the third touch electrode part.

In an embodiment of the present invention, the sensor electrode layer further includes the second dummy electrode positioned in the other first touch electrodes and surrounded by the first dummy electrodes, wherein a width of the first touch electrode part and a width of the second touch electrode part are the same as each other, and wherein the width of the first touch electrode part and the width of the second touch electrode part are greater than a width of the third touch electrode part.

According to an embodiment of the present invention, a display device includes: a substrate; a light emitting element layer disposed on the substrate and including light emitting elements; an encapsulation layer disposed on the light emitting element layer; and a sensor electrode layer disposed on the encapsulation layer and having a sensing area and a peripheral area surrounding the sensing area, wherein the sensor electrode layer includes: a plurality of first touch electrode groups extending along a first direction and arranged along a second direction crossing the first direction; a plurality of first touch electrodes, of each of the plurality of first touch electrode groups, arranged along the first direction; a plurality of second touch electrode groups extending along the second direction and arranged along the first direction; a first contact electrode connected to any one of the plurality of first touch electrodes of any one of the plurality of first touch electrode groups; a second contact electrode connected to any one of the plurality of first touch electrodes of another of the plurality of first touch electrode groups; a first connection line connected to the first contact electrode in the sensing area; and a second connection line connected to the second contact electrode in the sensing area, wherein an area of the first contact electrode is the same as an area of the second contact electrode.

In an embodiment of the present invention, a width of the first connection line is greater than a width of the second connection line.

In an embodiment of the present invention, the first connection line includes a plurality of first protrusion parts, wherein the second connection line includes a plurality of second protrusion parts, and wherein a number of first protrusion parts of the first connection line is greater than a number of second protrusion parts of the second connection line.

In an embodiment of the present invention, the first connection line includes a plurality of first protrusion parts, wherein the second connection line includes a plurality of second protrusion parts, wherein a number of first protrusion parts and a number of second protrusion parts are the same as each other, and wherein an area of each of the first protrusion parts is greater than an area of each of the second protrusion parts.

In an embodiment of the present invention, the first connection line extends in the second direction, and the second connection line includes: a plurality of first sub-connection lines extending in the second direction; a plurality of second sub-connection lines extending from ends of the first sub-connection lines in a third direction that is a diagonal direction crossing the first direction and the second direction; and a plurality of third sub-connection lines extending from ends of the second sub-connection lines in a fourth direction orthogonal to the third direction.

In an embodiment of the present invention, the plurality of second sub-connection lines and the plurality of third sub-connection lines cross each other.

In an embodiment of the present invention, a length of the first connection line and a length of the second connection line are the same as each other.

In an embodiment of the present invention, the second connection line includes: a first sub-connection line extending in one direction of the second direction; a second sub-connection line extending in the second direction and connected to the second contact electrode; and a third sub-connection line connecting the first sub-connection line and the second sub-connection line to each other, wherein a first length at which the first sub-connection line of the second connection line and the second sub-connection line of the second connection line overlap each other in the second direction is the same as a difference between the length of the first connection line and a length of the first sub-connection line of the second connection line.

In an embodiment of the present invention, the sensor electrode layer further includes: a third contact electrode connected to any one of the plurality of first touch electrodes of another of the plurality of first touch electrode groups; and a third connection line connected to the third contact electrode and extending along the second direction, wherein the third connection line includes: a first sub-connection line extending in the one direction of the second direction; a second sub-connection line extending in the second direction and connected to the third contact electrode; and a third sub-connection line connecting the first sub-connection line and the second sub-connection line to each other, wherein a difference between the first length and a second length at which the first sub-connection line of the third connection line and the second sub-connection line of the third connection line overlap each other in the second direction is the same as the difference between the length of the first connection line and the length of the first sub-connection line of the second connection line, and wherein a length of the third connection line is a same as the length of the second connection line.

In an embodiment of the present invention, the sensor electrode layer further includes a plurality of dummy electrodes positioned at a same layer as the plurality of first touch electrodes, wherein the first connection line includes: a first sub-connection line extending in the second direction; a second sub-connection line connected to an end of the first sub-connection line and bypassing the first touch electrode connected to the first contact electrode; and a third sub-connection line having one end connected to the second sub-connection line and the other end connected to the first contact electrode, wherein the third sub-connection line includes: a first portion connected to an end of the second sub-connection line and extending in the second direction; a second portion connected to an end of the first portion and extending along a third direction that is a diagonal direction crossing the first direction and the second direction; a third portion connected to an end of the second portion and extending along the first direction; a fourth portion connected to an end of the third portion and extending along a fourth direction orthogonal to the third direction; and a fifth portion extending in the second direction and having one end connected to an end of the fourth portion and the other end connected to the first contact electrode.

In an embodiment of the present invention, the second connection line includes: a first sub-connection line extending in the second direction; a second sub-connection line connected to an end of the first sub-connection line and bypassing the first touch electrode connected to the second contact electrode; and a third sub-connection line having one end connected to the second sub-connection line and the other end connected to the second contact electrode, wherein the third sub-connection line includes: a first portion connected to an end of the second sub-connection line and extending in the second direction; a second portion connected to an end of the first portion and surrounding a side of any one of the plurality of dummy electrodes disposed in the same column as the first touch electrode connected to the second contact electrode; and a third portion extending toward the second direction and having one end connected to an end of the second portion and the other end connected to the second contact electrode.

In an embodiment of the present invention, the plurality of dummy electrodes include: a first dummy electrode adjacent to the first touch electrode connected to the first contact electrode, in the second direction; and a second dummy electrode disposed to be spaced apart from the first touch electrode connected to the first contact electrode, in the second direction with the first dummy electrode interposed therebetween, wherein the first portion of the third sub-connection line overlaps the first dummy electrode, wherein the second portion, the third portion, and the fourth portion of the third sub-connection line overlap the second dummy electrode, and wherein the fifth portion of the third sub-connection line overlaps the first dummy electrode, and is disposed to be spaced apart from the first portion of the third sub-connection line in the first direction.

In an embodiment of the present invention, the sensor electrode layer further includes a first dummy line and a second dummy line disposed in the sensing area, wherein the first dummy line includes: a first sub-dummy line disposed to be symmetrical to the first sub-connection line of the first connection line in the first direction; a second sub-dummy line disposed to be symmetrical to the second sub-connection line of the first connection line in the first direction; and a third sub-dummy line disposed to be symmetrical to the third sub-connection line of the first connection line in the one direction of the second direction, and wherein the second dummy line includes: a first sub-dummy line disposed to be symmetrical to the first sub-connection line of the second connection line in the first direction; a second sub-dummy line disposed to be symmetrical to the second sub-connection line of the second connection line in the first direction; and a third sub-dummy line disposed to be symmetrical to the third sub-connection line of the second connection line in the one direction of the second direction.

BRIEF DESCRIPTION OF THE DRAWINGS

The above and other features of the present invention will become more apparent by describing in detail embodiments thereof with reference to the attached drawings, in which.

DETAILED DESCRIPTION OF THE EMBODIMENTS

The embodiments of the present invention will now be described more fully hereinafter with reference to the accompanying drawings. This invention may, however, be embodied in different forms and should not be construed as limited to the embodiments set forth herein. The same reference numbers indicate the same components throughout the specification and the drawings. In the attached drawings, various thicknesses, lengths, and angles are shown and while the arrangement shown does indeed represent an embodiment of the present invention, it is to be understood that modifications of the various thicknesses, lengths, and angles may be possible within the spirit and scope of the present invention and the present invention is not necessarily limited to the particular thicknesses, lengths, and angles shown.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the spirit and scope of the present invention.

Hereinafter, embodiments of the present invention will be described with reference to the accompanying drawings.

Figure 1:
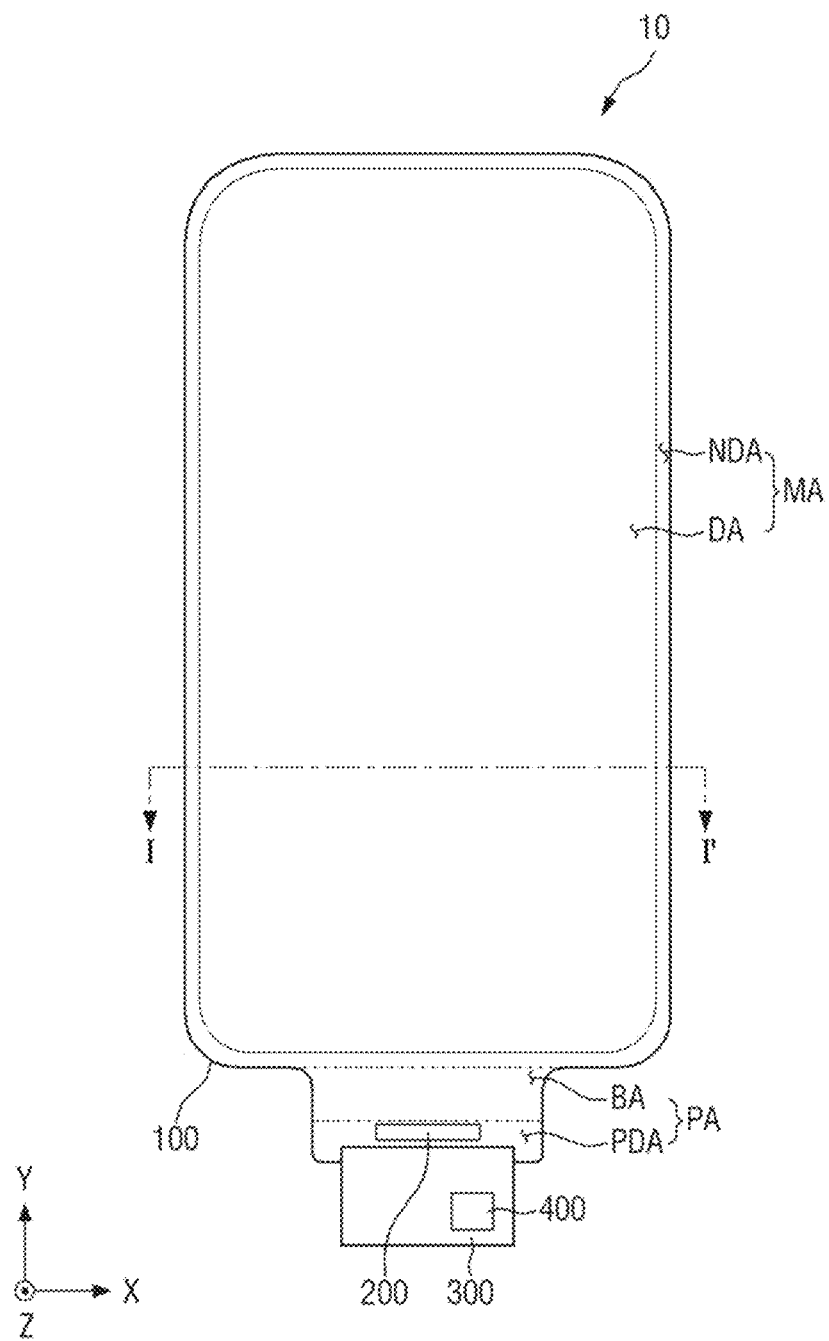
FIG. 1 is a schematic plan view of a display device according to an embodiment of the present invention.
Figure 2:
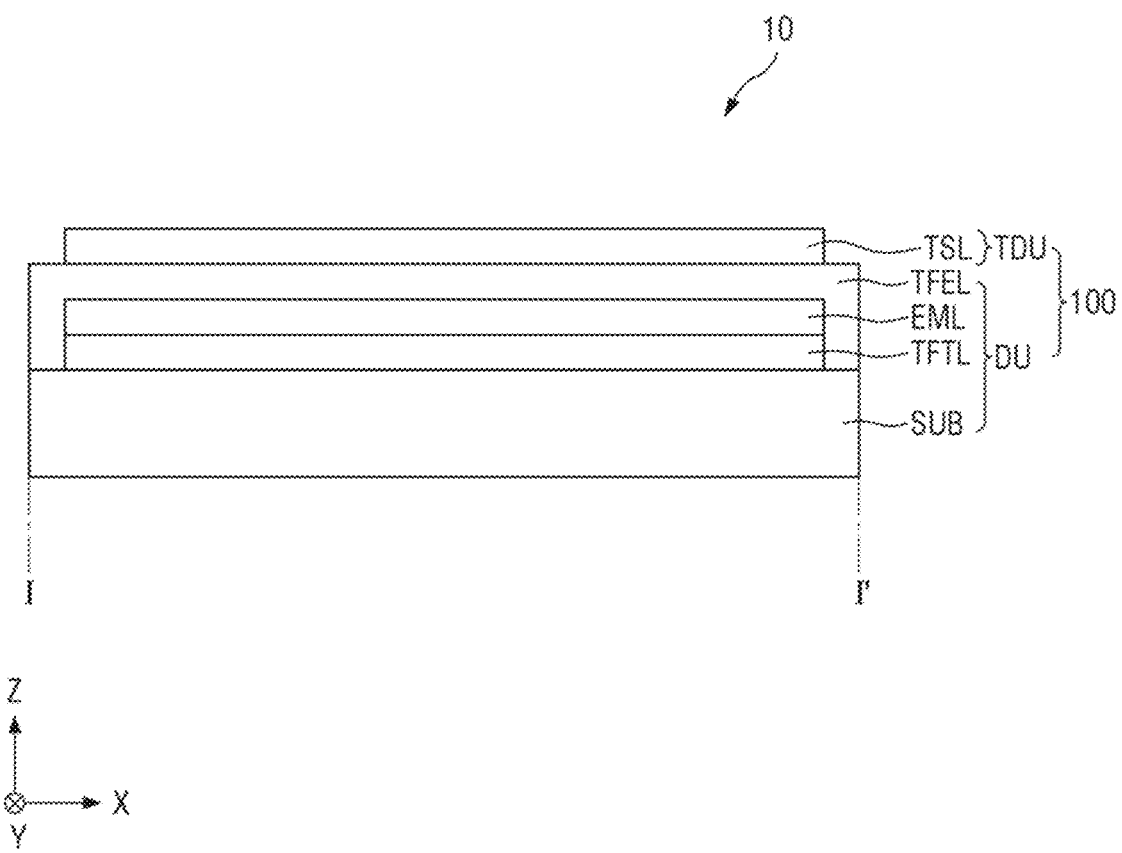
FIG. 2 is a schematic cross-sectional view taken along line I-I' of FIG. 1.

FIG. 1 is a plan view of a display device according to an embodiment of the present invention. FIG. 2 is a schematic cross-sectional view taken along line I-I' of FIG. 1.

The terms "above", "top", and "upper surface" as used herein refer to an upward direction (i.e., a Z-axis direction) with respect to a display panel 100. The terms "below", "bottom", and "lower surface" as used herein refer to a downward direction (i.e., a direction opposite to the Z-axis direction) with respect to the display panel 100. In addition, "left", "right", "upper", and "lower" refer to directions when the display panel 100 is viewed in plan view. For example, "left" refers to a direction opposite to an X-axis direction (e.g., a negative X-axis direction), "right" refers to the X-axis direction (e.g., a positive X-axis direction), "upper" refers to a Y-axis direction (e.g., a positive Y-axis direction), and "lower" refers to a direction opposite to the Y-axis direction (e.g., a negative Y-axis direction).

Referring to FIGS. 1 and 2, a display device 10 is a device that displays a moving image or a still image, and may be used as a display screen of various products such as televisions, laptop computers, monitors, billboards, and the Internet of Things (IOT) as well as portable electronic devices such as mobile phones, smartphones, tablet personal computers (PCs), smart watches, watch phones, mobile communication terminals, electronic notebooks, electronic books, portable multimedia players (PMPs), navigation devices, and ultra mobile PCs (UMPCs). For example, the display device 10 may be any one of an organic light emitting diode display, a liquid crystal display, a plasma display panel, a field emission display, an electrophoretic display, an electrowetting display, a quantum dot light emitting display, and a micro light emitting diode (LED) display. Hereinafter, it will be mainly described that the display device 10 is an organic light emitting diode display, as an example.

The display device 10 according to an embodiment of the present invention may include a display panel 100, a display driving circuit 200, a circuit board 300, and a touch driving circuit 400.

The display panel 100 may include a main area MA and a protrusion area PA protruding from one side of the main area MA.

In an embodiment of the present invention, the main area MA may be formed in a rectangular shape, in plan view, having short sides in a first direction (X-axis direction) and long sides in a second direction (Y-axis direction) crossing the first direction (X-axis direction). A corner where the short side in the first direction (X-axis direction) and the long side in the second direction (Y-axis direction) meet may be rounded with a predetermined curvature or right-angled. However, the shape of the display device 10 in plan view is not limited to the rectangular shape, and in some embodiments of the present invention, the display device 10 may have other polygonal shapes, a circular shape, or an elliptical shape in plan view.

In addition, the main area MA may be formed to be flat, but the present invention is not limited thereto, and may include curved surface portions formed at left and right ends thereof in some embodiments of the present invention. In an embodiment of the present invention, the main area MA may include curved surface portion at upper and lower ends thereof. When the main area MA includes the curved surface portions, the curved surfaces portion may have a constant curvature or a changing curvature.

The main area MA may include a display area DA in which pixels are formed to display an image, and a non-display area NDA, which is a peripheral area of the display area DA.

Scan lines, data lines, and power lines connected to the pixels as well as the pixels may be disposed in the display area DA. When the main area MA includes the curved surface portions, the display area DA may be disposed on the curved surface portions. When the display area DA is disposed on the curved surface portions, an image of the display panel 100 may be viewed even on the curved surface portions.

The non-display area NDA may be an area between a boundary of the display area DA and an edge of the display panel 100. A scan driver for applying scan signals to the scan lines and link lines connecting the data lines and the display driving circuit 200 to each other may be disposed in the non-display area NDA.

The protrusion area PA may protrude from one side of the main area MA. For example, the protrusion area PA may protrude from a lower side of the main area MA as illustrated in FIG. 2. A length of the protrusion area PA in the first direction (X-axis direction) may be smaller than a length of the main area MA in the first direction (X-axis direction).

The protrusion area PA may include a bending area BA and a pad area PDA. The pad area PDA may be disposed on one side of the bending area BA, and the main area MA may be disposed on the other side of the bending area BA. For example, the pad area PDA may be disposed on the lower side of the bending area BA, and the main area MA may be disposed on the upper side of the bending area BA. For example, the bending area BA may be disposed between the main area MA and the pad area PDA.

The display panel 100 may be flexibly formed to be bent, folded, or rolled. Therefore, the display panel 100 may be bent in a thickness direction (Z-axis direction) in the bending area BA. When the display panel 100 is bent in the thickness direction (Z-axis direction), one surface of the pad area PDA of the display panel 100 faces downward. Accordingly, the pad area PDA is disposed below the main area MA, and may thus overlap the main area MA.

Pads electrically connected to the display driving circuit 200 and the circuit board 300 may be disposed in the pad area PDA of the display panel 100.

The display driving circuit 200 outputs signals and voltages for driving the display panel 100. For example, the display driving circuit 200 may supply data voltages to the data lines. In addition, the display driving circuit 200 may supply source voltages to the power lines, and may supply scan control signals to the scan driver. The display driving circuit 200 may be formed as an integrated circuit (IC) and mounted on the display panel 100 in the pad area PDA in a chip on glass (COG) manner, a chip on plastic (COP) manner, or an ultrasonic bonding manner, but the present invention is not limited thereto. For example, the display driving circuit 200 may be mounted on the circuit board 300.

The pads may include display pads electrically connected to the display driving circuit 200 and sensing pads electrically connected to connection lines.

The circuit board 300 may be attached onto the pads using an anisotropic conductive film (ACF). Accordingly, lead lines of the circuit board 300 may be electrically connected to the pads. The circuit board 300 may be a flexible printed circuit board, a printed circuit board, or a flexible film such as a chip on film.

The touch driving circuit 400 may be connected to sensing electrodes of a sensing layer TSL of the display panel 100 to be described later. The touch driving circuit 400 applies driving signals to the sensing electrodes of the sensing layer TSL and measures mutual capacitance values of the sensing electrodes. The driving signal may be a signal having a plurality of driving pulses. The touch driving circuit 400 may decide whether or not a user has performed a touch and whether or not the user has approached the display device according to the mutual capacitance values. The touch of the user indicates that a user's finger or an object such as a pen comes into direct contact with one surface of the display device 10 that is disposed on the sensing layer TSL. The approach of the user indicates that the user's finger or the object such as the pen that hovers above one surface of the cover window.

A touch driving circuit 400 may be disposed on the circuit board 300. The touch driving circuit 400 may be formed as an integrated circuit (IC) and mounted on the circuit board 300.

The display panel 100 may include a display unit DU including a substrate SUB and a thin film transistor layer TFTL, a light emitting element layer EML, and a thin film encapsulation layer TFEL that are disposed on the substrate SUB, and a sensing unit TDU having a sensing layer TSL.

The substrate SUB may be made of an insulating material such as glass, quartz, or a polymer resin. Examples of the polymer resin may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or combinations thereof. In addition, the substrate SUB may include a metal material.

The substrate SUB may be a rigid substrate or be a flexible substrate that may be bent, folded, and rolled. When the substrate SUB is the flexible substrate, the substrate SUB may be made of polyimide PI, but the present invention is not limited thereto.

Figure 3:
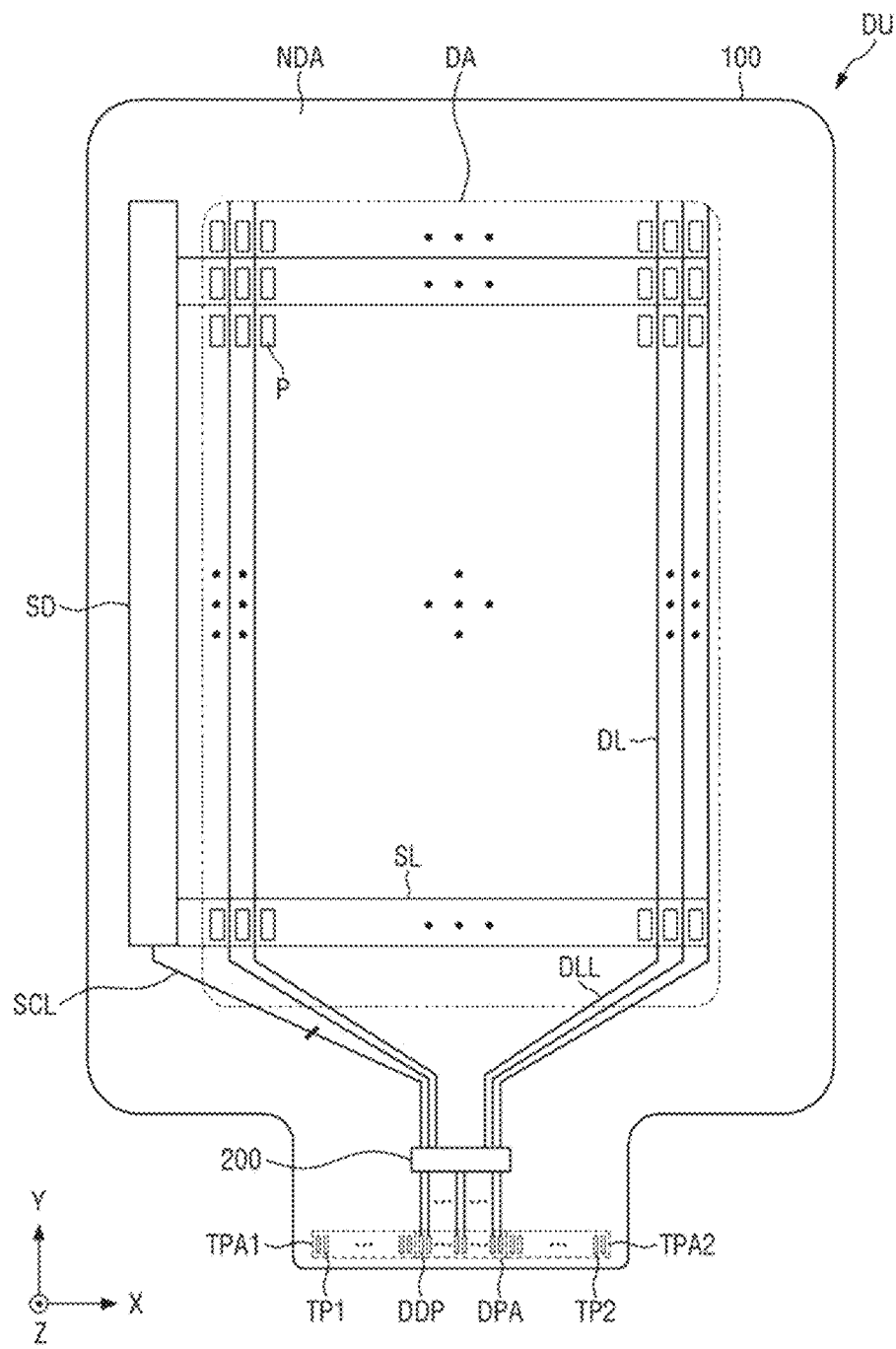
FIG. 3 is a plan view illustrating components related to a display unit of FIG. 2.

The thin film transistor layer TFTL may be disposed on the substrate SUB. The scan lines, the data lines, the power lines, scan control lines, routing lines connecting the pads and the data lines to each other, and the like, as well as thin film transistors of each of the pixels may be disposed in the thin film transistor layer TFTL. Each of the thin film transistors may include a gate electrode, a semiconductor layer, a source electrode, and a drain electrode. When the scan driver SD is formed in the non-display area NDA of the display panel 100 as illustrated in FIG. 3, the scan driver SD may include thin film transistors.

The thin film transistor layer TFTL may be disposed in the display area DA and the non-display area NDA. For example, the thin film transistors of each of the pixels, the scan lines, the data lines, and the power lines of the thin film transistor layer TFTL may be disposed in the display area DA. The scan control lines and the link lines of the thin film transistor layer TFTL may be disposed in the non-display area NDA. A detailed description of the thin film transistor layer TFTL will be provided later.

The light emitting element layer EML may be disposed on the thin film transistor layer TFTL. The light emitting element layer EML may include pixels each including a first electrode, a light emitting layer, and a second electrode, and a pixel defining film defining the pixels. For example, the light emitting layer may be an organic light emitting layer including an organic material. In this case, the light emitting layer may include a hole transporting layer, an organic light emitting layer, and an electron transporting layer. When a predetermined voltage is applied to the first electrode through the thin film transistor of the thin film transistor layer TFTL and when a cathode voltage is applied to the second electrode, holes and electrons move to the organic light emitting layer through the hole transporting layer and the electron transporting layer, respectively, and are combined with each other in the organic light emitting layer to emit light. The pixels of the light emitting element layer EML may be disposed in the display area DA. A detailed description of the light emitting element layer EML will be provided later.

The thin film encapsulation layer TFEL may be disposed on the light emitting element layer EML. The thin film encapsulation layer TFEL may prevent oxygen or moisture from penetrating into the light emitting element layer EML. To this end, the thin film encapsulation layer TFEL may include at least one inorganic film.

For example, the inorganic film may be a silicon nitride layer, a silicon oxynitride layer, a silicon oxide layer, a titanium oxide layer, or an aluminum oxide layer, but the present invention is not limited thereto.

In addition, the thin film encapsulation layer TFEL may protect the light emitting element layer EML from foreign substances such as dust. To this end, the thin film encapsulation layer TFEL may include at least one organic film. The organic film may be made of, for example, an acrylic resin, an epoxy resin, a phenolic resin, a polyamide resin, or a polyimide resin, but the present invention is not limited thereto.

The thin film encapsulation layer TFEL may be disposed in both the display area DA and the non-display area NDA. For example, the thin film encapsulation layer TFEL may be disposed to cover the light emitting element layer EML of the display area DA and the non-display area NDA and cover the thin film transistor layer TFTL of the non-display area NDA. A detailed description of the thin film encapsulation layer TFEL will be provided later.

The sensing layer TSL may be disposed on the thin film encapsulation layer TFEL. For example, the sensing layer TSL may be disposed directly on the thin film encapsulation layer TFEL. Since the sensing layer TSL is disposed on the thin film encapsulation layer TFEL, the thickness of the display device 10 may be reduced as compared with a case where a separate touch panel including the sensing layer TSL is attached onto the thin film encapsulation layer TFEL.

Figure 4:
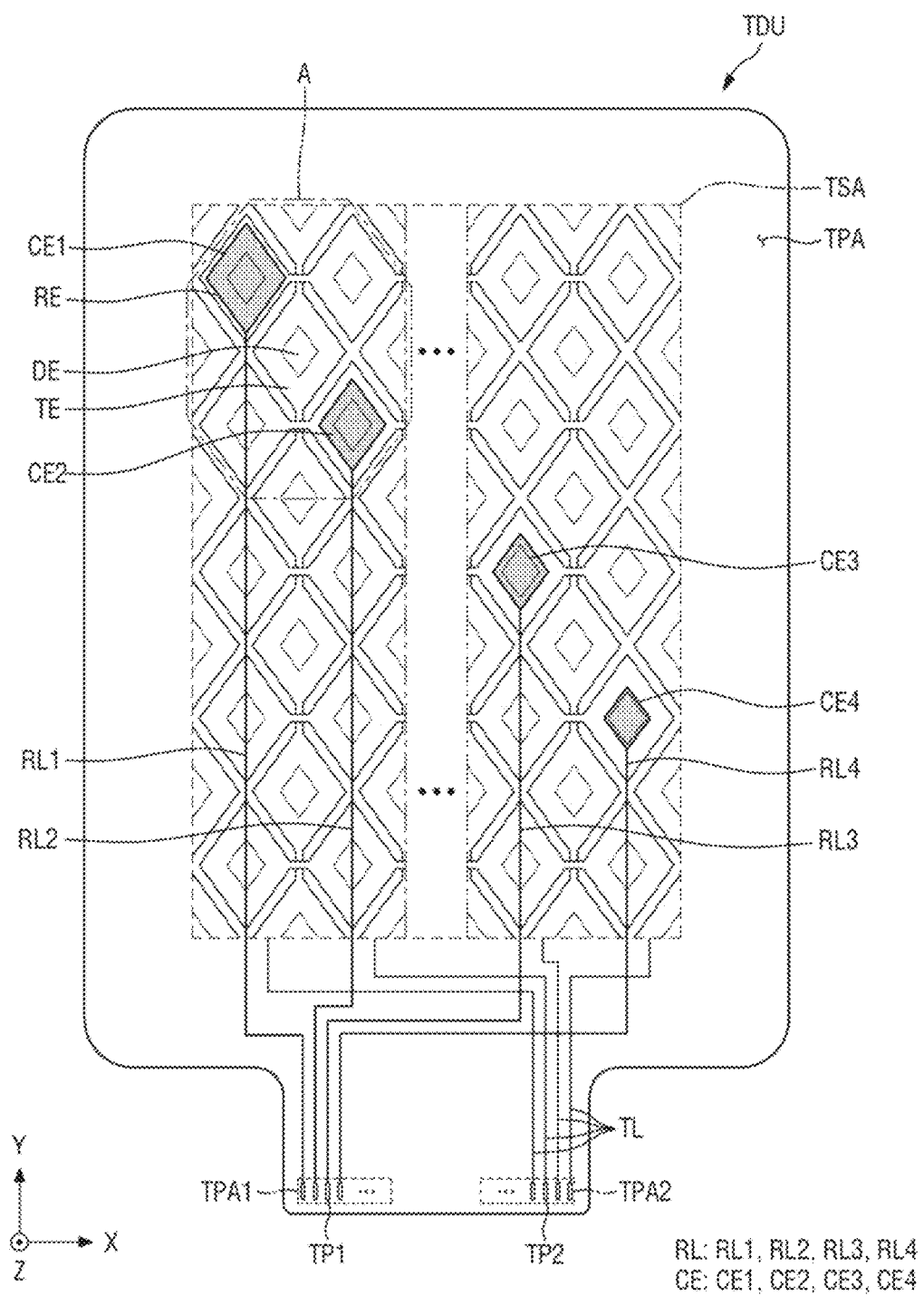
FIG. 4 is a plan view illustrating components related to a sensing unit of FIG. 2.

The sensing layer TSL may include touch electrodes for sensing a touch of the user in a mutual capacitance manner and connection lines connecting the pads and the touch electrodes. The sensing electrodes of the sensing layer TSL may be disposed in a sensing area TSA overlapping the display area DA as illustrated in FIG. 4. The connection lines of the sensing layer TSL may be disposed to partially overlap the sensing area TSA as illustrated in FIG. 4. Accordingly, the non-display area NDA of the display device 10 may be minimized, and accordingly, a bezel area of the display device 10 may be decreased. A detailed description thereof will be provided later.

For example, a polarizing film may be disposed on the sensing layer TSL. The polarizing film may include a linear polarizing plate and a phase retardation film such as a λ/4 plate (quarter-wave plate). In this case, the phase retardation film may be disposed on the sensing layer TSL, and the linear polarizing plate may be disposed on the phase retardation film. In addition, a cover window may be disposed on the polarizing film. The cover window may be attached onto the polarizing film by a transparent adhesive member such as an optically clear adhesive (OCA) film.

FIG. 3 is a plan view illustrating components related to a display unit of FIG. 2.

In FIG. 3, for convenience of explanation, only pixels P, scan lines SL, data lines DL, scan control lines SCL, fan-out lines DLL, a scan driver SD, the display driving circuit 200, display pads DDP, and sensing pads TP1 and TP2 of the display unit DU have been illustrated.

Referring to FIG. 3, the scan lines SL, the data lines DL, and the pixels P are disposed in the display area DA. The scan lines SL may be formed in parallel with each other in the first direction (X-axis direction), and the data lines DL may be formed in parallel with each other in the second direction (Y-axis direction) that crosses the first direction (X-axis direction).

Each of the pixels P may be connected to at least one of the scan lines SL and any one of the data lines DL. Each of the pixels P may include thin film transistors including a driving transistor and at least one switching transistor, a light emitting element, and a capacitor.

Each of the pixels P may receive a data voltage through the data line DL when a scan signal is applied through the scan line SL. In addition, a driving current may be supplied to the light emitting element according to the data voltage that is applied to a gate electrode to emit light. It has been mainly described that the light emitting element is an organic light emitting element including an anode electrode, an organic light emitting layer, and a cathode electrode, but the present invention is not limited thereto.

For example, the light emitting element may be implemented as a quantum dot light emitting element including an anode electrode, a quantum dot light emitting layer, and a cathode electrode. As an additional example, the light emitting element may be implemented as an inorganic light emitting element including an anode electrode, an inorganic light emitting layer having an inorganic semiconductor, and a cathode electrode. As another example, the light emitting element may be implemented as a micro light emitting element including a micro light emitting diode.

The scan driver SD is connected to the display driving circuit 200 through a plurality of scan control lines SCL. The scan driver SD may receive scan control signals of the display driving circuit 200. The scan driver SD generates scan signals according to the scan control signals and supplies the scan signals to the scan lines SL.

It has been illustrated in FIG. 3 that the scan driver SD is formed in the non-display area NDA on the left outer side of the display area DA, but the present invention is not limited thereto. For example, the scan drivers SD may be disposed in the non-display areas NDA on the left outer side and the right outer side of the display area DA.

The display driving circuit 200 is connected to the display pads DDP to receive digital video data and timing signals. The display driving circuit 200 converts the digital video data into analog positive/negative data voltages and supplies the analog positive/negative data voltages to the data lines DL through the fan-out lines DLL. In addition, the display driving circuit 200 generates and supplies the scan control signals for controlling the scan driver SD through the plurality of scan control lines SCL.

Pixels P, to which the data voltages are to be supplied, are selected by the scan signals of the scan driver SD, and the data voltages are supplied to the selected pixels P. The display driving circuit 200 may be formed as an integrated circuit (IC) and mounted on the substrate SUB in a chip on glass (COG) manner, a chip on plastic (COP) manner, or an ultrasonic bonding manner, but the present invention is not limited thereto. For example, the display driving circuit 200 may be mounted on the circuit board 300.

The display panel 100 may include the display pads DDP, which are electrically connected to the display driving circuit 200, and the sensing pads TP1 and TP2, which are electrically connected to sensing lines. A display pad area DPA in which the display pads DDP are disposed may be disposed between a first sensing pad area TPA1, in which first sensing pads TP1 are disposed, and a second sensing pad area TPA2, in which second sensing pads TP2 are disposed. For example, the display pad area DPA may be disposed at the center of one end of the protrusion area. For example, the first sensing pad area TPA1 may be disposed on the left side of one end of the protrusion area, and the second sensing pad area TPA2 may be disposed on the right side of one end of the protrusion area PA.

The circuit board 300 may be attached onto the display pads DDP and the sensing pads TP1 and TP2 using an anisotropic conductive film. Accordingly, the lead lines of the circuit board 300 may be electrically connected to the display pads DDP and the sensing pads TP1 and TP2.

The circuit board 300 may be a flexible printed circuit board, a printed circuit board, or a flexible film such as a chip on film.

The touch driving circuit 400 may be connected to the sensing electrodes of the sensing unit of the display panel 100. The touch driving circuit 400 applies driving signals to the sensing electrodes and measures mutual capacitances of the sensing electrodes. The driving signal may be a signal having a plurality of driving pulses. The touch driving circuit 400 may calculate touch coordinates to which a touch is input according to the mutual capacitances.

The touch driving circuit 400 may be disposed on the circuit board 300. The touch driving circuit 400 may be formed as an integrated circuit (IC) and mounted on the circuit board 300.

FIG. 4 is a plan view illustrating components related to a sensing unit of FIG. 2.

In FIG. 4, for convenience of explanation, only touch electrodes RE and TE, dummy electrodes DE, contact electrodes CE, connection lines RL and TL, and touch pads TP1 and TP2 have been illustrated.

Referring to FIG. 4, the sensing unit TDU includes a sensing area TSA for sensing a touch of the user and a sensing peripheral area TPA disposed around the sensing area TSA. The sensing area TSA may overlap the display area DA of the display unit DU described above with reference to FIG. 3, and the sensing peripheral area TPA may overlap the non-display area NDA of the display unit DU.

The touch electrodes RE and TE may be disposed in the sensing area TSA. The touch electrodes RE and TE may include first touch electrodes RE and second touch electrodes TE. In FIG. 4, the first touch electrode RE may be a sensing electrode, and the second touch electrode TE may be a driving electrode. However, the present invention is not limited thereto. Hereinafter, it will be mainly described that the first touch electrode RE is a sensing electrode and that the second touch electrode TE is a driving electrode.

The first touch electrodes RE may be arranged in the first direction (X-axis direction) and in a plurality of rows. The first touch electrodes RE may be electrically connected to each other. The second touch electrodes TE may be arranged in the second direction (Y-axis direction) crossing the first direction (X-axis direction) and in a plurality of columns. The second touch electrodes TE may be electrically connected to each other. It has been illustrated in FIG. 4 that each of the first touch electrodes RE and the second touch electrodes TE has a rhombus shape in plan view, but a shape of each of the first touch electrodes RE and the second touch electrodes TE in plan view is not limited thereto.

The first touch electrodes RE may be electrically disconnected from and may be spaced apart from the second touch electrodes TE. For example, the first touch electrodes RE and the second touch electrodes TE may be disposed at the same layer and may be insulated from each other. A size of each of the first touch electrodes RE and a size of each of the second touch electrodes TE may be substantially the same as each other. However, the present invention is not limited thereto.

The dummy electrodes DE may be disposed at the same layer as the first touch electrodes RE and the second touch electrodes TE and may be electrically disconnected from each of the first touch electrodes RE and the second touch electrodes TE. For example, the dummy electrodes DE may be disposed to be spaced apart from the first touch electrodes RE and the second touch electrodes TE, and each of the dummy electrodes DE may electrically float with the first touch electrodes RE and the second touch electrodes TE.

The dummy electrodes DE may be disposed to be surrounded by each of the first touch electrodes RE and the second touch electrodes TE. Due to the dummy electrodes DE, a parasitic capacitance between the second electrodes of the light emitting element layer EML (see FIG. 2) and the first touch electrodes RE or the second touch electrodes TE may be decreased. When the parasitic capacitance is decreased, a charging rate, at which a mutual capacitance between the first touch electrode RE and the second touch electrode TE is charged, may be increased.

A plurality of contact electrodes CE may be disposed at a different layer from any one of the first touch electrodes RE disposed in each row and may be electrically connected to the first touch electrodes RE disposed in each row. For example each of the contact electrodes CE may be electrically connected to each of the first touch electrodes RE disposed in an n-th column of an n-th row. For example, as illustrated in FIG. 4, a first contact electrode CE1 may be electrically connected to a first touch electrode RE disposed in a first column of a first row. For example, a second contact electrode CE2 may be electrically connected to a first touch electrode RE disposed in a second column of a second row. For example, a third contact electrode CE3 may be electrically connected to a first touch electrode RE disposed in a third column of a third row, and a fourth contact electrode CE4 may be electrically connected to a first touch electrode RE disposed in a fourth column of a fourth row.

Each of the plurality of contact electrodes CE may have the same shape as each of the first touch electrodes RE and the second touch electrodes TE in plan view. For example, each of the plurality of contact electrodes CE may have a rhombus shape in plan view. However, the present invention is not limited thereto, and each of the contact electrodes CE may have a shape different from that of each of the first touch electrodes RE and the second touch electrodes TE in plan view.

For example, each of the contact electrodes CE may have a polygonal shape other than a rhombic shape or a shape including a curve in plan view. In addition, it has been illustrated in FIG. 4 that the plurality of contact electrodes CE have the same shape in plan view, but the present invention is not limited thereto, and in some embodiments of the present invention, the plurality of contact electrodes CE may have different shapes from each other in plan view.

The plurality of contact electrodes CE may have different areas in plan view. For example, an area of each of the contact electrodes CE in plan view may increase as each of the contact electrodes CE becomes more distant from first touch pads TP1 and second touch pads TP2 disposed in the sensing peripheral area TPA, in the second direction (Y-axis direction).

For example, the first contact electrode CE1 disposed to be electrically connected to the first touch electrode RE disposed in the first column of the first row may have the greatest area in plan view and may be furthest, among contact electrodes CE, from first touch pads TP1 and second touch pads TP2, and the fourth contact electrode CE4 disposed to be electrically connected to the first touch electrode RE disposed in the fourth column of the fourth row may have the smallest area in plan view and may be closest, among contact electrodes CE, from first touch pads TP1 and second touch pads TP2. For example, the first contact electrode CE1 may have an area greater than an area of the second contact electrode CE2 in plan view. For example, the second contact electrode CE2 may have an area greater than an area of the third contact electrode CE3 in plan view, and the third contact electrode CE3 may have an area greater than an area of the fourth contact electrode CE4 in plan view.

The connection lines RL and TL may include sensing connection lines RL, which are connected to the contact electrodes CE, and driving connection lines TL, which are connected to the second touch electrodes TE.

The sensing connection lines RL may be disposed at the same layer as the contact electrodes CE. one end of each of the sensing connection lines RL may be electrically connected to a corresponding contact electrode CE, and the other end of each of the sensing connection lines RL may be connected to a corresponding first touch pads TP1. The sensing connection lines RL may extend from the sensing peripheral area TPA, in which the first touch pads TP1 are disposed, and may be disposed in the sensing area TSA. For example, the sensing connection lines RL may extend in the second direction (Y-axis direction) in the sensing area TSA, and may be electrically connected to the contact electrodes CE in the sensing area TSA.

The contact electrodes CE are disposed in different rows and columns in the sensing area TSA, and thus, lengths of the sensing connection lines RL connected to the contact electrodes CE and disposed in the sensing area TSA may be different from each other. For example, a length of the sensing connection line RL, which is connected to the contact electrode CE that is disposed to be relatively further away from the first touch pads TP1 that are disposed in the sensing peripheral area TPA, in the second direction (Y-axis direction) may be greater than a length of the sensing connection line RL, which is connected to the contact electrode CE that is disposed relatively more adjacent to first touch pads TP1 that are disposed in the sensing peripheral area TPA, in the second direction (Y-axis direction). In other words, lengths, in the second direction (Y-axis direction), of the sensing lines RL connected to the contact electrodes CE and disposed in the sensing area TSA may be proportional to the areas of the contact electrodes CE in plan view.

For example, a length of a first sensing connection line RL1, which is connected to the first contact electrode CE1 and is disposed in the sensing area TSA, may be greater than a length of a fourth sensing connection line RL4, which is connected to the fourth contact electrode CE4 and is disposed in the sensing area TSA. For example, a length, in the second direction (Y-axis direction), of the first sensing connection line RL1, which is disposed in the sensing area TSA, may be greater than a length, in the second direction (Y-axis direction), of a second sensing connection line RL2, which is disposed in the sensing area TSA. For example, the length, in the second direction (Y-axis direction), of the second sensing connection line RL2, which is disposed in the sensing area TSA, may be greater than a length, in the second direction (Y-axis direction), of a third sensing connection line RL3, which disposed in the sensing area TSA. As another example, the length, in the second direction (Y-axis direction), of the third sensing connection line RL3, which is disposed in the sensing area TSA, may be greater than a length, in the second direction (Y-axis direction), of the fourth sensing connection line RL4, which is disposed in the sensing area TSA.

The driving connection lines TL may be disposed at the same layer as the second touch electrodes TE. One end of each of the driving connection lines TL may be electrically connected to a corresponding second touch electrodes TE, and the other end of each of the driving connection lines TL may be connected to a corresponding second touch electrodes TP2.

The driving connection lines TL may extend from the sensing peripheral area TPA, in which the second touch pads TP2 are disposed, to an edge of the sensing area TSA. The driving connection lines TL may be electrically connected to the second touch electrodes TE at the edge of the sensing area TSA.

Each of the driving connection lines TL may be electrically connected to any one of the second touch electrodes TE disposed in each column. For example, as illustrated in FIG. 4, the driving connection lines TL may be electrically connected to second touch electrodes TE disposed at a lower end of the sensing area TSA among the second touch electrodes TE that are electrically connected to each other.

In the sensing peripheral area TPA, the sensing connection lines RL and the driving connection lines TL may cross each other, and may overlap each other in the thickness direction. For example, the sensing connection lines RL and the driving connection lines TL are disposed at different layers, and thus, may be insulated from each other and overlap each other in the thickness direction.

Figure 5:
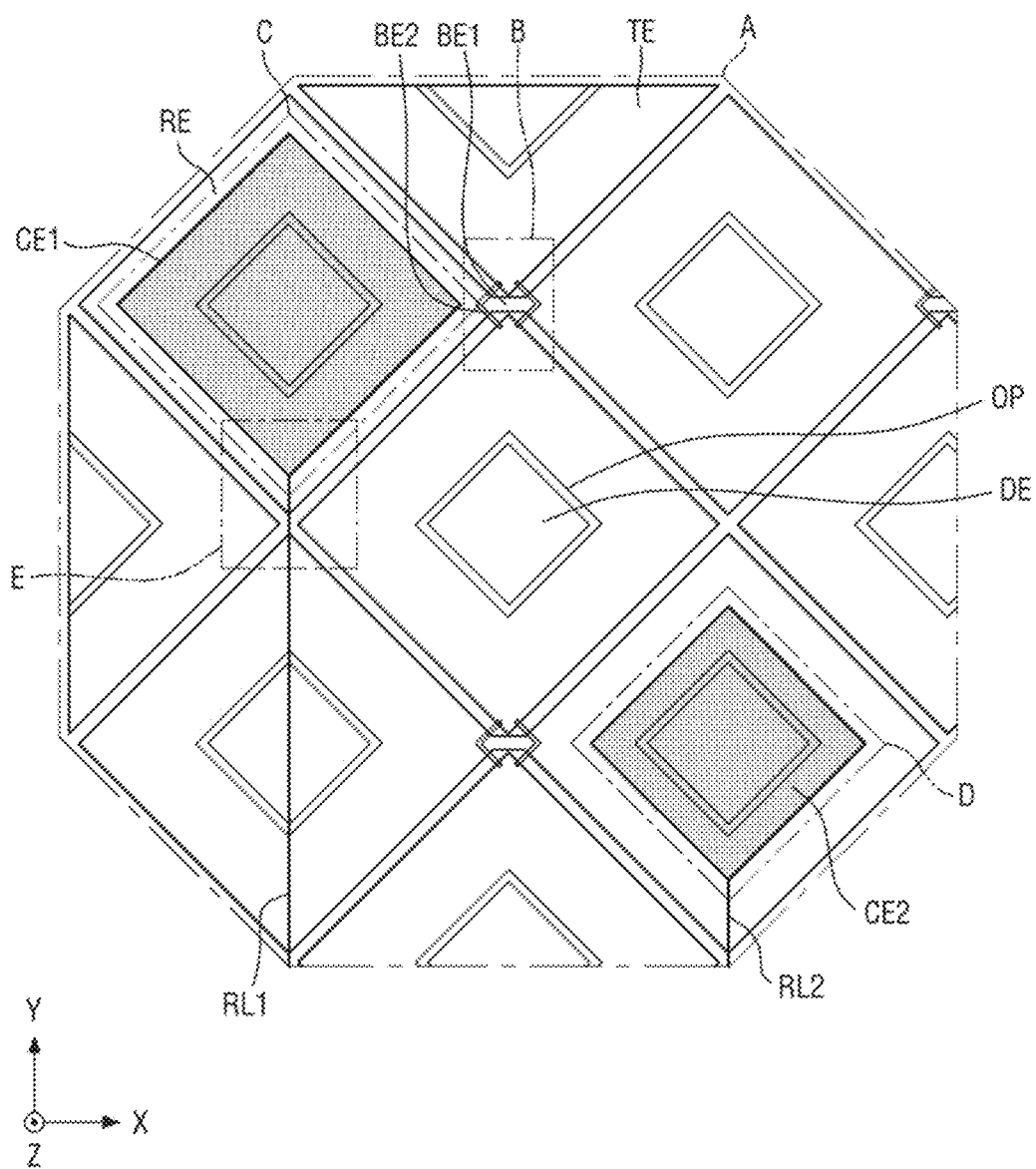
FIG. 5 is an enlarged view of area A of FIG. 4.

FIG. 5 is an enlarged view of area A of FIG. 4.

Referring to FIG. 5, for the first touch electrodes RE and the second touch electrodes TE to be insulated from each other in a crossing area in which the first touch electrodes RE and the second touch electrodes TE cross each other, the first touch electrodes RE adjacent to each other in the first direction (X-axis direction) may be connected to each other through a first connection part BE1, and the second touch electrodes TE adjacent to each other in the second direction (Y-axis direction) may be connected to each other through second connection parts BE2. Accordingly, the first touch electrodes RE and the second touch electrodes TE may be electrically disconnected or insulated from each other in the crossing area. Further, the first touch electrodes RE may be electrically connected to each other in the first direction (X-axis direction), and the second touch electrodes TE may be electrically connected to each other in the second direction (Y-axis direction).

The first connection parts BE1 may have a shape extending from the first touch electrodes RE, and may be disposed at the same layer as the first touch electrodes RE. For example, the first connection parts BE1 may extend in the first direction (X-axis direction).

The second connection parts BE2 may be connected to the second touch electrodes TE through contact holes. The second connection parts BE2 may have a shape in which they are bent at least once. It has been illustrated in FIG. 5 that the second connection parts BE2 are bent like, for example, "<" or ">", but a shape of the second connection parts BE2 is not limited thereto.

In addition, since the second touch electrodes TE adjacent to each other in the second direction (Y-axis direction) are connected to each other by a plurality of second connection parts BE2, even though any one of the second connection parts BE2 is disconnected, the second touch electrodes TE adjacent to each other in the second directions (Y-axis direction) may be stably connected to each other. It has been illustrated in FIG. 5 that the second touch electrodes TE, which are adjacent to each other, are connected to each other by two second connection parts BE2, but the number of second connection parts BE2 is not limited thereto.

The dummy electrodes DE may be disposed to be surrounded by each of the first touch electrodes RE and the second touch electrodes TE. Openings OP may be positioned between the dummy electrodes DE and the first and second touch electrodes RE and TE. For example, each of the dummy electrodes DE may be surrounded by the opening OP, and the first touch electrodes RE and the second touch electrodes TE may be disposed to surround the opening OP.

A size of each of the dummy electrodes DE may be smaller than a size of each of the first touch electrodes RE and the second touch electrodes TE. It has been illustrated in FIG. 5 that each of the first touch electrodes RE, the second touch electrodes TE, and the dummy electrodes DE has a rhombus shape in plan view, but a shape of each of the first touch electrodes RE, the second touch electrodes TE, and the dummy electrodes DE in plan view is not limited thereto.

Each of the first contact electrode CE1 and the second contact electrode CE2 may be positioned at a different layer from the first touch electrodes RE, the second touch electrodes TE, and the dummy electrodes DE. For example, each of the first contact electrode CE1 and the second contact electrode CE2 may be disposed at a different layer from the first touch electrode RE positioned in the first column of the first row and the first touch electrode RE positioned in the second column of the second row, and may overlap each of the first touch electrodes RE in the thickness direction.

In addition, each of the first contact electrode CE1 and the second contact electrode CE2 may overlap openings OP that are positioned in the first touch electrodes RE and the dummy electrodes DE that are surrounded by the openings OP, in the thickness direction.

Figure 6:
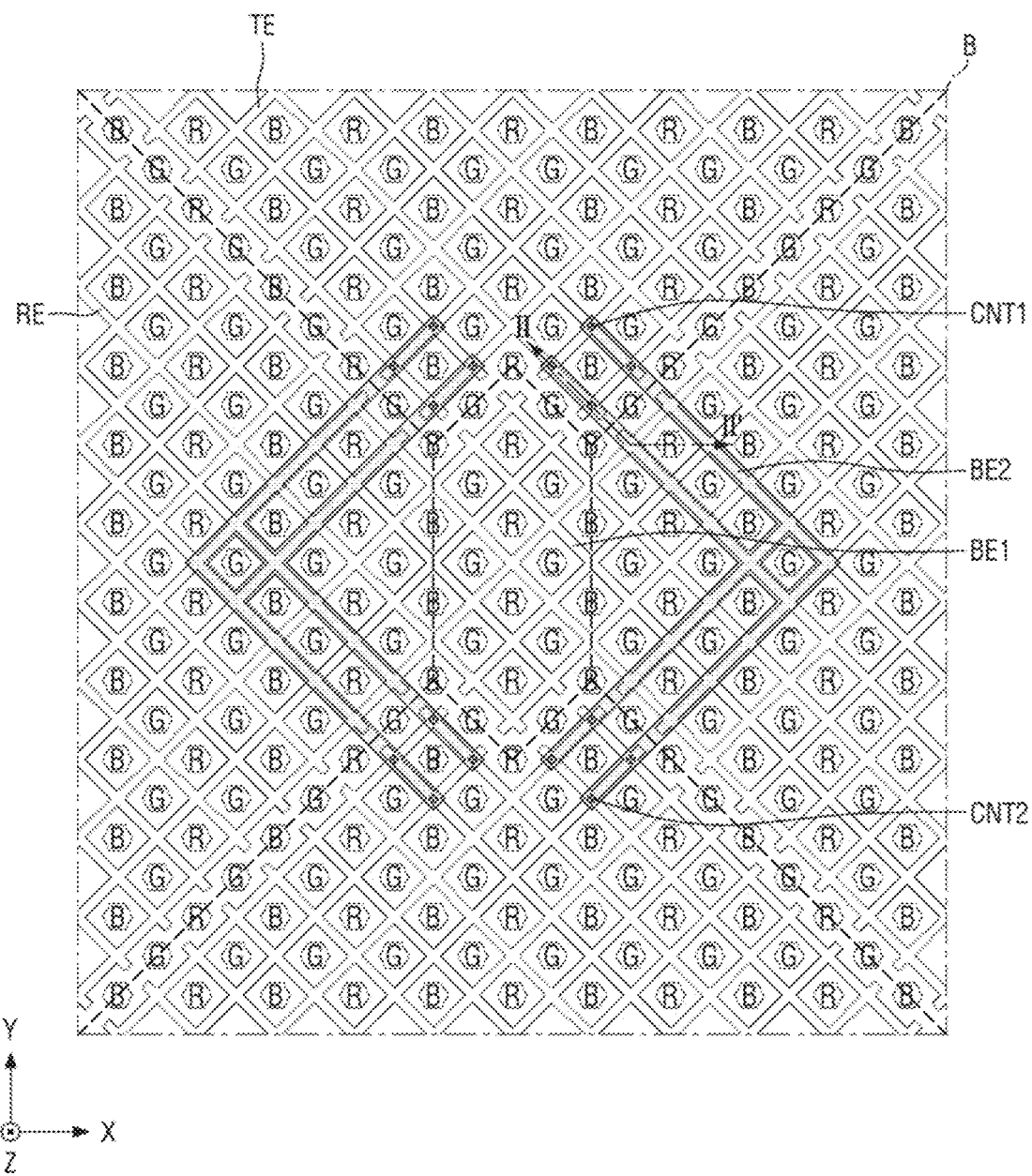
FIG. 6 is an enlarged view of area B of FIG. 5.

FIG. 6 is an enlarged view of area B of FIG. 5.

Referring to FIG. 6, the first touch electrodes RE, the second touch electrodes TE, the first connection part BE1, and the second connection parts BE2 may have a mesh shape or a net shape. The dummy electrodes DE may also have a mesh shape or a net shape.

As illustrated in FIG. 2, when the sensing layer TSL including the first touch electrodes RE and the second touch electrodes TE is disposed on the thin film encapsulation layer TFEL, a distance between the second electrode of the light emitting element layer EML and each of the first touch electrodes RE and the second touch electrodes TE of the sensing layer TSL is relatively close, and thus, a relatively high parasitic capacitance may be formed between the second electrode of the light emitting element layer EML and each of the first and second touch electrodes RE and TE of the sensing layer TSL. Since the parasitic capacitance is proportional to an overlapping area between the second electrode of the light emitting element layer EML and each of the first and second touch electrodes RE and TE of the sensing layer TSL, it is desirable that each of the first touch electrodes RE and the second touch electrodes TE has a mesh shape or a net shape to reduce the parasitic capacitance.

In FIG. 6, for convenience of explanation, a boundary between the first touch electrode RE and the second touch electrode TE, a boundary between the second touch electrode TE and the first connection part BEL, and a boundary between the first touch electrode RE and the first connection part BE1 have been illustrated by dotted lines.

The first connection part BE1 may be disposed between the first touch electrodes RE that are disposed adjacent to each other in the first direction (X-axis direction). The first connection part BE1 may extend from each of the first touch electrodes RE. Therefore, the first connection part BE1 may be connected to the first touch electrodes RE without a separate contact hole.

The second connection parts BE2 may be respectively connected to the second touch electrodes TE through first contact holes CNT1 and second contact holes CNT2. One end of the second connection part BE2 may be connected to any one of the second touch electrodes TE, which are adjacent to each other in the second direction (Y-axis direction), through the first contact hole CNT1. The other end of the second connection part BE2 may be connected to the other of the second touch electrodes TE, which are adjacent to each other in the second direction (Y-axis direction), through the second contact hole CNT2.

The second connection part BE2 may overlap the first touch electrodes RE and/or the second touch electrodes TE. In addition, the second connection part BE2 may overlap the first connection part BE1 instead of the first touch electrodes RE.

In addition, the second connection part BE2 may overlap both the first touch electrode RE and the first connection part BE1. The second connection part BE2 may be disposed at a different layer than the first connection part BE1. Accordingly, even though the second connection part BE2 overlaps the first connection part BE1, the second connection part BE2 might not be short-circuited to the first connection part BE1.

The first touch electrodes RE, the second touch electrodes TE, the first connection part BE1, and the second connection part BE2 may be disposed so as not to overlap each of sub-pixels R, G, and B. For example, the first touch electrodes RE, the second touch electrodes TE, the first connection part BE1, and the second connection part BE2 may be disposed along an edge of each of the sub-pixels R, G, and B. For example, the first touch electrodes RE, the second touch electrodes TE, the first connection part BE1, and the second connection part BE2 may be disposed to overlap a pixel defining film defining of each of the sub-pixels R, G, and B.

The sub-pixels R, G, and B may include first sub-pixels R emitting light of a first color, second sub-pixels G emitting light of a second color, and third sub-pixels B emitting light of a third color. It has been illustrated in FIG. 6 that the first sub-pixels R are red sub-pixels, the second sub-pixels G are green sub-pixels, and the third sub-pixels B are blue sub-pixels, but the present invention is not limited thereto.

It has been illustrated in FIG. 6 that the first sub-pixels R, the second sub-pixels G, and the third sub-pixels B have a hexagonal shape in plan view, but the present invention is not limited thereto. The first sub-pixels R, the second sub-pixels G, and the third sub-pixels B may have polygonal shapes other than the hexagon shape, a circular shape, or an elliptical shape in plan view.

In addition, it has been illustrated in FIG. 6 that a size of the first sub-pixel R, a size of the second sub-pixel G, and a size of the third sub-pixel B are substantially the same as each other, but sizes of the sub-pixels R, G, and B are not limited thereto. For example, a size of the third sub-pixel B may be the greatest, and a size of the second sub-pixel G may be the smallest. In addition, a size of the first sub-pixel R and a size of the third sub-pixel B may be substantially the same as each other, and a size of the second sub-pixel G may be smaller than each of the size of the first sub-pixel R and the size of the third sub-pixel B.

It has been illustrated in FIG. 6 that the pixel includes one first sub-pixel R, two second sub-pixels G, and one third sub-pixel B, but the present invention is not limited thereto. For example, the pixel may include one first sub-pixel R, one second sub-pixel G, and one third sub-pixel B.

According to an embodiment of the present invention illustrated in FIG. 6, the first touch electrodes RE, the second touch electrodes TE, the first connection part BE1, and the second connection parts BE2 have the mesh shape or the net shape, and thus, the sub-pixels R, G, and B might not overlap the first touch electrodes RE, the second touch electrodes TE, the first connection part BE1, and the second connection parts BE2.

Accordingly, a decrease in luminance of light occurring because light output from the sub-pixels R, G, and B being blocked by the first touch electrodes RE, the second touch electrodes TE, the first connection part BE1, and the second connection part BE2 may be prevented.

Figure 7:
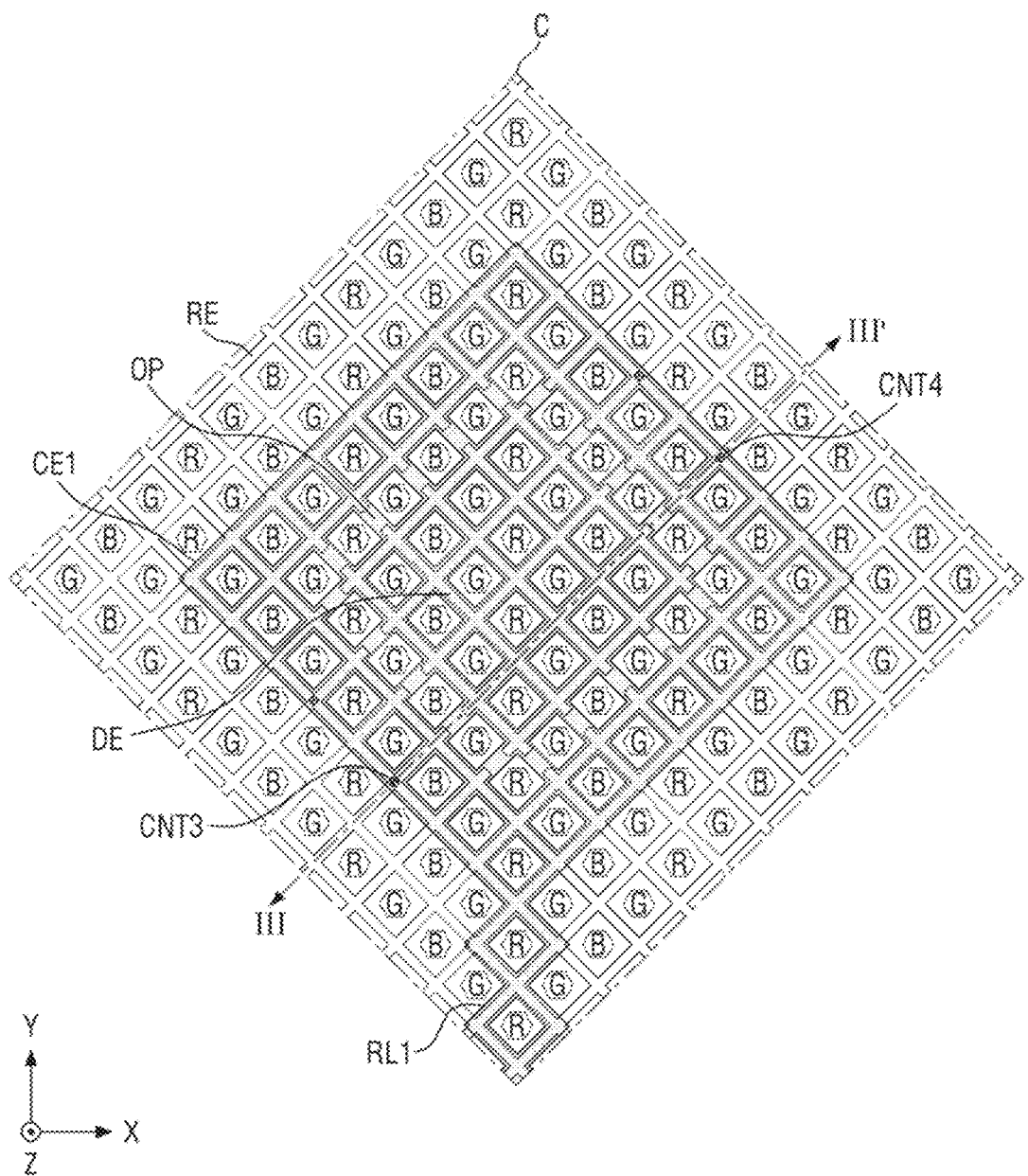
FIG. 7 is an enlarged view of area C of FIG. 5.
Figure 8:
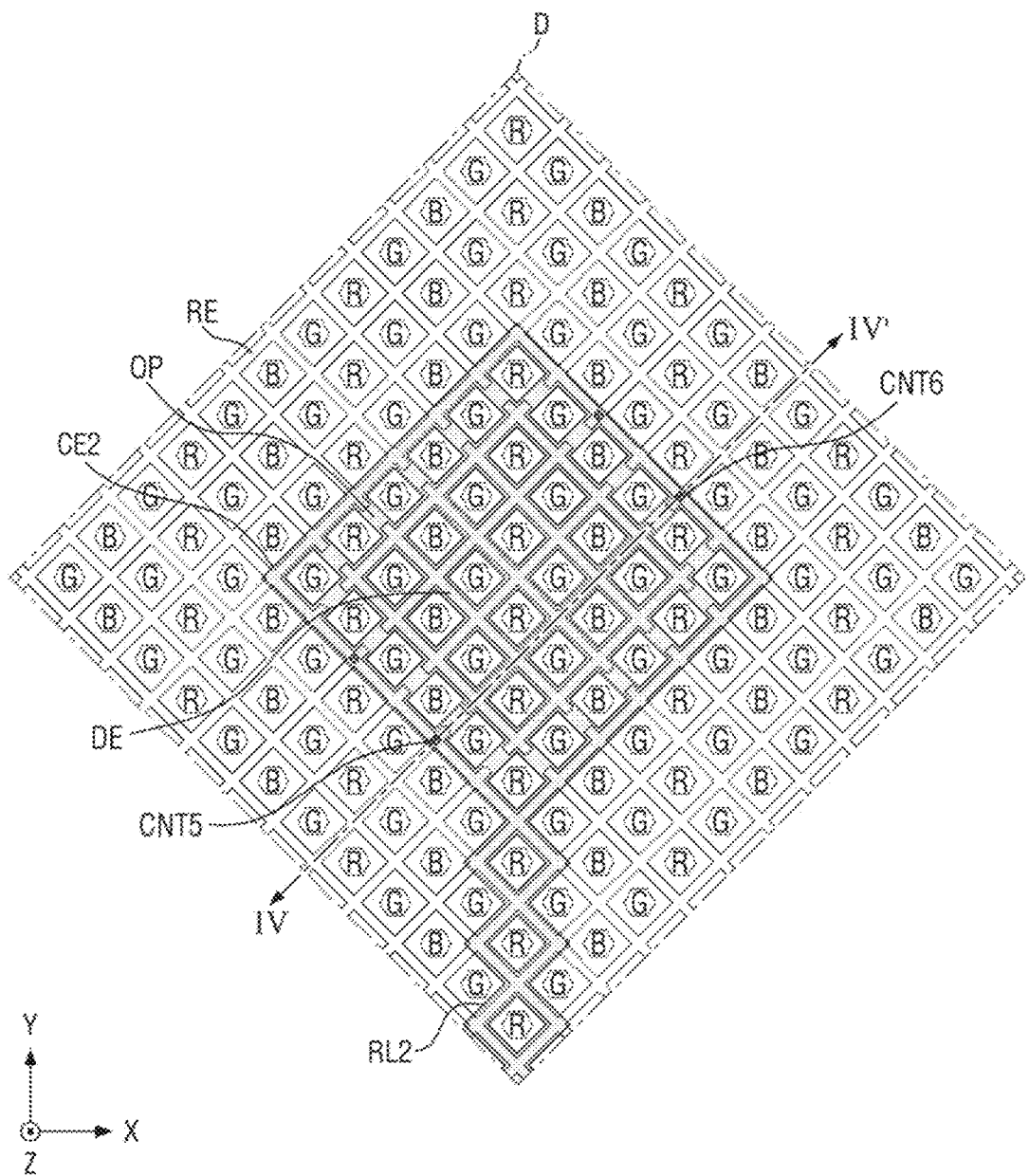
FIG. 8 is an enlarged view of area D of FIG. 5.

FIG. 7 is an enlarged view of area C of FIG. 5. FIG. 8 is an enlarged view of area D of FIG. 5.

Referring to FIGS. 7 and 8, each of the first contact electrode CE1 and the second contact electrode CE2 may be disposed at a different layer from the first touch electrodes RE, and may overlap the first touch electrode RE and the dummy electrode DE in the thickness direction.

Since the area, in plan view, of the first contact electrode CE1 that is connected to the first sensing connection line RL1 is greater than the area, in plan view, of the second contact electrode CE2 that is connected to the second sensing connection line RL2, an area of the first contact electrode CE1 that is electrically connected to the first touch electrode RE, which is positioned in the first column of the first row, and overlaps the first touch electrode RE in the thickness direction, may be greater than an area of the second contact electrode CE2, which overlaps the first touch electrode RE positioned in the second column of the second row in the thickness direction. Accordingly, an electrical resistance of the first touch electrode RE connected to the first contact electrode CE1 may be lower than an electrical resistance of the first touch electrode RE connected to the second contact electrode CE2.

In addition, each of the area of the first contact electrode CE1 and the area of the second contact electrode CE2 in plan view may be smaller than an area of the first touch electrode RE in plan view, and may be greater than each of the area of the opening OP and the area of the dummy electrode DE in plan view.

It has been illustrated in FIGS. 7 and 8 that each of the center of the first contact electrode CE1 and the center of the second contact electrode CE2 is disposed to coincide with the center of the first touch electrode RE and the center of the dummy electrode DE, but the present invention is not limited thereto. For example, each of the center of the first contact electrode CE1 and the center of the second contact electrode CE2 may be disposed so as not to coincide with the center of the first touch electrode RE and the center of the dummy electrode DE.

Referring to FIG. 7, the first contact electrode CE1 may be connected to the first touch electrode RE through third contact holes CNT3 and fourth contact holes CNT4. For example, one end of the first contact electrode CE1 may be connected to the first touch electrode RE that is adjacent to the first contact electrode CE1 in the thickness direction through the third contact holes CNT3, and the other end of the first contact electrode CE1 may be connected to the first touch electrode RE that is adjacent to the first contact electrode CE1 in the thickness direction through the fourth contact holes CNT4.

FIG. 7 has illustrated a case where the third contact holes CNT3 and the fourth contact holes CNT4 are partially positioned on one side and the other side (e.g., opposing side) of the first contact electrode CE1, respectively, but the present invention is not limited thereto. For example, the third contact holes CNT3 and the fourth contact holes CNT4 may be disposed over the entire area in which the first contact electrode CE1 and the first touch electrode RE overlap each other.

Referring to FIG. 8, similar to the first contact electrode CE1 described above with reference to FIG. 7, the second contact electrode CE2 may be connected to the first touch electrode RE through fifth contact holes CNT5 and sixth contact holes CNT6. For example, one end of the second contact electrode CE2 may be connected to the first touch electrode RE that is adjacent to the second contact electrode CE2 in the thickness direction through the fifth contact holes CNT6, and the other end of the second contact electrode CE2 may be connected to the first touch electrode RE that is adjacent to the second contact electrode CE2 in the thickness direction through the sixth contact holes CNT6.

FIG. 8 has illustrated a case where the fifth contact holes CNT5 and the sixth contact holes CNT6 are partially disposed on one side and the other side (e.g., the opposing side) of the second contact electrode CE2, respectively, but the present invention is not limited thereto. For example, the fifth contact holes CNT5 and the sixth contact holes CNT6 may be disposed over the entire area in which the second contact electrode CE2 and the first touch electrode RE overlap each other.

Each of the first contact electrode CE1 and the second contact electrode CE2 may have a mesh shape or a net shape, similar to the first touch electrodes RE, the second touch electrodes TE, the first connection part BE1, and the second connection part BE2 described above with reference to FIG. 6.

The first contact electrode CE1 and the second contact electrode CE2 have the mesh shape or the net shape, and thus, the sub-pixels R, G, and B might not overlap the first contact electrode CE1 and the second contact electrode CE2. Accordingly, as described above, a decrease in luminance of light occurring because of the light output from the sub-pixels R, G, and B being blocked by the first contact electrode CE1 and the second contact electrode CE2 may be prevented.

Figure 9:
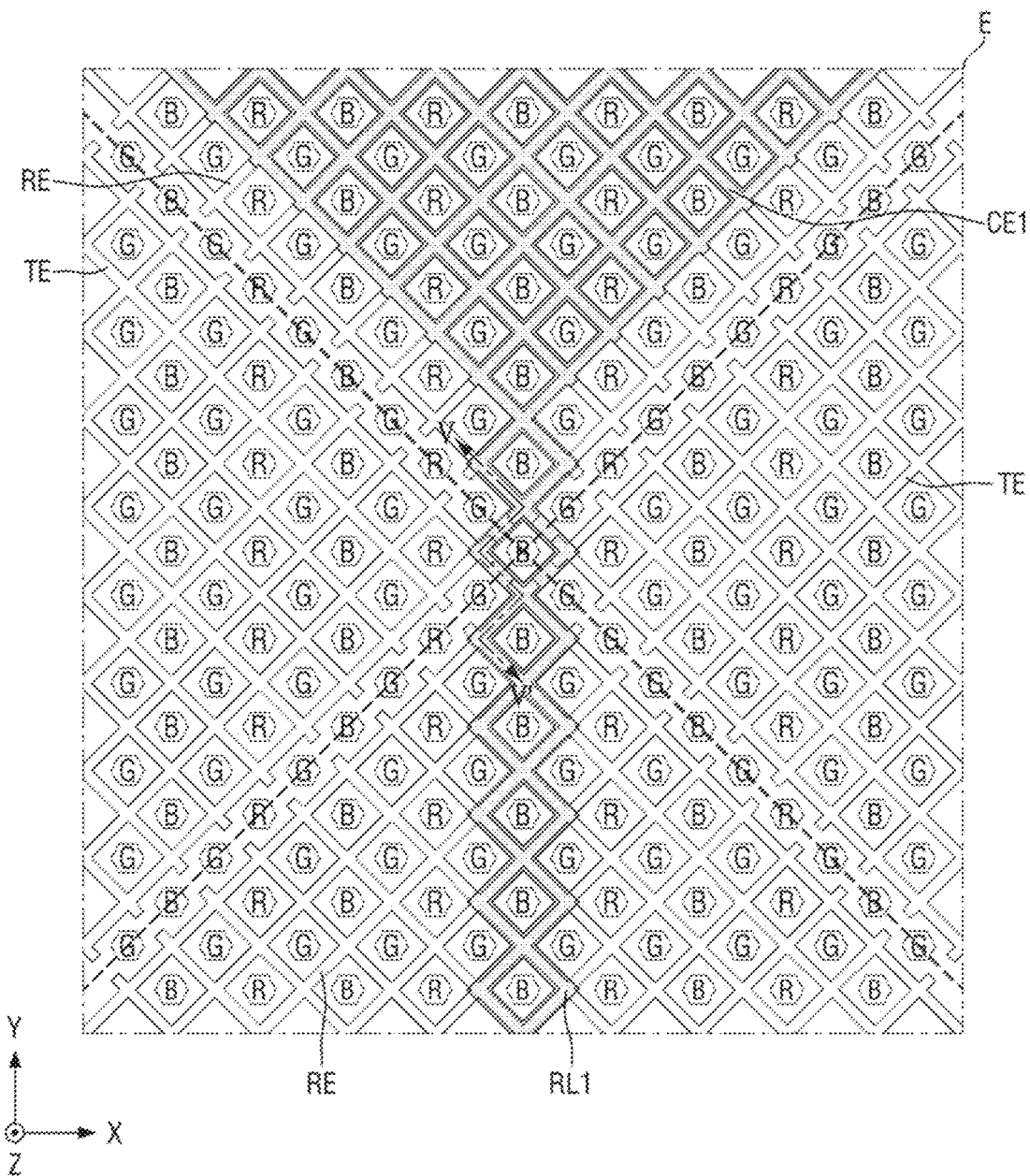
FIG. 9 is an enlarged view of area E of FIG. 5.

FIG. 9 is an enlarged view of area E of FIG. 5.

Referring to FIG. 9, the first sensing connection line RL1 may be connected to one end of the first contact electrode CE1, and the first sensing connection line RL1 may have a shape that extends in the second direction (Y-axis direction) from one end of the first contact electrode CE1.

The first sensing connection line RL1 may partially overlap the first touch electrodes RE and/or the second touch electrodes TE. As illustrated in FIG. 9, the first sensing connection line RL1 connected to one end of the first contact electrode CE1, which is disposed in the first row, may overlap the first touch electrodes RE disposed in the first row and the first touch electrodes RE disposed in the second row in the thickness direction. For example, the first sensing connection line RL1 may extend along the second direction (Y-axis direction) and overlap the first touch electrodes RE and the second touch electrodes TE disposed in a first column, in the thickness direction. However, the present invention is not limited thereto, and in some embodiments of the present invention, when the first sensing connection line RL1 is connected to an end positioned on a side surface of the first contact electrode CE1 disposed in the first row and extends in the second direction (Y-axis direction), the first sensing connection line RL1 may extend in the second direction (Y-axis direction) and overlap the first touch electrodes RE and the second touch electrodes TE in the thickness direction.

The first contact electrode CE1 may be disposed at the same layer as the first sensing connection line RL1. The first contact electrode CE1 and the first sensing connection line RL1 may be made of the same material. For example, the first contact electrode CE1 may be formed of a first sensing conductive layer 171 illustrated in FIG. 10 to be described later.

The first sensing connection line RL1 may have a mesh shape or a net shape, similar to the first contact electrode CE1. The first sensing connection line RL1 has the mesh shape or the net shape, and thus, the sub-pixels R, G, and B might not overlap the first sensing connection line RL1. Accordingly, as described above, a decrease in luminance of light occurring because of the light output from the sub-pixels R, G, and B being blocked by the first sensing connection line RL1 may be prevented.

A description has been provided on the basis of the first sensing connection line RL1, but the contents described above may be substantially equally applied to the second sensing connection line RL2 connected to the second contact electrode CE2.

Figure 10:
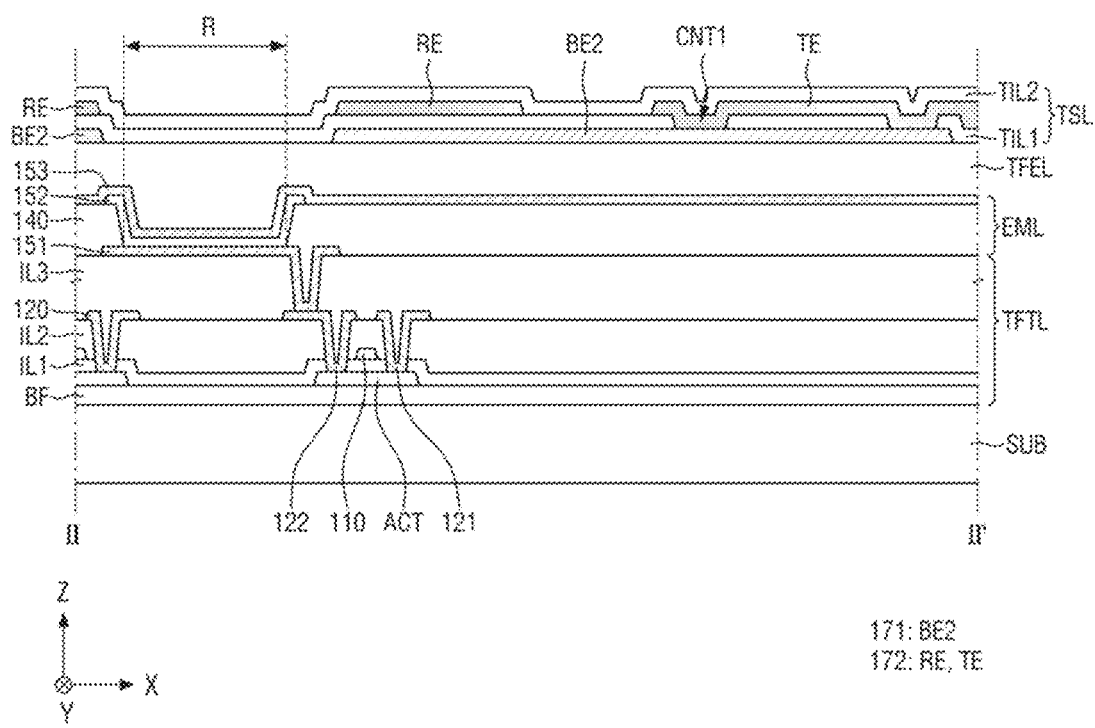
FIG. 10 is a cross-sectional view taken along II-II' of FIG. 6.
Figure 11:
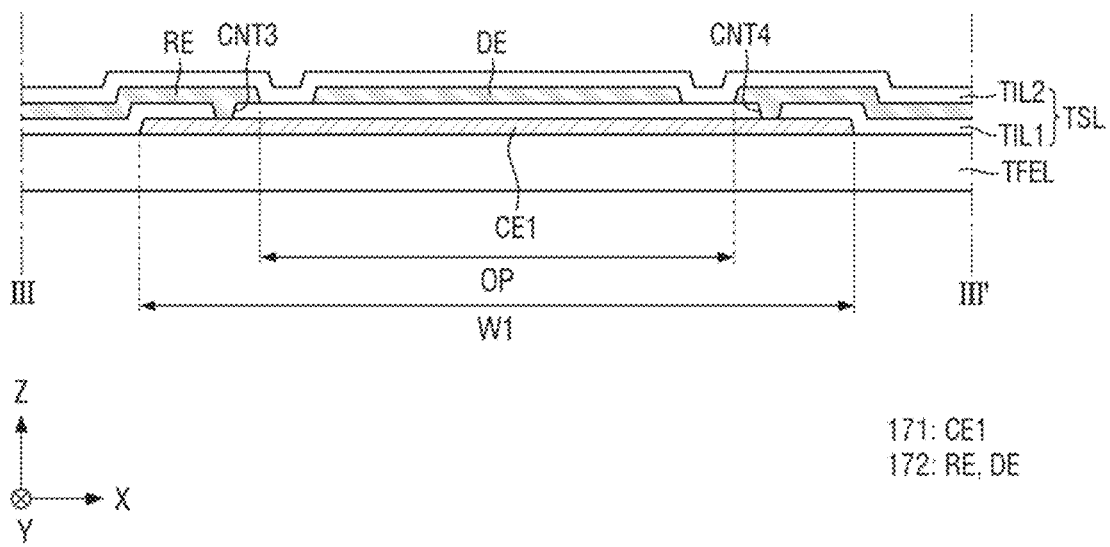
FIG. 11 is a cross-sectional view taken along III-III' of FIG. 7.
Figure 12:
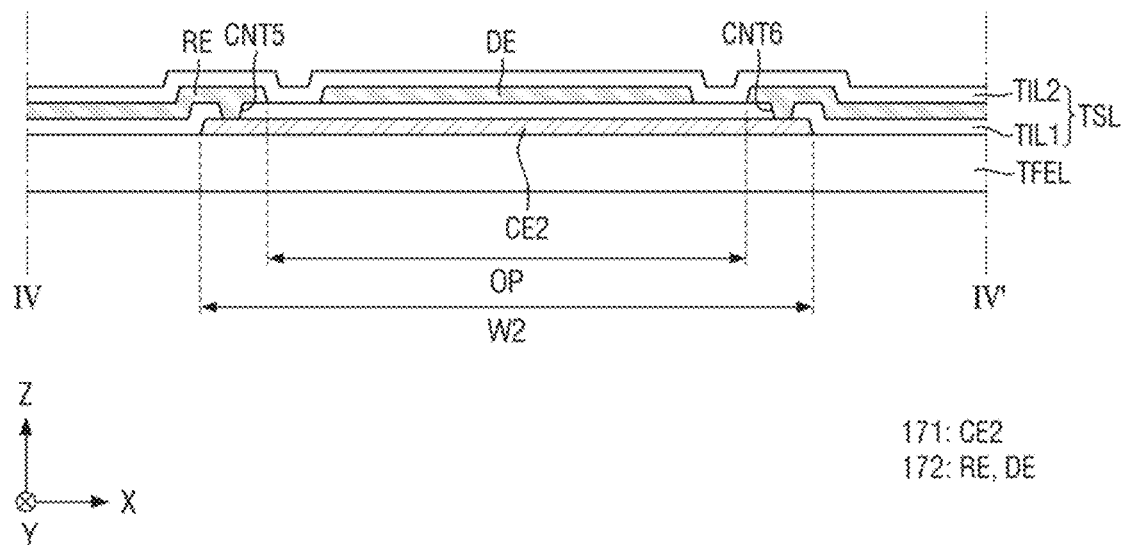
FIG. 12 is a cross-sectional view taken along IV-IV' of FIG. 8.
Figure 13:
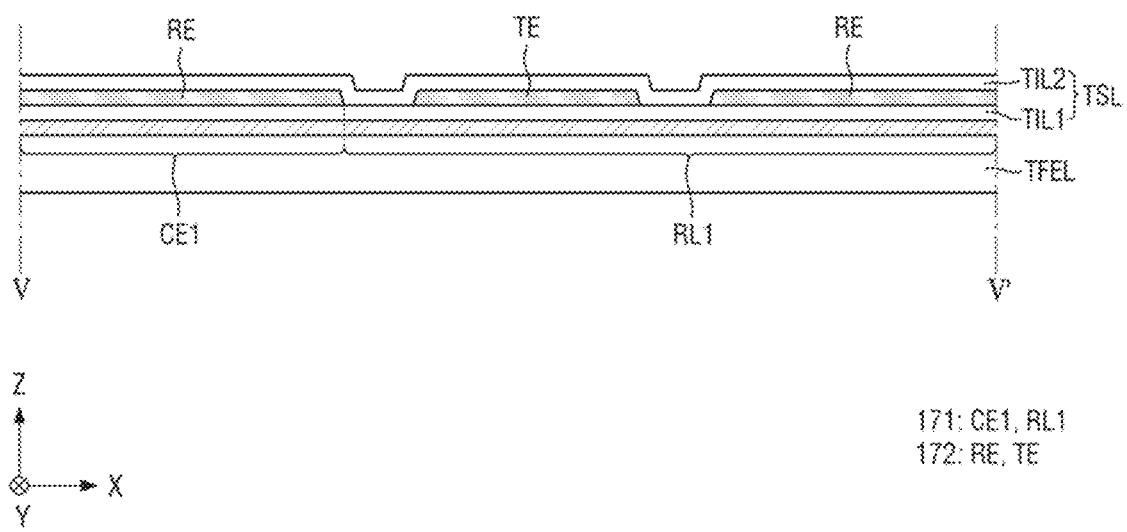
FIG. 13 is a cross-sectional view taken along V-V' of FIG. 9.

FIG. 10 is a cross-sectional view taken along II-II' of FIG. 6. FIG. 11 is a cross-sectional view taken along III-III' of FIG. 7. FIG. 12 is a cross-sectional view taken along IV-IV' of FIG. 8. FIG. 13 is a cross-sectional view taken along V-V' of FIG. 9.

In FIGS. 11 to 13, for convenience of explanation, layers disposed below a thin film encapsulation layer TFEL have been omitted, and contents to be described below with reference to FIG. 10 may be applied substantially equally as a description of the omitted layers.

Referring to FIG. 10, a thin film transistor layer TFTL is disposed on a substrate SUB. The thin film transistor layer TFTL includes a buffer layer BF, a semiconductor layer ACT, a first insulating layer IL1, a first conductive layer 110, a second insulating layer IL2, a second conductive layer 120, and a third insulating layer IL3. Each of the above-described layers may be formed as a single film, but may also be formed as a stacked film including a plurality of films. In addition, another layer may be disposed between the respective layers.

The buffer layer BF may be disposed on the substrate SUB. The buffer layer BF may be disposed on the substrate SUB to protect thin film transistors and a light emitting layer 152 of a light emitting element layer EML from moisture that may permeate through the substrate SUB, which may be vulnerable to moisture permeation.

The buffer layer BF may include a plurality of inorganic films that may be alternately stacked. For example, the buffer layer BF may be formed as multiple films in which one or more inorganic films of a silicon nitride layer, a silicon oxynitride layer, a silicon oxide layer, a titanium oxide layer, and an aluminum oxide layer are alternately stacked. In addition, the buffer layer BF may be omitted.

The semiconductor layer ACT may be disposed on the buffer layer BF. The semiconductor layer ACT may form channels of a plurality of transistors of the pixels. The semiconductor layer ACT may include polycrystalline silicon. The polycrystalline silicon may be formed by crystallizing amorphous silicon.

When the semiconductor layer ACT is made of the polycrystalline silicon, the semiconductor layer ACT may have conductivity through ion doping. Accordingly, in the plurality of transistors, the semiconductor layer ACT may include a source region and a drain region as well as a channel region. The source region and the drain region may be connected to both sides of each channel region. However, the present invention is not limited thereto, and in some embodiments of the present invention, the semiconductor layer ACT may also include single crystal silicon, low-temperature polycrystalline silicon, amorphous silicon, or an oxide semiconductor. The oxide semiconductor may include, for example, a binary compound ($AB_x$), a ternary compound ($AB_xC_y$), or a quaternary compound ($AB_xC_yD_z$) containing indium, zinc, gallium, tin, titanium, aluminum, hafnium (Hf), zirconium (Zr), magnesium (Mg), and the like. In addition, the semiconductor layer ACT may include ITZO (oxide containing indium, tin, and titanium) or IGZO (oxide containing indium, gallium, and tin).

The first insulating layer IL1 may be disposed on the semiconductor layer ACT. The first insulating layer IL1 may be substantially disposed over the entire surface of the substrate SUB. The first insulating layer IL1 may be a gate insulating film having a gate insulating function. The first insulating layer IL1 may include, for example, a silicon compound, a metal oxide, or the like. For example, the first insulating layer IL1 may include silicon oxide, silicon nitride, silicon oxynitride, aluminum oxide, tantalum oxide, hafnium oxide, zirconium oxide, titanium oxide, or the like. The first insulating layer IL1 may be a single film or a multilayer film including stacked films made of different materials.

The first conductive layer 110 is disposed on the first insulating layer IL1. The first conductive layer 110 may include one or more metals of, for example, molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and/or copper (Cu). The first conductive layer 110 may be a single film or a multilayer film. The first conductive layer 110 may include a gate electrode of a transistor and a first electrode of a storage capacitor.

The second insulating layer IL2 is disposed on the first conductive layer 110. The second insulating layer IL2 may be substantially disposed over the entire surface of the substrate SUB. The second insulating layer IL2 serves to insulate the first conductive layer 110 and the second conductive layer 120 from each other.

The second insulating layer IL2 may be an interlayer insulating film. The second insulating layer IL2 may include the same material as the first insulating layer IL1 described above or include one or more materials selected from materials exemplified as the materials of the first insulating layer IL1.

The second conductive layer 120 is disposed on the second insulating layer IL2. The second conductive layer 120 may include one or more metals of, for example, aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and/or copper (Cu). The second conductive layer 120 may be a single film or a multilayer film. For example, the second conductive layer 120 may be formed in a stacked structure of Ti/Al/Ti, Mo/Al/Mo, Mo/AlGe/Mo, Ti/Cu, or the like.

The second conductive layer 120 may include the above-described data lines, a source electrode 121, and a drain electrode 122. The source electrode 121 and the drain electrode 122 may be connected to the source region and the drain region of the semiconductor layer ACT, respectively, through contact holes penetrating through the second insulating layer IL2 and the first insulating layer IL1.

The third insulating layer IL3 may cover the second conductive layer 120, and may be disposed on the second conductive layer 120. In an embodiment of the present invention, the third insulating layer IL3 may be a via layer. The third insulating layer IL3 may include an organic insulating material such as a polyacrylates resin, an epoxy resin, a phenolic resin, a polyamides resin, a polyimides resin, an unsaturated polyesters resin, a polyphenyleneethers resin, a polyphenylenesulfides resin, or benzocyclobutene (BCB).

The light emitting element layer EML is disposed on the thin film transistor layer TFTL. The light emitting element layer EML may include a first electrode layer 151, a light emitting layer 152, a second electrode layer 153, and a pixel defining film 140. For example, the light emitting element layer EML may be disposed on the third insulating layer IL3.

Each of the sub-pixels refers to an area in which the first electrode layer 151, the light emitting layer 152, and the second electrode layer 153 are sequentially stacked. In addition, in each of the sub-pixels, holes from the first electrode layer 151 and electrons from the second electrode layer 153 are combined with each other in the light emitting layer 152 to emit light. The first sub-pixel R has been mainly illustrated in FIG. 10, but the second sub-pixel G (see FIG. 6) and the third sub-pixel B (see FIG. 6) may also have substantially the same configuration as that of the first sub-pixel R illustrated in FIG. 10.

The first electrode layer 151 may be disposed on the third insulating layer IL3. The first electrode layer 151 may have a stacked film structure including a material layer, which has a high work function, and a reflective material, of the material layer having a high work function may include, for example, indium tin oxide (ITO), indium zinc oxide (IZO), zinc oxide (ZnO), and/or indium oxide ($In_2O_3$). The reflective material layer may include, for example, silver (Ag), magnesium (Mg), aluminum (Al), platinum (Pt), lead (Pb), gold (Au), nickel (Ni), neodymium (Nd), iridium (Ir), chromium (Cr), lithium (Li), calcium (Ca), or mixtures thereof. However, the present invention is not limited thereto. The material layer having the high work function may be disposed at a layer above the reflective material layer to be disposed close to the light emitting layer 152. The first electrode layer 151 may have a multilayer structure of, for example, ITO/Mg, ITO/MgF, ITO/Ag, and ITO/Ag/ITO, but the present invention is not limited thereto.

Anode electrodes of the sub-pixels may be formed of the first electrode layer 151. FIG. 10 has illustrated a case where the anode electrode is connected to the drain electrode 122 through a contact hole penetrating through the third insulating layer IL3, but the present invention is not limited thereto. For example, the anode electrode may also be connected to the source electrode 121 through a contact hole penetrating through the third insulating layer IL3.

The pixel defining film 140 may be disposed on the first electrode layer 151. The pixel defining film 140 may be disposed to partition the first electrode layer 151 to define areas of sub-pixels (e.g., an emission area). The pixel defining film 140 may include an opening exposing the first electrode layer 151. For example, the pixel defining film 180 may be formed to cover an edge of the first electrode layer 151. The opening may define an emission area of each of the sub-pixels.

The pixel defining film 140 may include an inorganic insulating material such as silicon oxide, silicon nitride, silicon oxynitride, hafnium oxide, aluminum oxide, titanium oxide, tantalum oxide, or zinc oxide or an organic insulating material such as a polyacrylates resin, an epoxy resin, a phenolic resin, a polyamides resin, a polyimides resin, an unsaturated polyesters resin, a polyphenylene-ethers resin, a polyphenylene-sulfides resin, or benzocyclobutene (BCB). The pixel defining film 140 may be a single film or a multilayer film including stacked films made of different materials.

The light emitting layer 152 may be disposed in the opening of the pixel defining film 140. The light emitting layer 152 may include an organic material to emit light of a predetermined color. For example, the light emitting layer 152 may include a hole transporting layer, an organic material layer, and an electron transporting layer. In this case, the light emitting layer 152 of the red sub-pixel R may emit red light, the light emitting layer 152 of the green sub-pixel G (see FIG. 6) may emit green light, and the light emitting layer 152 of the blue sub-pixel B (see FIG. 6) may emit blue light.

The second electrode layer 153 may be disposed on the light emitting layer 152 and the pixel defining film 140. A cathode electrode may be formed of the second electrode layer 153. The cathode electrode may be disposed over the entire display area DA. The second electrode layer 153 may include a material layer having a small work function, such as Li, Ca, LiF/Ca, LiF/Al, Al, Mg, Ag, Pt, Pd, Ni, Au, Nd, Ir, Cr, BaF, Ba, or compounds or mixtures thereof (e.g., a mixture of Ag and Mg, etc.). The second electrode layer 153 may further include a transparent metal oxide layer disposed on the material layer having the small work function. A capping layer may be formed on the second electrode layer 153.

The thin film encapsulation layer TFEL may be disposed on the light emitting element layer EML. The thin film encapsulation layer TFEL is disposed on the second electrode layer 153. The thin film encapsulation layer TFEL may include at least one inorganic film in order to prevent oxygen or moisture from penetrating into each of the light emitting layer 152 and the second electrode layer 153.

In addition, the thin film encapsulation layer TFEL may include at least one organic film in order to protect the light emitting element layer EML from foreign substances such as dust. For example, the thin film encapsulation layer TFEL may include a first inorganic film disposed on the second electrode layer 153, an organic film disposed on the first inorganic film, and a second inorganic film disposed on the organic film.

The first inorganic film and the second inorganic film may be formed as a silicon nitride layer, a silicon oxynitride layer, a silicon oxide layer, a titanium oxide layer, or an aluminum oxide layer, but are not limited thereto.

The organic film may be made of an acrylic resin, an epoxy resin, a phenolic resin, a polyamide resin, a polyimide resin, or the like, but is not limited thereto.

Referring to FIGS. 10 to 13, the sensing layer TSL may be disposed on the thin film encapsulation layer TFEL. In some embodiments, a buffer film may be additionally disposed between the thin film encapsulation layer TFEL and the sensing layer TSL.

The sensing layer TSL may include a first sensing conductive layer 171, a first sensing insulating layer TIL1, a second sensing conductive layer 172, and a second sensing insulating layer TIL2.

Each of the above-described layers may be formed as a single film, but may also be formed as a stacked film including a plurality of films. In addition, another layer may be disposed between the respective layers.

The first sensing conductive layer 171 may include, for example, molybdenum, titanium, copper, aluminum, or alloys thereof. The first sensing conductive layer 171 may include the first contact electrode CE1, the second contact electrode CE2, the first sensing connection line RL1, and the second connection part BE2 described above.

The first sensing insulating layer TIL1 may be disposed on the first sensing conductive layer 171.

The first sensing insulating layer TIL1 insulates the first sensing conductive layer 171 and the second sensing conductive layer 172 from each other. The first sensing insulating layer TIL1 may include an organic film and/or an inorganic film.

The organic film may include, for example, at least one of a polyacrylates resin, a methacrylates resin, polyisoprene, a vinyl-based resin, an epoxy-based resin, a urethane-based resin, a cellulose-based resin, a siloxane-based resin, a polyimides resin, a polyamides resin, and/or a phenyleneethers resin.

The inorganic film may include, for example, at least one of aluminum oxide, titanium oxide, silicon oxide, silicon oxynitride, zirconium oxide, and/or hafnium oxide.

The second sensing conductive layer 172 may be disposed on the first sensing insulating layer TIL1. The second sensing conductive layer 172 may include the same material as the first sensing conductive layer 171 described above or include one or more materials selected from materials exemplified as the materials of the first sensing conductive layer 171. The second sensing conductive layer 172 may include the first touch electrode RE, the second touch electrode TE, and the dummy electrode DE described above.

The second sensing insulating layer TIL2 may be disposed on the second sensing conductive layer 172. The second sensing insulating layer TIL2 may serve to planarize a step formed by the first sensing conductive layer 171 and the second sensing conductive layer 172. The second sensing insulating layer TIL2 may include the same material as the first sensing insulating layer TIL1 described above or include one or more materials selected from materials exemplified as the materials of the first sensing insulating layer TIL1.

Referring to FIG. 10, the second touch electrode TE may be connected to the second connection part BE2 through the first contact hole CNT1 penetrating through the first sensing insulating layer TIL1. Accordingly, the second sensing electrodes TE adjacent to each other in the second direction (Y-axis direction) in FIG. 5 may be connected to each other through the second connection part BE2.

Referring to FIGS. 11 and 12, the first touch electrodes RE and the dummy electrode DE may be disposed so as to be spaced apart from each other at the same layer. For example, the first touch electrodes RE and the dummy electrode RE may be disposed on the first sensing insulating layer TIL1, and may be disposed to be spaced apart from each other along the first direction (X-axis direction).

The first contact electrode CE1 may be connected to the first touch electrode RE through the third contact hole CNT3 and the fourth contact hole CNT4 penetrating through the first sensing insulating layer TIL1, and may overlap the first touch electrode RE in the thickness direction with the first sensing insulating layer TIL1 interposed between the first touch electrode RE and the first contact electrode CE1.

Similar to the first contact electrode CE1, the second contact electrode CE2 may be connected to the first touch electrode RE through the fifth contact hole CNT5 and the sixth contact hole CNT6 penetrating through the first sensing insulating layer TIL1, and may overlap the first touch electrode RE in the thickness direction with the first sensing insulating layer TIL1 interposed between the second contact electrode CE2 and the first touch electrode RE.

The first contact electrode CE1 and the second contact electrode CE2 have a greater area than that of the dummy electrode DE, and thus, each of the first contact electrode CE1 and the second contact electrode CE2 may overlap the entirety of the dummy electrode DE in the thickness direction with the first sensing insulating layer TIL1 interposed therebetween.

It has been illustrated in FIGS. 11 and 12 that each of the first contact electrode CE1 and the second contact electrode CE2 overlaps the entirety of the dummy electrode DE in the thickness direction, but the present invention is not limited thereto, and in some embodiments of the present invention, each of the first contact electrode CE1 and the second contact electrode CE2 may overlap at least a portion of the dummy electrode DE with the first sensing insulating layer TIL1 interposed therebetween.

As described above, in an embodiment of the present invention, the area of the first contact electrode CE1 is greater than the area of the second contact electrode CE2, and thus, a width W1 of the first contact electrode CE1 in the first direction (X-axis direction) may be greater than a width W2 of the second contact electrode CE2 in the first direction (X-axis direction). Accordingly, an area of the first contact electrode CE1 overlapping the first touch electrode RE that is disposed on the first sensing insulating layer TIL1 in the thickness direction may be greater than an area of the second contact electrode CE2 that overlaps the first touch electrode RE disposed on the first sensing insulating layer TIL1 in the thickness direction.

Referring to FIG. 13, as described above, the first sensing connection line RL1 may be disposed at the same layer as the first contact electrode CE1, and may be connected to an end of the first contact electrode CE1. For example, the first sensing connection line RL1 may be formed integrally with the first contact electrode CE1, and may be disposed on the thin film encapsulation layer TFEL.

It has been illustrated in FIG. 13 that the first contact electrode CE1 and the first sensing connection line RL1 are formed integrally with each other, but the present invention is not limited thereto, and in some embodiments of the present invention, the first contact electrode CE1 and the first sensing connection line RL1 may be made of separate materials.

The first sensing connection line RL1 extending from the end of the first contact electrode CE1 may overlap the first touch electrode RE and the second touch electrode TE in the thickness direction with the first sensing insulating layer TIL1 interposed therebetween. For example, the first sensing connection line RL1 may overlap the first touch electrode RE and the second touch electrode TE disposed at a different layer from the first sensing connection line RL1, in the thickness direction.

According to an embodiment of the present invention illustrated in FIGS. 1 to 13, each of the sensing connection lines RL is connected to one end of each of the contact electrodes CE and disposed in the sensing area TSA, and accordingly, a space for disposing the sensing connection lines RL in the sensing peripheral area TPA is reduced, such that the bezel area of the display device 10 may be minimized.

In addition, a difference in touch sensitivity between the first touch electrodes RE due to a difference in length between the sensing connection lines RL may be reduced by making areas, in plan view, of the contact electrodes CE, which are connected to one ends of the sensing connection lines RL that have different lengths and are disposed in the sensing area TSA, different from each other.

For example, the sensing connection lines RL disposed in the sensing area TSA have the different lengths from each other, and may thus have different resistances from each other. Accordingly, a difference in resistance between the sensing connection lines RL may be compensated for or offset by the contact electrodes CE being in contact with the sensing connection lines RL and the first touch electrodes RE and having the different areas from each other. By compensating for or offsetting the difference in resistance as described above, a difference in touch sensitivity generated in the first touch electrodes RE, which are connected to the contact electrodes CE, may be reduced, such that the touch sensitivity of the first touch electrodes RE disposed in the sensing area TSA may be kept constant.

Hereinafter, some embodiments of a display device will be described. In the following embodiments, the same components as those of the above-described embodiment will be denoted by the same reference numerals, and an overlapping description thereof will be omitted or simplified, and contents different from those described above will be mainly described.

Figure 14:
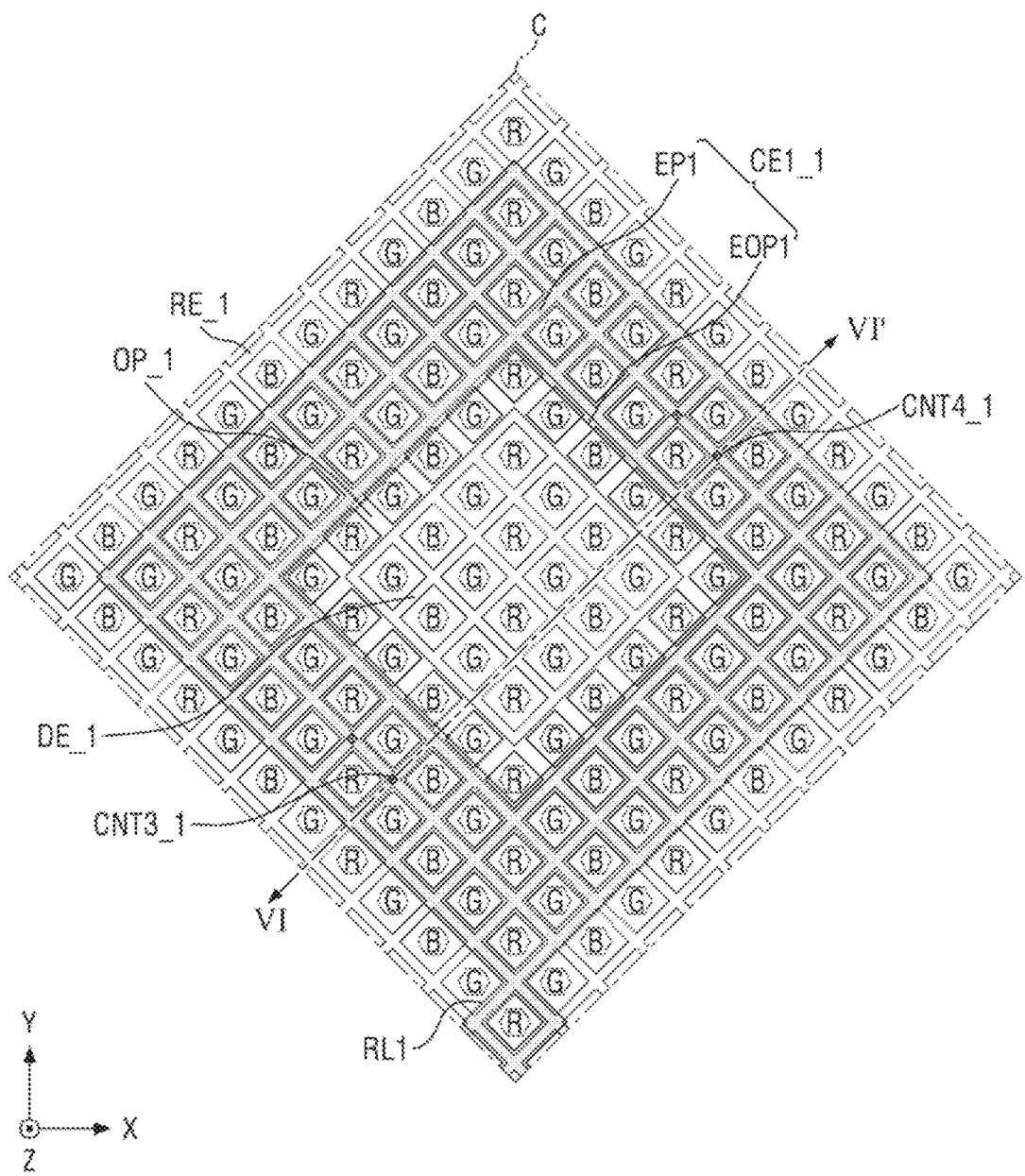
FIG. 14 is an enlarged view of area C of FIG. 5 according to an embodiment of the present invention.
Figure 15:
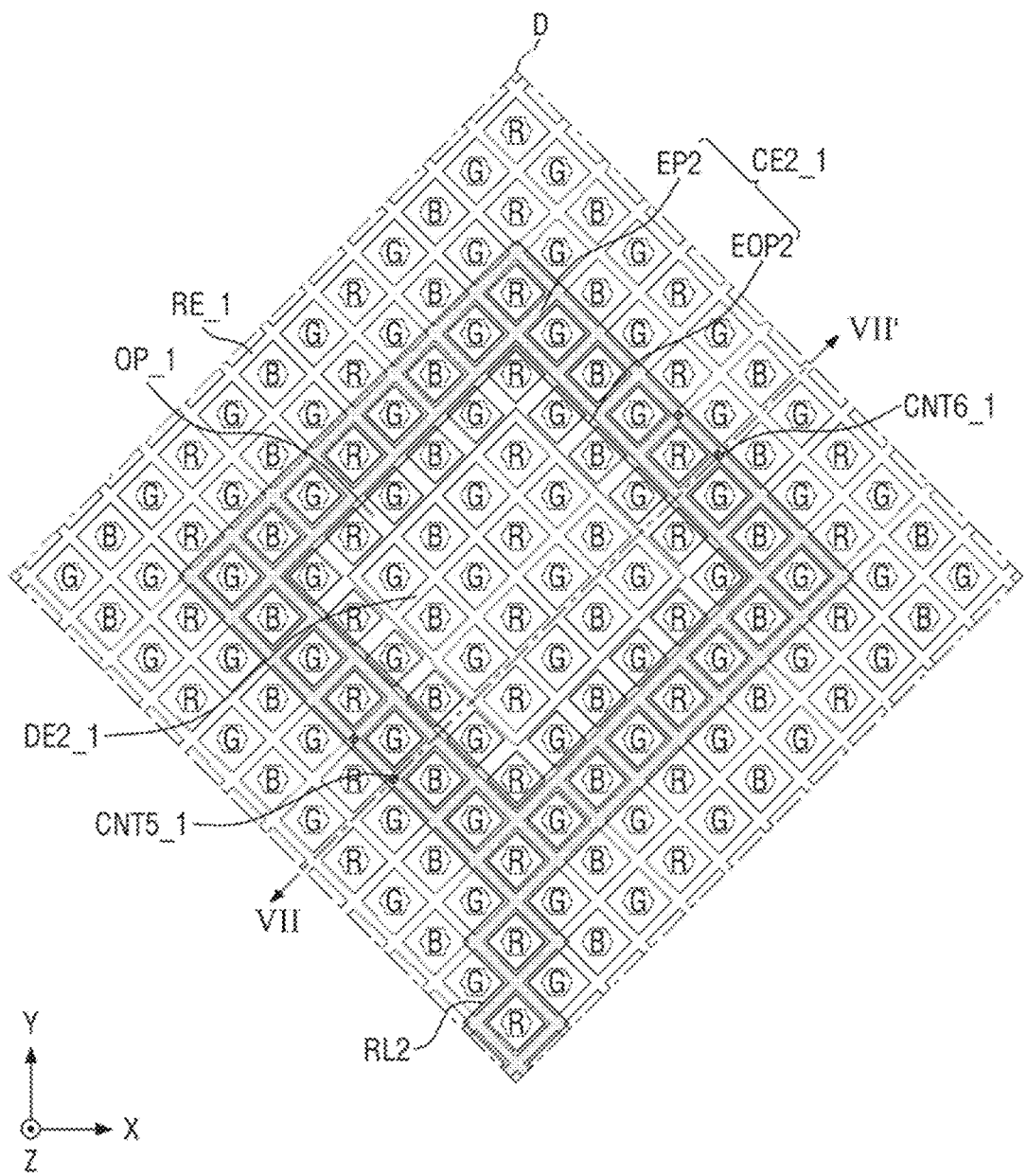
FIG. 15 is an enlarged view of area D of FIG. 5 according to an embodiment of the present invention.

FIG. 14 is an enlarged view of area C of FIG. 5 according to an embodiment of the present invention. FIG. 15 is an enlarged view of area D of FIG. 5 according to an embodiment of the present invention.

Referring to FIGS. 14 and 15, the present embodiment is different from an embodiment illustrated in FIGS. 7 and 8 in that a first contact electrode CE1_1 and a second contact electrode CE2_1 include a first electrode opening EOP1 and a second electrode opening EOP2, respectively.

The first contact electrode CE1_1 may include the first electrode opening EOP1 and a first contact electrode part EP1 surrounding the first electrode opening EOP1, and the second contact electrode CE2_1 may include the second electrode opening EOP2 and a second contact electrode part EP2 surrounding the second electrode opening EOP2.

For example, the first contact electrode part EP1 of the first contact electrode CE1_1 and the second contact electrode part EP2 of the second contact electrode CE2_1 may have a mesh shape or a net shape and might not overlap dummy electrodes DE_1 in the thickness direction, similar to an embodiment illustrated in FIGS. 7 and 8.

The first contact electrode part EP1 of the first contact electrode CE1_1 and the second contact electrode part EP2 of the second contact electrode CE2_1 may be connected to one end of the first sensing connection line RL1 and one end the second sensing connection line RL2, respectively.

The first contact electrode parts EP1 of the first contact electrode CE1_1 may be connected to a first touch electrode RE_1 through third contact holes CNT3_1 and fourth contact holes CNT4_1, and the second contact electrode parts EP2 of the second contact electrode CE2 may be connected to the first touch electrode RE_1 through fifth contact holes CNT5_1 and sixth contact holes CNT6_1.

The first electrode opening EOP1 of the first contact electrode CE1_1 may be an area in which a portion of the first contact electrode part EP1 is removed from the first contact electrode CE1_1, and the second electrode opening EOP2 of the second contact electrode CE2_1 may be an area in which a portion of the second contact electrode part EP2 is removed from the second contact electrode CE2_1. For example, the first electrode opening EOP1 of the first contact electrode CE1_1 and the second electrode opening EOP2 of the second contact electrode CE2_1 may penetrate through the first contact electrode CE1 and the second contact electrode CE2, respectively, in the thickness direction and overlap the dummy electrodes DE_1 in the thickness direction.

It has been illustrated in the present embodiment that each of the first electrode opening EOP1 and the second electrode opening EOP2 has a rhombus shape in plan view, but a shape of each of the first electrode opening EOP1 and the second electrode opening EOP2 in plan view is not limited thereto.

An area, in plan view, of the first contact electrode CE1_1 including the first electrode opening EOP1 and the first contact electrode part EP1 may be greater than an area, in plan view, of the second contact electrode CE2_1 including the second electrode opening EOP2 and the second contact electrode part EP2. For example, areas of the first electrode opening EOP1 and the second electrode opening EOP2 in plan view may be the same as each other, and accordingly, a total area of the first contact electrode part EP1 surrounding the first electrode opening EOP1 may be greater than a total area of the second contact electrode part EP2 surrounding the second electrode opening EOP2.

It has been illustrated in the present embodiment that areas of the first electrode opening EOP1 and the second electrode opening EOP2 in plan view are the same as each other, but the present invention is not limited thereto. In some embodiments of the present invention, areas of the first electrode opening EOP1 and the second electrode opening EOP2 in plan view may be different from each other. For example, an area of the first electrode opening EOP1 in plan view may be smaller than an area of the second electrode opening EOP2 in plan view. Accordingly, a difference between the total area of the first contact electrode part EP1 and the total area of the second contact electrode part EP2 may increase.

The area, in plan view, of the first contact electrode CE1_1 connected to the first sensing connection line RL1 is greater than the area, in plan view, of the second contact electrode CE2_1 connected to the second sensing connection line RL2, and accordingly, an area of the first contact electrode CE1_1 overlapping the first touch electrode RE_1 positioned in the first column of the first row in the thickness direction may be greater than an area of the second contact electrode CE2_1 overlapping the first touch electrode RE_1 positioned in the second column of the second row in the thickness direction.

Figure 16:
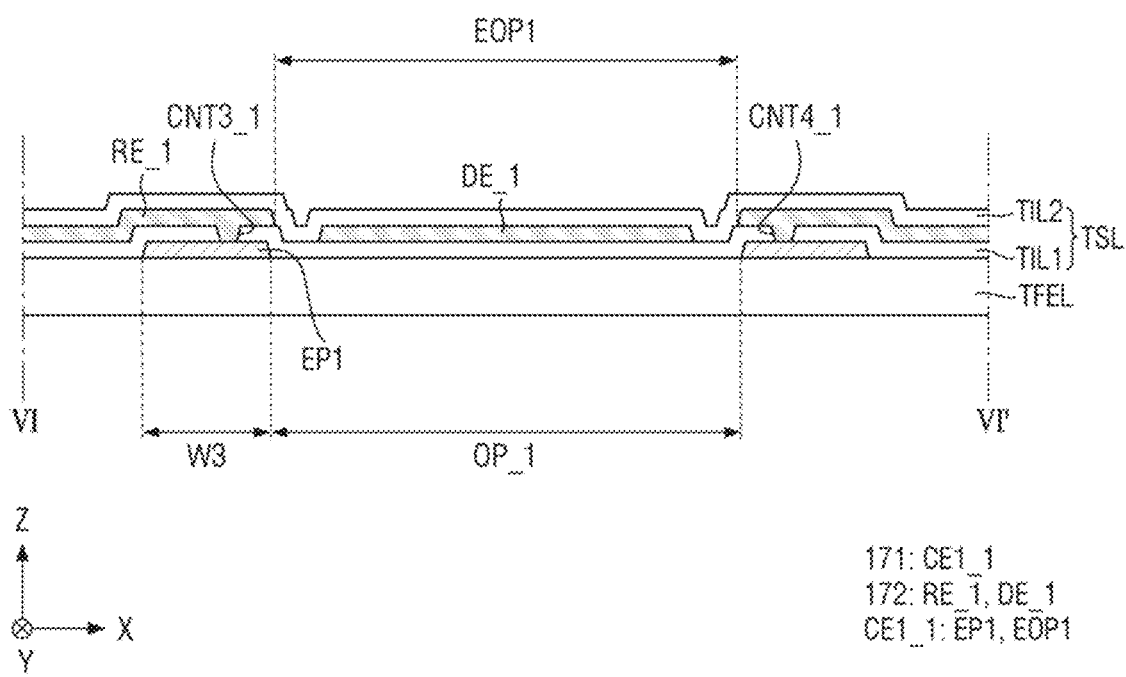
FIG. 16 is a cross-sectional view taken along line VI-VI' of FIG. 14 according to an embodiment of the present invention.
Figure 17:
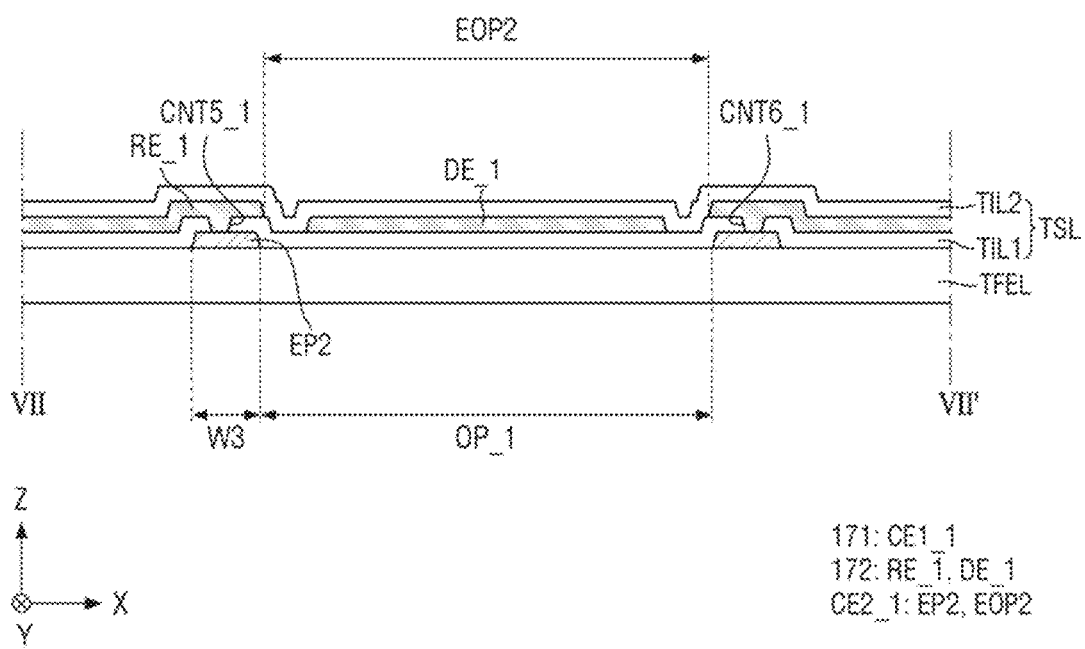
FIG. 17 is a cross-sectional view taken along line VII-VII' of FIG. 15 according to an embodiment of the present invention.

FIG. 16 is a cross-sectional view taken along line VI-VI' of FIG. 14 according to another embodiment. FIG. 17 is a cross-sectional view taken along line VII-VII' of FIG. 15 according to another embodiment.

Referring further to FIGS. 16 and 17 together with FIGS. 14 and 15, in the present embodiment, unlike an embodiment illustrated in FIGS. 11 and 12, the first contact electrode parts EP1 of the first contact electrode CE1_1 may be disposed to be spaced apart from each other in the first direction (X-axis direction) with the first electrode opening EOP1 interposed therebetween, from a cross-sectional view, and the second contact electrode parts EP2 of the second contact electrode CE2_1 may be disposed to be spaced apart from each other in the first direction (X-axis direction) with the second electrode opening EOP2 interposed therebetween, from a cross-sectional view. In addition, the first contact electrode part EP1 and the second contact electrode part EP2 may overlap the first touch electrodes RE_1 in the thickness direction.

The first contact electrode parts EP1 may be electrically connected to the first touch electrodes RE_1 through a third contact hole CNT3_1 and a fourth contact hole CNT4_1 penetrating through the first sensing insulating layer TIL1, and the second contact electrode parts EP2 may be electrically connected to the first touch electrodes RE_1 through a fifth contact hole CNT5_1 and a sixth contact hole CNT6_1 penetrating through the first sensing insulating layer TIL1.

As described above, the area of the first contact electrode part EP1 is greater than the area of the second contact electrode part EP2, and thus, a width W3 of the first contact electrode part EP1 in the first direction (X-axis direction) may be greater than a width W4 of the second contact electrode part EP2 in the first direction (X-axis direction). Accordingly, an area of the first contact electrode part EP1 overlapping the first touch electrode RE_1 in the thickness direction may be greater than an area of the second contact electrode part EP2 overlapping the first touch electrode RE_1 in the thickness direction.

In addition, each of the first contact electrode part EP1 and the second contact electrode part EP2 might not overlap the dummy electrode DE_1. For example, each of the first contact electrode parts EP1 disposed to be spaced apart from each other with the first electrode opening EOP1 interposed therebetween, from a cross-sectional view, and the second contact electrode parts EP2 disposed to be spaced apart from each other with the second electrode opening EOP2 interposed therebetween, from a cross-sectional view, may overlap the first touch electrode RE_1 in the thickness direction, and the first electrode opening EOP1 and the second electrode opening EOP2 may overlap the dummy electrodes DE_1 in the thickness direction. It has been illustrated in FIGS. 16 and 17 that each of the first electrode opening EOP1 and the second electrode opening EOP2 has the same area in plan view as an opening OP_1 surrounding the dummy electrode DE_1, but the present invention is not limited thereto.

In some embodiments of the present invention, when sizes of the first electrode opening EOP1 and the second electrode opening EOP2 are decreased, the area of the first contact electrode part EP1 and the area of the second contact electrode part EP2 are increased, and accordingly, the first contact electrode part EP1 and the second contact electrode part EP2 may overlap the dummy electrodes DE_1 in the thickness direction. For example, the area of the first contact electrode part EP1 and the area of the second contact electrode part EP2 expand toward the first direction (X-axis direction) in which the first electrode opening EOP1 and the second electrode opening EOP2 are positioned, respectively, and accordingly, a portion of the first contact electrode part EP1 and a portion of the second contact electrode part EP2 may overlap the dummy electrodes DE_1 in the thickness direction.

According to an embodiment of the present invention illustrated in FIGS. 14 to 17, a difference in touch sensitivity between the first touch electrodes RE_1 due to a difference in length between the sensing connection lines RL may be reduced by making the total areas of the contact electrode parts EP different from each other.

Figure 18:
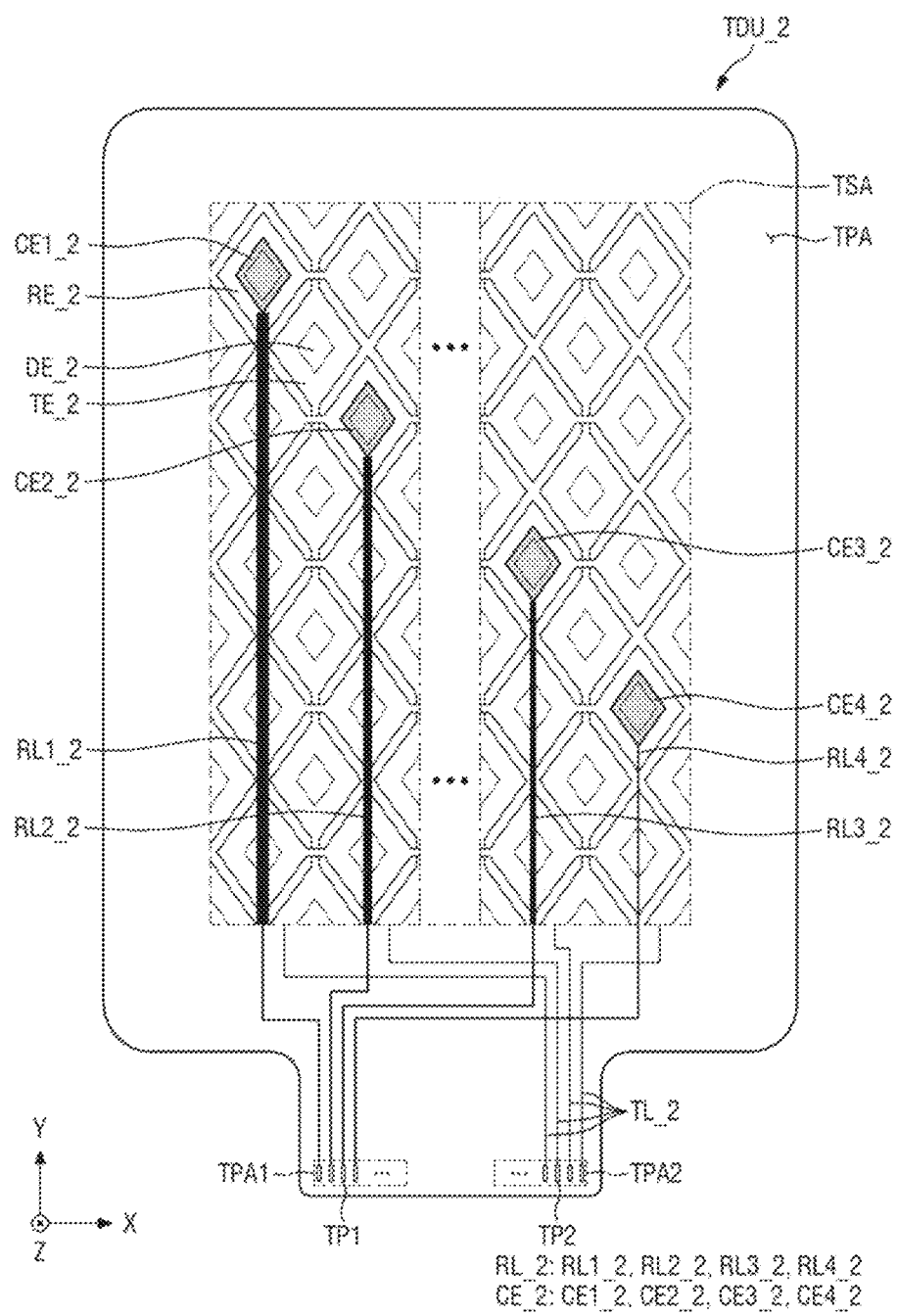
FIG. 18 is a plan view illustrating components related to a sensing unit of FIG. 2 according to an embodiment of the present invention.

FIG. 18 is a plan view illustrating components related to a sensing unit of FIG. 2 according to an embodiment of the present invention. Specifically, FIG. 18 is a plan view illustrating components included in a sensing unit TDU_2 according to an embodiment of the present invention.

Referring to FIG. 18, the present embodiment is different from an embodiment of FIG. 4 in that sizes of areas, in plan view, of contact electrodes CE_2 disposed in the sensing area TSA are the same as each other, and widths of a plurality of sensing connection lines RL_2 connected to one ends of the contact electrodes CE_2 are different from each other.

For example, as illustrated in FIG. 18, a first contact electrode CE1_2 may be electrically connected to a first touch electrode RE_2 disposed in a first column of a first row, a second contact electrode CE2_2 may be electrically connected to a first touch electrode RE_2 disposed in a second column of a second row, a third contact electrode CE3_2 may be electrically connected to a first touch electrode RE_2 disposed in a third column of a third row, a fourth contact electrode CE4_2 may be electrically connected to a first touch electrode RE_2 disposed in a fourth column of a fourth row, and areas of the contact electrodes CE_2 in plan view may be the same as each other.

The sensing connection lines RL_2 connected to the contact electrodes CE_2 may be disposed at the same layer as the contact electrodes CE_2, and one ends of the sensing connection lines RL_2 may be electrically connected to the contact electrodes CE_2 and the other ends of the sensing connection lines RL_2 may be connected to the first touch pads TP1 positioned in the first sensing pad area TPA1.

In some of the sensing connection lines RL_2, a width of the sensing connection line RL_2 positioned in the sensing area TSA and a width of the sensing connection line RL_2 positioned in the sensing peripheral area TPA may be different from each other. For example, a width of a first sensing connection line RL1_2 positioned in the sensing area TSA may be greater than a width of a first sensing connection line RL1_2 positioned in the sensing peripheral area TPA. However, the present invention is not limited thereto, and widths of the sensing connection lines RL_2 positioned in the sensing area TSA and the sensing peripheral area TPA may be the same as each other.

A length of the sensing connection line RL_2 connected to the contact electrode CE_2 disposed to be relatively far away from the sensing pad areas TPA1 and TPA2 in the second direction (Y-axis direction) may be greater than a length of the sensing connection line RL_2 connected to the contact electrode CE_2 disposed to relatively more adjacent to the sensing pad areas TPA1 and TPA2 in the second direction (Y-axis direction).

Widths of the sensing connection lines RL_2 positioned in the sensing area TSA may be different from each other. The width of the sensing connection line RL_2 may include both a width in the first direction (X-axis direction) and a width in the third direction (Z-axis direction). For example, a width of the first sensing connection line RL1_2 connected to the first contact electrode CE_2 and disposed in the sensing area TSA may be greater than a width of a fourth sensing connection line RL4_2 connected to the fourth contact electrode CE4_2 and disposed in the sensing area TSA. For example, the width of the first sensing connection line RL1_2 disposed in the sensing area TSA may be greater than a width of a second sensing connection line RL2_2 disposed in the sensing area TSA. As an additional example, the width of the second sensing connection line RL2_2 disposed in the sensing area TSA may be greater than a width of a third sensing connection line RL3_2 disposed in the sensing area TSA, and the width of the third sensing connection line RL3_2 disposed in the sensing area TSA may be greater than the width of the fourth sensing connection line RL4_2 disposed in the sensing area TSA. In other words, the widths of the sensing lines RL_2 each connected to the contact electrodes CE_2 and disposed in the sensing area TSA may be proportional to lengths of the sensing connection lines RL_2.

Driving connection lines TL_2 may be disposed at the same layer as second touch electrodes TE_2, and one ends of the driving connection lines TL_2 may be electrically connected to the second touch electrodes TE_2 and the other ends of the driving connection lines TL_2 may be connected to the second touch electrodes TP2.

The driving connection lines TL_2 may extend from the sensing peripheral area TPA in which the second touch pads TP2 are disposed to an edge of the sensing area TSA, and may be electrically connected to the second touch electrode TE_2 at the edge of the sensing area TSA. All of widths of the driving connection lines TL_2 may be the same as each other unlike the sensing connection lines RL_2.

According to the present embodiment, a difference in resistance between the sensing connection lines RL_2 due to a difference in length may be compensated for or offset by the sensing connection lines RL_2 that are each connected to the contact electrodes CE_2 having the same area as each other in the sensing area TSA and have line widths increasing as lengths increase. Accordingly, touch sensitivity of the first touch electrodes RE_2 disposed in the sensing area TSA may be kept substantially constant.

Figure 19:
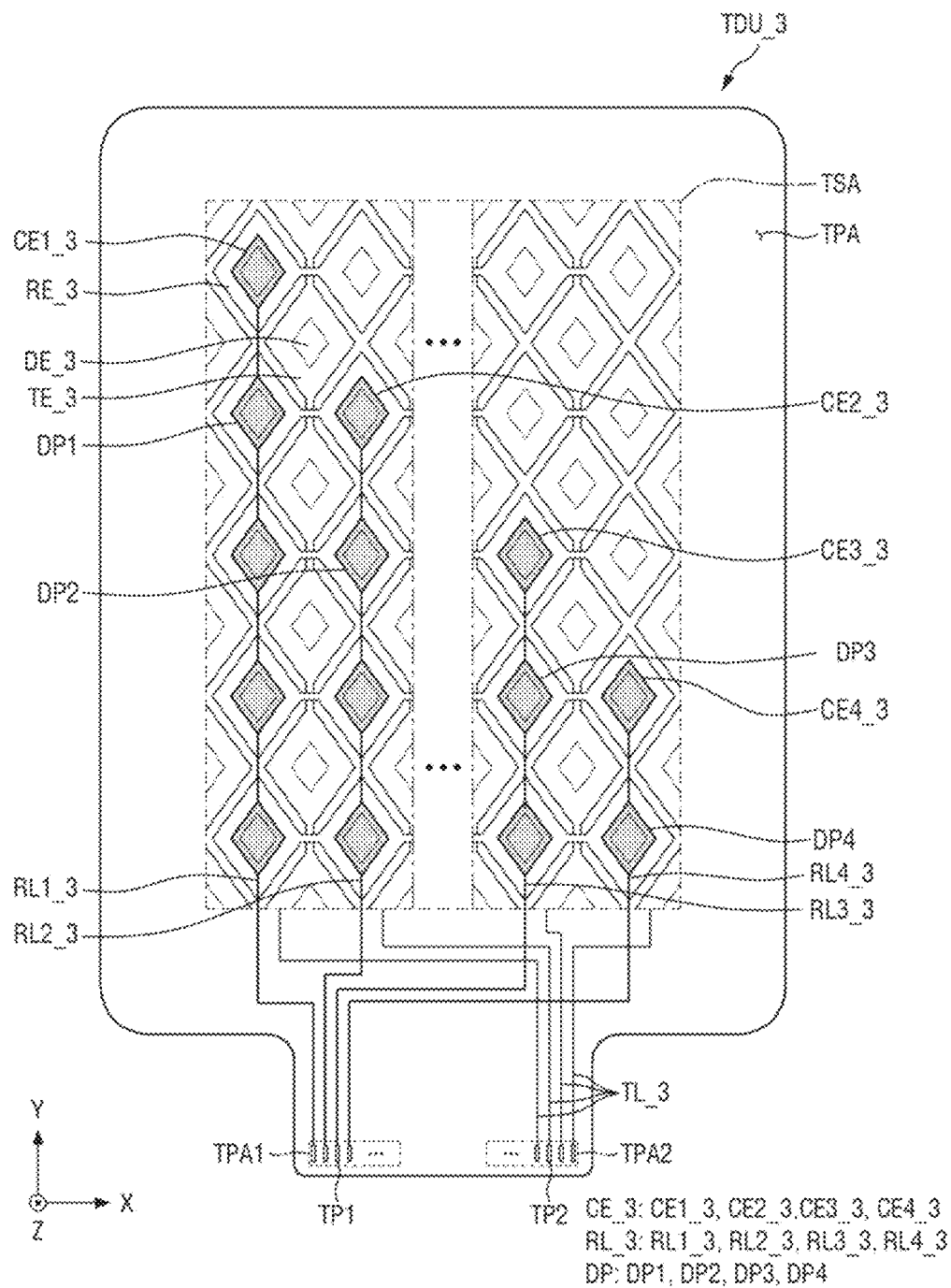
FIG. 19 is a plan view illustrating components related to a sensing unit of FIG. 2 according to an embodiment of the present invention.

FIG. 19 is a plan view illustrating components related to a sensing unit of FIG. 2 according to still another embodiment. Specifically, FIG. 19 is a plan view illustrating components included in a sensing unit TDU_3 according to an embodiment of the present invention.

Referring to FIG. 19, the present embodiment is different from an embodiment of FIG. 18 in that sensing connection lines RL_3 connected to contact electrodes CE_3 have the same width and a plurality of protrusion parts DP protruding from the sensing connection line RL_3 are further included.

For example, as illustrated in FIG. 19, a first contact electrode CE1_3 may be electrically connected to a first touch electrode RE_3 disposed in a first column of a first row, a second contact electrode CE2_3 may be electrically connected to a first touch electrode RE_3 disposed in a second column of a second row, a third contact electrode CE3_3 may be electrically connected to a first touch electrode RE_3 disposed in a third column of a third row, a fourth contact electrode CE4_3 may be electrically connected to a first touch electrode RE_3 disposed in a fourth column of a fourth row, and areas of the contact electrodes CE_3 in plan view may be the same as each other.

Widths of the sensing connection lines RL_3 positioned in the sensing area TSA may be the same as each other, and the sensing connection lines RL_3 positioned in the sensing area TSA may include the plurality of protrusion parts DP protruding from the sensing connection lines RL_3, respectively.

The plurality of protrusion parts DP may protrude from the sensing connection lines RL_3 toward one side and the other side in the first direction (X-axis direction), and have a rhombic shape that is the same as that of the first touch electrodes RE_3 and second touch electrodes TE_3 in plan view. However, a shape of the protrusion parts DP in plan view is not limited thereto, and a shape of each of the protrusion parts DP in plan view may be different from the shape of the first touch electrodes RE_3 and the second touch electrodes TE_3 in plan view. For example, each of the protrusion parts DP may have a circular or polygonal shape in plan view.

The plurality of protrusion parts DP protruding from the sensing connection lines RL_3 may be disposed to be spaced apart from each other along the second direction (Y-axis direction), and may overlap the first touch electrodes RE_3 and dummy electrodes DE_3. For example, a plurality of first protrusion parts DP1 protruding from a first sensing connection line RL1_3 that is connected to one end of the first contact electrode CE1_3, which is disposed in the first column of the first row, and is extending along the second direction (Y-axis direction) may be disposed to be spaced apart from each other along the second direction (Y-axis direction). As an example, the plurality of first protrusion parts DP1 may overlap first touch electrodes RE_3 and dummy electrodes DE_3, which are disposed in a first column, in the thickness direction.

Shape and areas, in plan view, of the protrusion parts DP included in each of the sensing connection lines RL_3 disposed in the sensing area TSA may be the same as each other, and the numbers of protrusion parts DP included in each of the sensing connection lines RL_3 may be different from each other. For example, the number of first protrusion parts DP1 included in the first sensing connection line RL1_3 connected to the first contact electrode CE1_3 and disposed in the sensing area TSA may be greater than the number of fourth protrusion parts DP4 included in a fourth sensing connection line RL4_3 connected to the fourth contact electrode CE4_3 and disposed in the sensing area TSA.

For example, the number of first protrusion parts DP1 included in the first sensing connection line RL1_3 disposed in the sensing area TSA may be greater than the number of second protrusion parts DP2 included in a second sensing connection line RL2_3 disposed in the sensing area TSA. As another example, the number of second protrusion parts DP2 included in the second sensing connection line RL2_3 disposed in the sensing area TSA may be greater than the number of third protrusion parts DP3 included in a third sensing connection line RL3_3 disposed in the sensing area TSA, and the number of third protrusion parts DP3 included in the third sensing connection line RL3_3 disposed in the sensing area TSA may be greater than the number of fourth protrusion parts DP4 included in the fourth sensing connection line RL4_3 disposed in the sensing area TSA. In other words, the numbers of protrusion parts DP included in each of the sensing lines RL_3 each connected to the contact electrodes CE_3 and disposed in the sensing area TSA may be proportional to lengths of the sensing connection lines RL_3.

It has been illustrated in an embodiment of the present invention illustrated in FIG. 19 that the shape and the areas, in plan view, of the protrusion parts DP, which are included in the sensing connection lines RL_3 that are disposed in the sensing area TSA, are the same as each other, and the numbers of protrusion parts DP included in the respective sensing connection lines RL_3 are different from each other, but the present invention is not limited thereto. In some embodiments of the present invention, shapes, in plan view, of the protrusion parts DP may be the same as each other, and the numbers of protrusion parts DP, which are included in the sensing connection lines RL_3 that are disposed in the sensing area TSA, may be the same as each other. In some embodiments of the present invention, areas of the protrusion parts DP included in the respective sensing connection lines RL_3 may be different from each other. For example, shapes, in plan view, and the numbers of first protrusion parts DP1 included in the first sensing connection line RL1_3 and fourth protrusion parts DP4 included in the fourth sensing connection line RL4_3 may be the same throughout the first protrusion parts DP1 and the fourth protrusion parts DP4, and an area of each of the first protrusion parts DP1 in plan view may be greater than an area of each of the fourth protrusion parts DP4 in plan view.

According to the present embodiment, a difference in resistance between the sensing connection lines RL_3 due to a difference in length may be compensated for or offset by the sensing connection lines RL_3 that are each connected to the contact electrodes CE_3 having the same area in the sensing area TSA and include the protrusion parts DP having different numbers or different areas from each other. Accordingly, touch sensitivity of the first touch electrodes RE_3 disposed in the sensing area TSA may be kept substantially constant.

Figure 20:
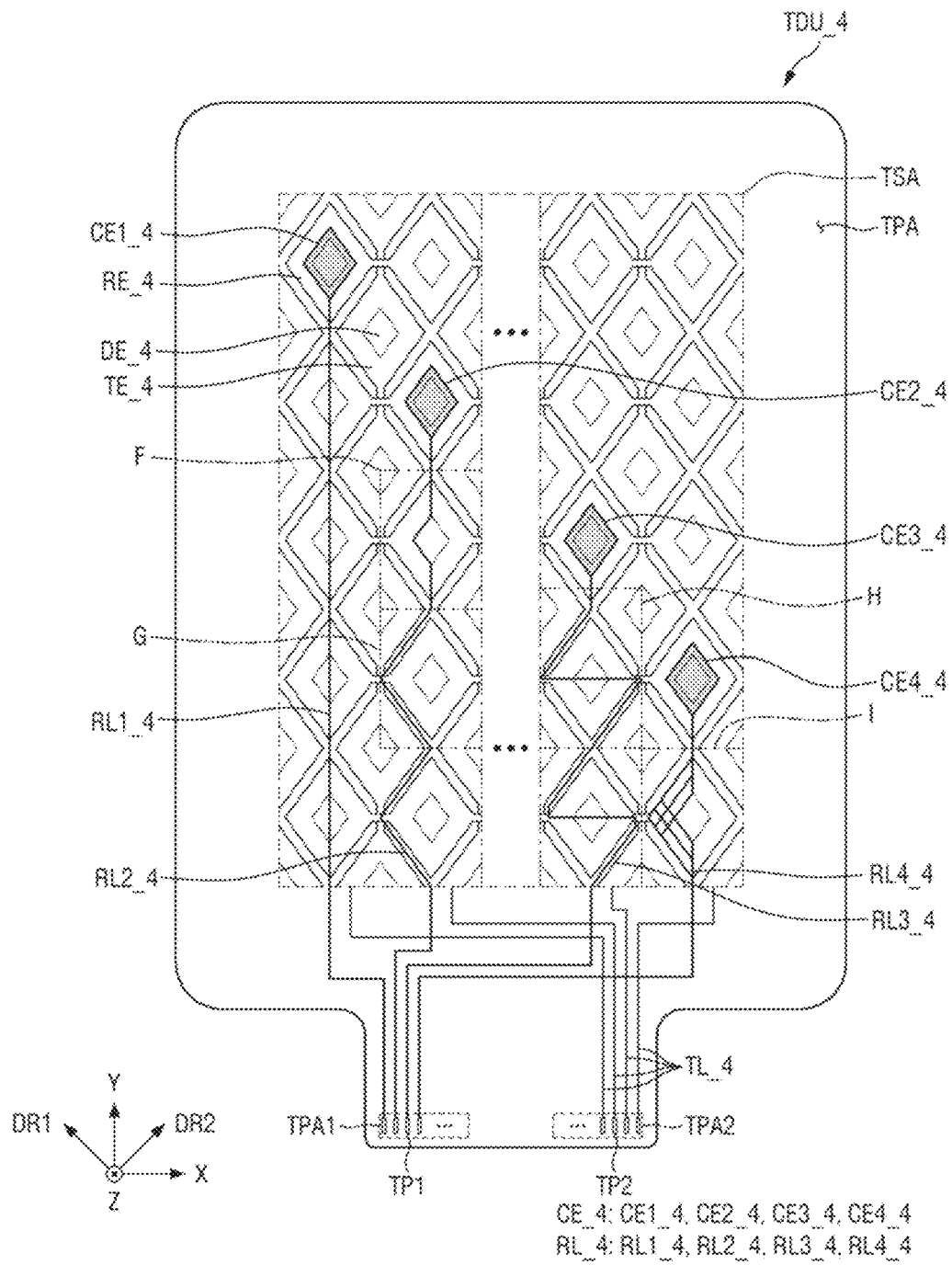
FIG. 20 is a plan view illustrating components related to a sensing unit of FIG. 2 according to an embodiment of the present invention.
Figure 21:
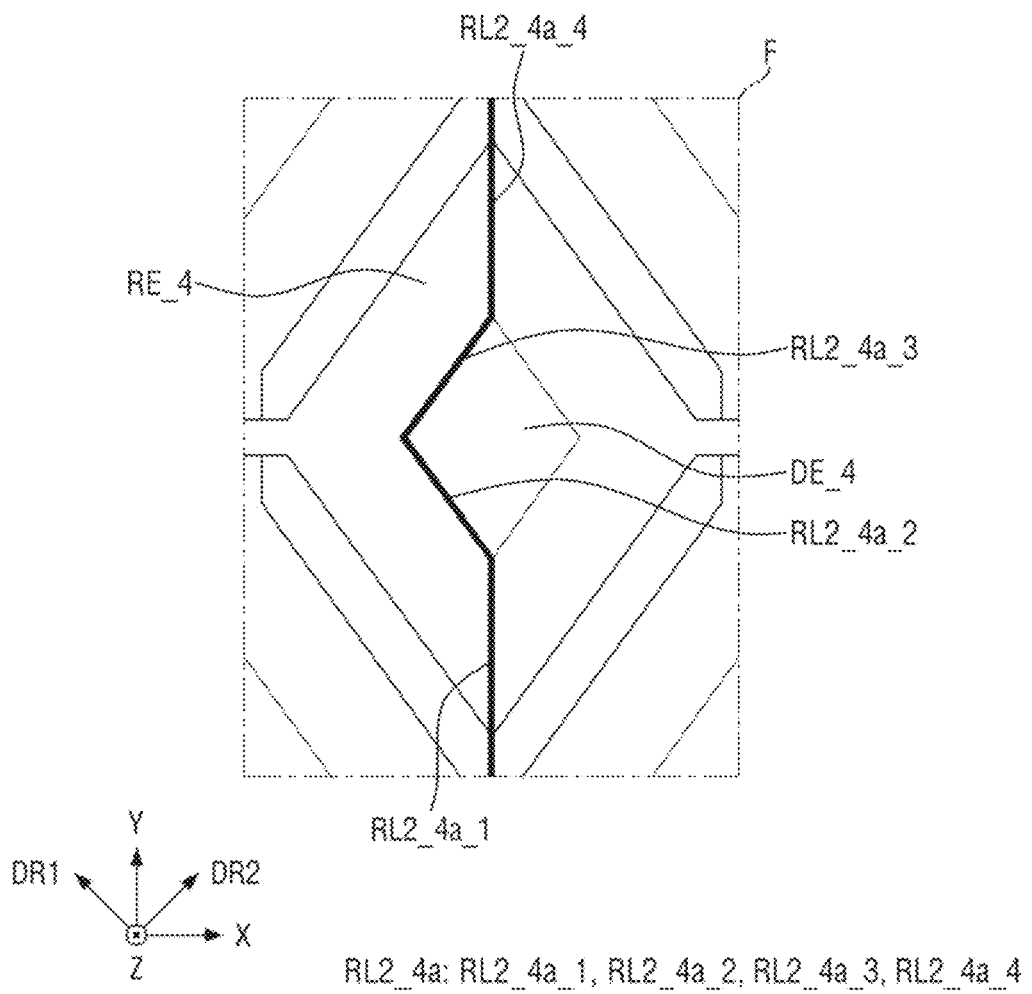
FIG. 21 is an enlarged view of area F of FIG. 20 according to an embodiment of the present invention.
Figure 22:
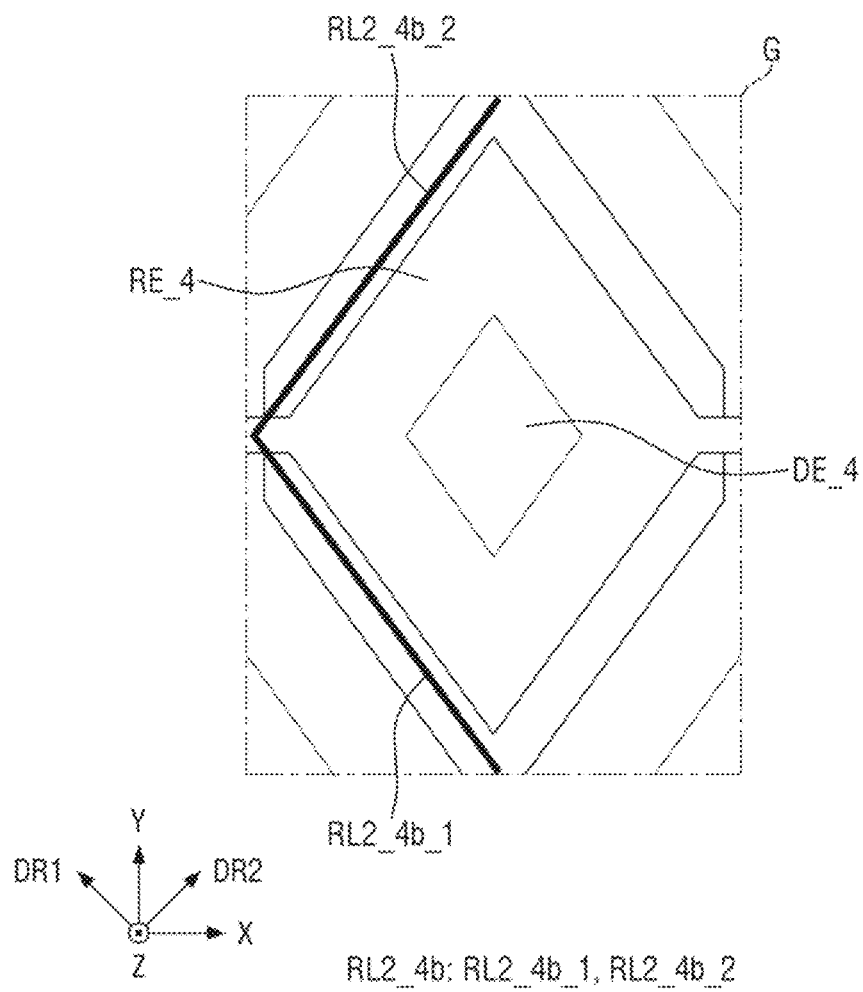
FIG. 22 is an enlarged view of area G of FIG. 20.
Figure 23:
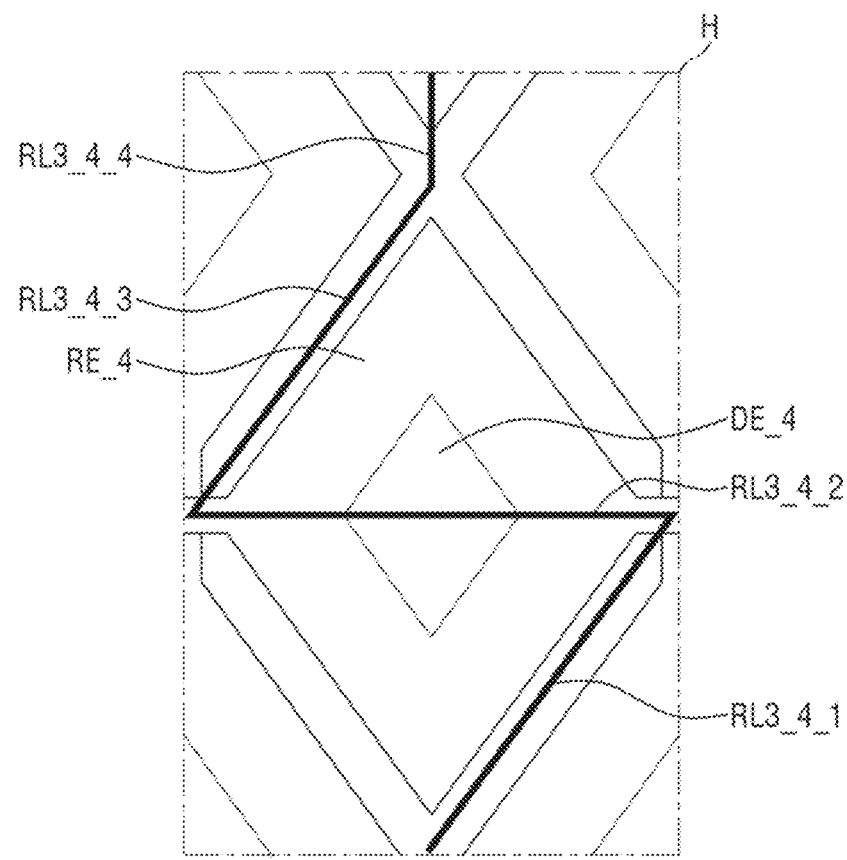
FIG. 23 is an enlarged view of area H of FIG. 20.
Figure 24:
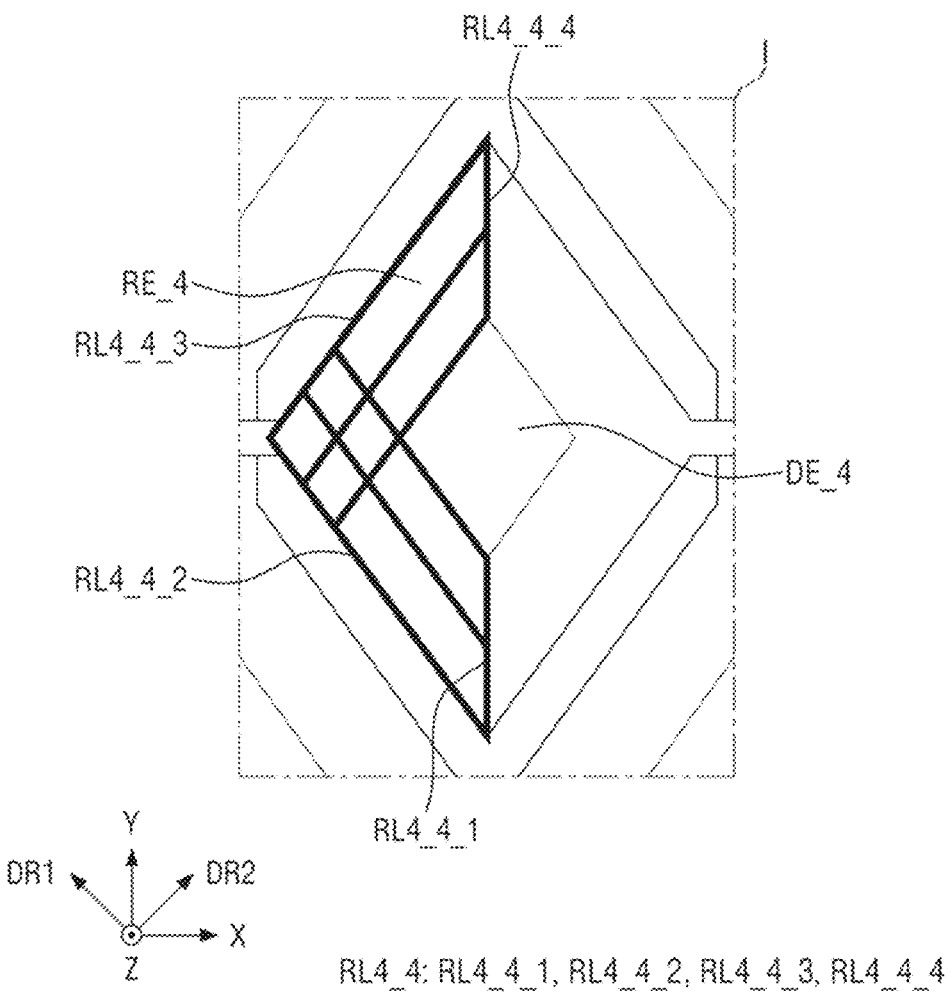
FIG. 24 is an enlarged view of area I of FIG. 20.

FIG. 20 is a plan view illustrating components related to a sensing unit of FIG. 2 according to an embodiment of the present invention. FIG. 21 is an enlarged view of area F of FIG. 20 according to an embodiment of the present invention. FIG. 22 is an enlarged view of area G of FIG. 20. FIG. 23 is an enlarged view of area H of FIG. 20. FIG. 24 is an enlarged view of area I of FIG. 20 according to an embodiment of the present invention. Specifically, FIG. 20 is a plan view illustrating components included in a sensing unit TDU_4 according to an embodiment of the present invention, and FIGS. 21 to 24 are views illustrating various forms of sensing connection lines RL_4 disposed in a sensing area TSA.

Referring to FIG. 20, the present embodiment is different from an embodiment illustrated in FIG. 19 in that arrangement forms of sensing connection lines RL_4 connected to and extending from one ends of contact electrodes CE_4 disposed in the sensing area TSA are different from each other.

For example, a first sensing connection line RL1_4 connected to one end of a first contact electrode CE1_4 disposed in a first column of a first row may extend in the second direction (Y-axis direction). For example, the first sensing connection line RL1_4 may extend in the second direction (Y-axis direction) and overlap first touch electrodes RE_4 and dummy electrodes DE_4 disposed in a first column, in the thickness direction.

Referring further to FIGS. 21 and 22 together with FIG. 20, a second sensing connection line RL2_4 connected to one end of a second contact electrode CE2_4 disposed in a second column of a second row may include a first sub-connection line RL2_4a and a second sub-connection line RL2_4b that have different arrangement forms in the sensing area TSA.

As illustrated in FIG. 21, the first sub-connection line RL2_4a may include a first portion RL2_4a_1 connected to a second sub-connection line RL2_4b (see FIG. 22) to be described later, a second portion RL2_4a_2 extending from an end of the first portion RL2_4a_1, a third portion RL2_4a_3 extending from an end of the second portion RL2_4a_2, and a fourth portion RL2_4a_4 extending from an end of the third portion RL2_4a_3 and connected to the second contact electrode CE2_4.

For example, the first portion RL2_4a_1 may extend along the second direction (Y-axis direction) and overlap a first touch electrode RE_4 in the thickness direction. For example, one end of the first portion RL2_4a_1 may be connected to the second sub-connection line RL2_4b, and the other end of the first portion RL2_4a_1 may be connected to the second portion RL2_4a_2.

The second portion RL2_4a_2 may extend from the end of the first portion RL2_4a_1 along a first diagonal direction DR1 crossing the first direction (X-axis direction) and the second direction (Y-axis direction). For example, the second portion RL2_4a_2 may be disposed along one side of a dummy electrode DE_4 that extends along the first diagonal direction DR1.

The third portion RL2_4a_3 may extend from the end of the second portion RL2_4a_2 and may extend along a second diagonal direction DR2 crossing the first diagonal direction DR1. For example, the third portion RL2_4a_3 may be disposed along another side of the dummy electrode DE_4 that extends along the second diagonal direction DR2 from one side of the dummy electrode DE_4 on which the second portion RL2_4a_2 is disposed.

The fourth portion RL2_4a_4 may extend along the second direction (Y-axis direction) and overlap a first touch electrode RE_4 in the thickness direction. One end of the fourth portion RL2_4a_4 may be connected to the third portion RL2_4a_3, and the other end of the fourth portion RL2_4a_4 may be connected to the first contact electrode CE1_4.

As illustrated in FIGS. 20 and 22, the second sub-connection line RL2_4b of the second sensing connection line RL2_4 may include a first portion RL2_4b_1 and a second portion RL2_4b_2. The first portion RL2_4b_1 may be connected to a second sub-connection line RL2_4b of any one second sensing connection line RL2_4 that are disposed adjacent in the second direction (Y-axis direction), and the second portion RL2_4b_2 may extend from an end of the first portion RL2_4b_1 and may be connected to the first sub-connection line RL2_4a described above.

For example, the first portion RL2_4b_1 may extend along the first diagonal direction DR1 from an end of the second portion RL2_4b_2 of any one second sub-connection line RL2_4b that is disposed adjacent thereto in the second direction (Y-axis direction). For example, the first portion RL2_4b_1 may be disposed along one side of a first touch electrode RE_4 extending along the first diagonal direction DR1.

The second portion RL2_4b_2 may extend from the end of the first portion RL2_4b_1 and may extend in the second diagonal direction DR2. For example, the second portion RL2_4b_2 may be disposed along another side of the first touch electrode RE_4 that extends along the second diagonal direction DR2 from one side of the first touch electrode RE_4 on which the first portion RL2_4b_1 is disposed.

As illustrated in FIGS. 20 and 23, a third sensing connection line RL3_4 may include a first portion RL3_4_1 connected to a third sensing connection line RL3_4 that is disposed adjacent thereto in the second direction (Y-axis direction), a second portion RL3_4_2 extending from an end of the first portion RL3_4_1, a third portion RL3_4_3 extending from the second portion RL3_4_2, and a fourth portion RL3_4_4 extending from the third portion RL3_4_3 and connected to a third contact electrode CE3_4.

For example, the first portion RL3_4_1 may extend along the second diagonal direction DR2 from an end of a third portion RL3_4_2 of any one second sensing connection line RL3_4 that is disposed adjacent thereto in the second direction (Y-axis direction). For example, the first portion RL3_4_1 may be disposed along one side of a first touch electrode RE_4 that extends along the second diagonal direction DR2.

The second portion RL34_2 may extend from the end of the first portion RL3_4_1 in the first direction (X-axis direction). For example, one end of the second portion RL3_4_2 may extend from the end of the first portion RL3_4_1 along the first direction (X-axis direction), and the second portion RL3_4_2 may overlap a first touch electrode RE_4 and a dummy electrode DE_4 in the thickness direction. The other end of the second portion RL3_4_2 may be connected to the third portion RL3_4_3.

The third portion RL3_4_3 may extend from the other end of the second portion RL3_4_2 along the second diagonal direction DR2. For example, the third portion RL3_4_3 may be disposed along another side of the first touch electrode RE_4 opposing one side of the first touch electrode RE_4 on which the first portion RL3_4_1 is disposed, in the first diagonal direction DR1.

One end of the fourth portion RL3_4_4 may extend along the second direction (Y-axis direction) from an end of a third portion RL3_4_3 of any one third sensing connection line RL3_4 that is disposed adjacent thereto in the second direction (Y-axis direction), and the fourth portion RL3_4_4 may be connected to the third contact electrode CE3_4. However, the third portion RL3_4_3 of the third sensing connection line RL3_4 that is disposed to be spaced apart from the fourth portion RL3_4_4 of the third sensing connection line RL3_4 in the second direction (Y-axis direction), and accordingly, is not disposed adjacent to the fourth portion RL3_4_4 may be connected to the first portion RL3_4_1 of the third sensing connection line RL3_4 disposed adjacent in the second direction (Y-axis direction).

As illustrated in FIGS. 20 and 24, a fourth sensing connection line RL4_4 may overlap a first touch electrode RE_4 in the thickness direction, and may be disposed to have a predetermined pattern in plan view. For example, a pattern of the fourth sensing connection line RL4_4 in plan view may have a mesh shape or a net shape including different sizes, as illustrated in FIGS. 20 and 24. However, the pattern of the fourth sensing connection line RL4_4 in plan view is not limited thereto, and the fourth sensing connection line RL4_4 may be disposed to have various patterns.

The fourth sensing connection line RL4_4 may include a first portion RL4_4_1 extending in the second direction (Y-axis direction), a plurality of second portions RL4_4_2 extending from the first portion RL4_4_1 along the first diagonal direction DR1, a plurality of third portions RL4_4_3 extending from the second portions RL4_4_2 along the second diagonal direction DR2, and a fourth portion RL4_4_4 connected to ends of the plurality of third portions RL4_4_3 and extending along the second direction (Y-axis direction).

For example, the second portions RL4_4_2 may have different lengths, and may extend from different positions of the first portion RL4_4_1 toward the first diagonal direction DR1.

The third portions RL4_4_3 may have different lengths, similar to the second portions RL4_4_2, and may extend along the second diagonal direction DR2 from different positions of any one second portion RL4_4_2 disposed along a side of the first touch electrode RE_4 among the plurality of second portions RL4_4_2.

In addition, the plurality of second portions RL4_4_2 and the plurality of third portions RL4_4_3 may extend along the first diagonal direction DR1 and the second diagonal direction DR2, respectively, and may be disposed to cross each other in plan view. Accordingly, the plurality of second portions RL4_4_2 and the plurality of third portions RL4_4_3 are disposed to cross each other, and thus, the fourth sensing connection line RL4_4 may have a mesh shape or a net shape in plan view.

The ends of the third portions RL4_4_3 extending along the second diagonal direction DR2 may be disposed to be spaced apart from the first portion RL4_4_1 with a dummy electrode DE_4 interposed therebetween in the second direction (Y-axis direction), and may be connected to the fourth portion RL4_4_4 extending in the second direction (Y-axis direction). For example, the third portions RL4_4_3 extending along the second diagonal direction DR2 may be connected to the fourth portion RL4_4_4 at different positions.

According to the present embodiment, a difference in resistance between the sensing connection lines RL_4 may be compensated for or offset by disposing the sensing connection lines RL_4 each connected to the contact electrodes CE_4 having the same area in the sensing area TSA in different forms so that a difference in length between the sensing connection lines RL_4 is minimized. Accordingly, touch sensitivity of the first touch electrodes RE_4 disposed in the sensing area TSA may be kept substantially constant.

Figure 25:
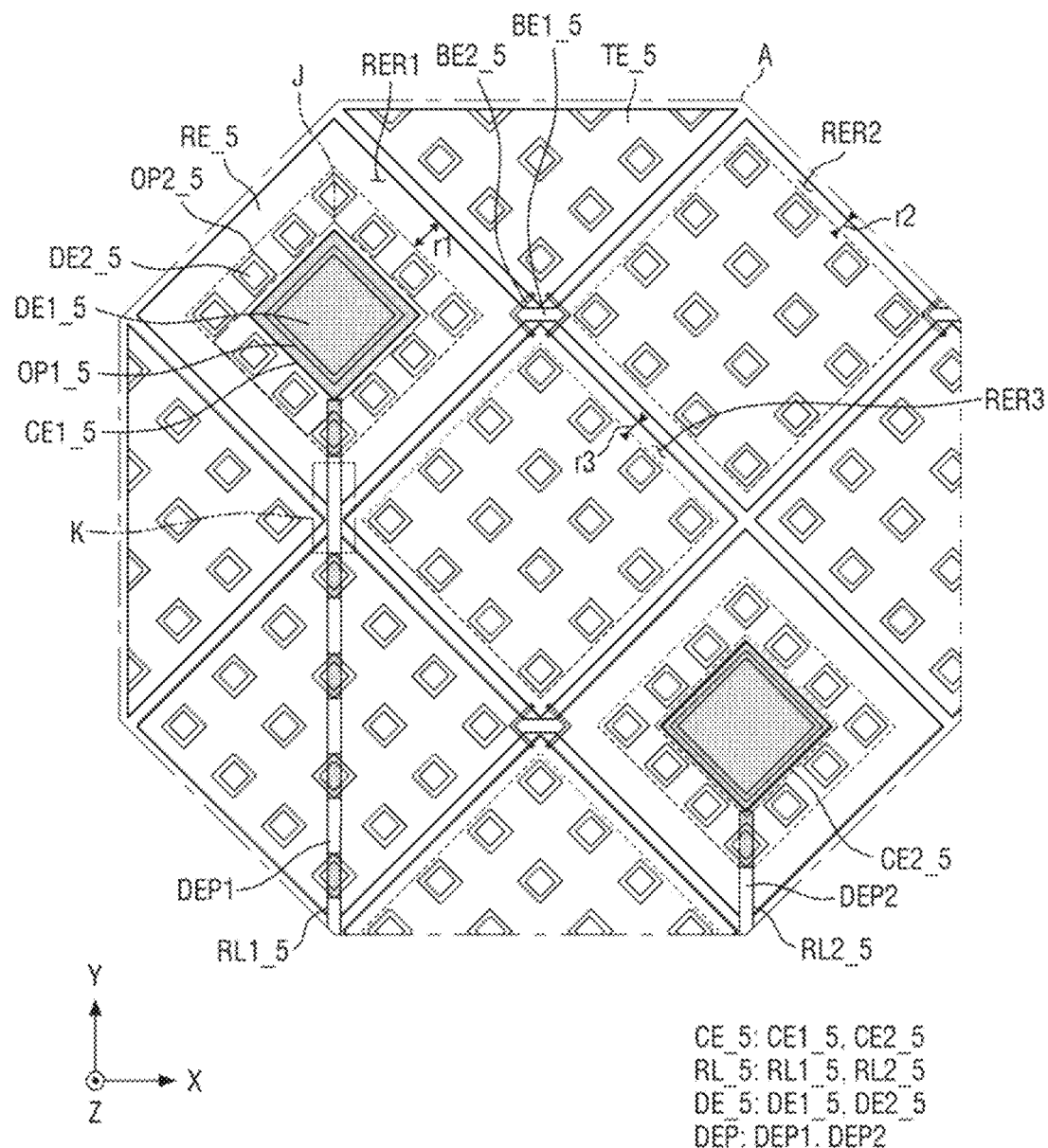
FIG. 25 is an enlarged view of area A of FIG. 4 according to an embodiment of the present invention.
Figure 26:
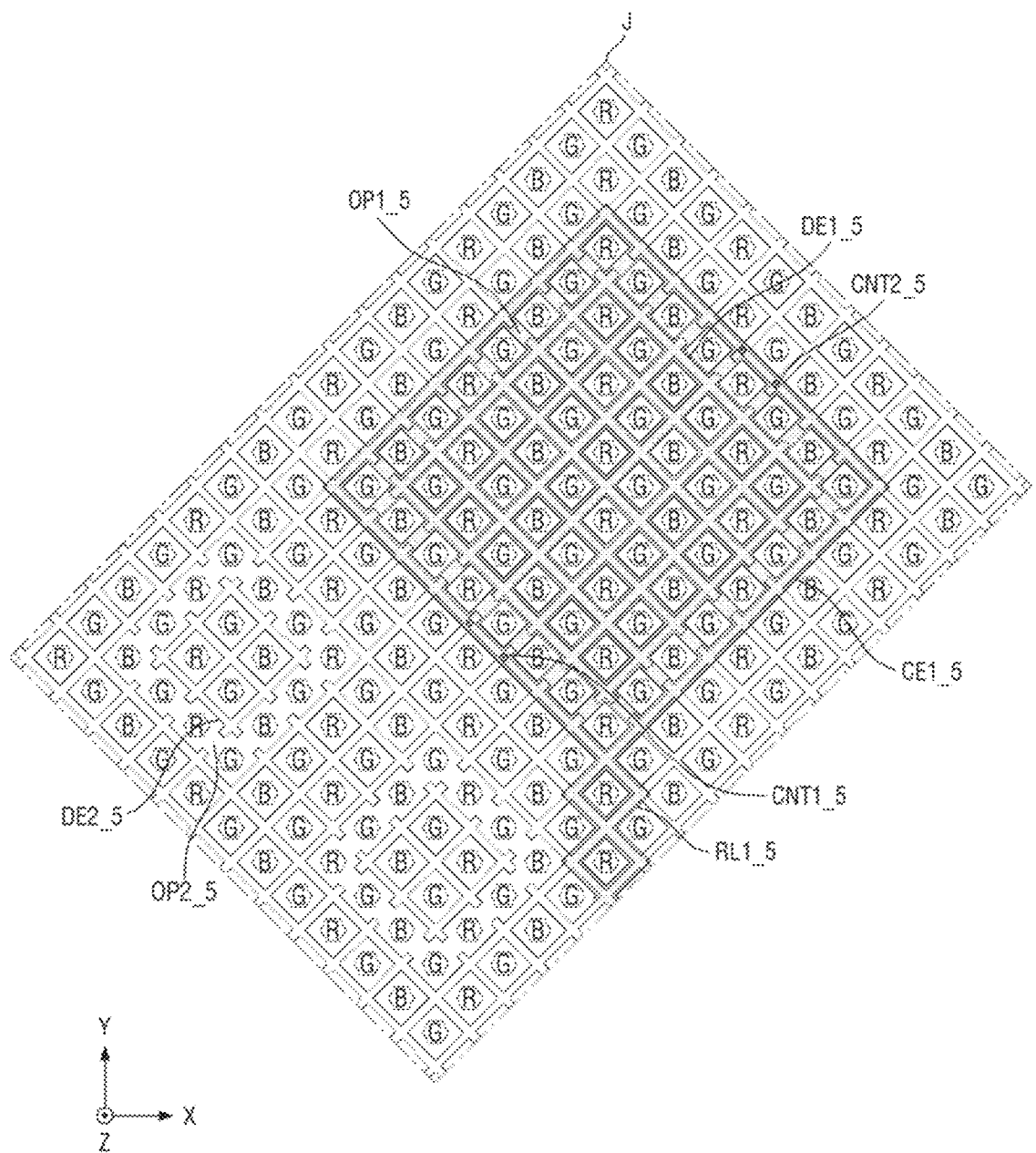
FIG. 26 is an enlarged view of area J of FIG. 25.
Figure 27:
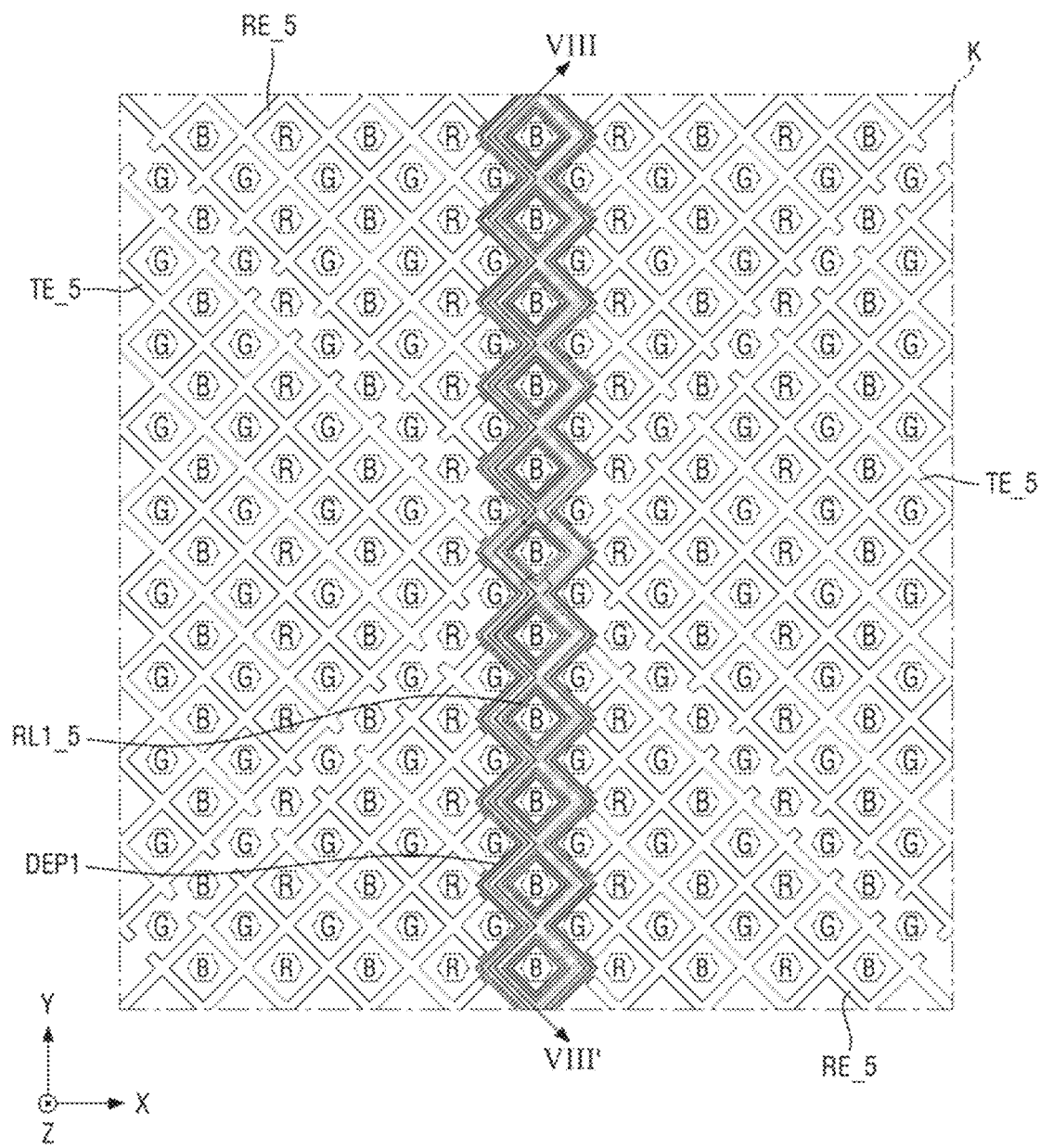
FIG. 27 is an enlarged view of area K of FIG. 25.
Figure 28:
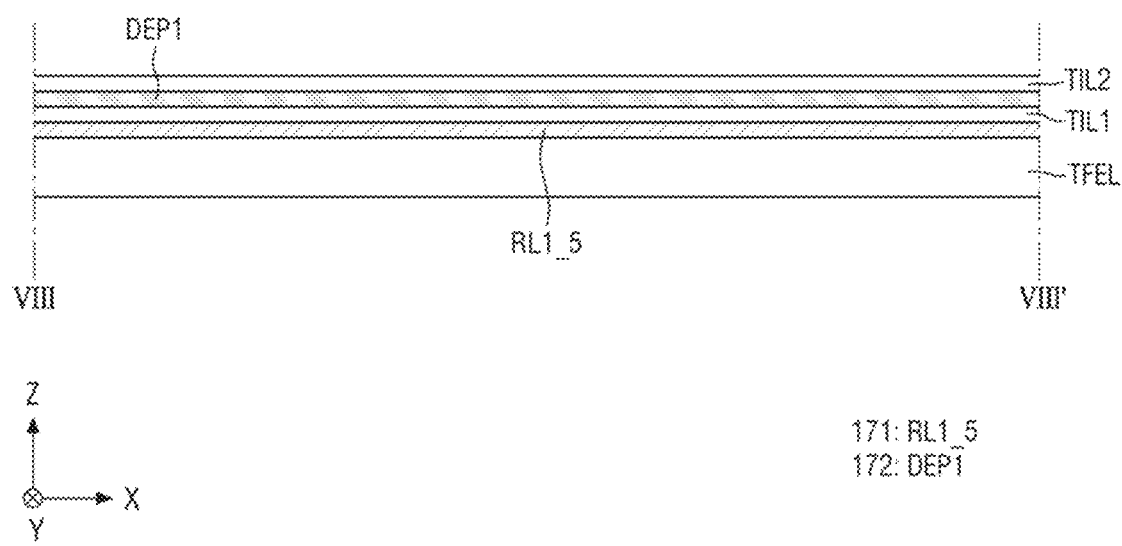
FIG. 28 is a cross-sectional view taken along line VIII-VIII' of FIG. 27.

FIG. 25 is an enlarged view of area A of FIG. 4 according to an embodiment of the present invention. FIG. 26 is an enlarged view of area J of FIG. 25. FIG. 27 is an enlarged view of area K of FIG. 25. FIG. 28 is a cross-sectional view taken along line VII-VIII' of FIG. 27.

Referring to FIG. 25, the present embodiment is different from an embodiment illustrated in FIGS. 4 and 5 in that first touch electrodes RE_5, which is connected to contact electrodes CE_5, among a plurality of first touch electrodes RE_5 include first dummy electrodes DE1_5 and second dummy electrodes DE2_5 having different sizes and numbers. The second touch electrodes TE_5 do not include the first dummy electrodes DE1_5 unlike the first touch electrodes RE_5 connected to the contact electrodes CE_5, and the number of second dummy electrodes DE2_5 included in the second touch electrodes TE_5 is different from the number of second dummy electrodes DE2_5 included in the first touch electrodes RE_5 connected to the contact electrodes CE_5.

In addition, the present embodiment is different from an embodiment illustrated in FIGS. 4 and 5 in that dummy patterns DEP are disposed on sensing connection lines RL_5 that are connected to one ends of a plurality of contact electrodes CE_5.

For example, referring to FIGS. 25 and 26, dummy electrodes DE_5 may include first dummy electrodes DE1_5 and second dummy electrodes DE2_5 having different areas from each other in plan view.

The first dummy electrodes DE1_5 may be disposed to be electrically disconnected from the first touch electrodes RE_5 of first touch electrodes RE_5 connected to the contact electrodes CE_5 among a plurality of first touch electrodes RE_5, and may be surrounded by first openings OP1_5, respectively.

The second dummy electrodes DE2_5 may be electrically disconnected from the first touch electrodes RE_5 and the second touch electrodes TE_5, and may be surrounded by second openings OP2_5, respectively.

An area of the first dummy electrode DE1_5 in plan view may be greater than an area of the second dummy electrodes DE2_5 in plan view, and the number of first dummy electrodes DE1_5 may be smaller than the number of second dummy electrodes DE2_5. For example, the second dummy electrodes DE2_5 may be disposed to surround the first dummy electrodes DE1_5 in the first touch electrodes RE_5 connected to the contact electrodes CE_5, and may be disposed in a matrix form in the first touch electrodes RE_5 that are not connected to the contact electrodes CE_5 and the second touch electrodes TE_5.

The first dummy electrodes DE1_5 may overlap the contact electrodes CE_5 in the thickness direction, and the second dummy electrodes DE2_5 might not overlap the contact electrodes CE_5. For example, as illustrated in FIGS. 25 and 26, a first contact electrode CE1_5 connected to a first touch electrode RE_5 disposed in a first column of a first row through first contact holes CNT1_5 and second contact holes CNT2_5 may overlap the first dummy electrodes DE1_5, and might not overlap the second dummy electrodes DE2_5 disposed to surround the first contact electrode CE1_5.

A width r1 of a first electrode part RER1 of a first touch electrode RE_5 including the first dummy electrode DE1_5 and surrounding the second dummy electrodes DE2_5 may be greater than each of a width r2 of a second electrode part RER2 of a first touch electrode RE_5 that does not include the first dummy electrode DE1_5 and surrounds the second dummy electrodes DE2_5 and a width r3 of a third electrode part RER3 of a second touch electrode TE_5 surrounding the second dummy electrodes DE2_5.

In addition, the width r2 of the second electrode part RER2 of the first touch electrode RE_5 that does not include the first dummy electrode DE1_5 and the width r3 of the third electrode part RER3 of the second touch electrode TE_5 may be the same as each other. However, the present invention is not limited thereto.

Here, each of the first electrode part RER1, the second electrode part RER2, and the third electrode part RER3 might not include the dummy electrode DE_5, and may be an outer area of the first touch electrode RE_5 and/or the second touch electrode TE_5 surrounding the dummy electrode DE_5.

Referring further to FIGS. 27 and 28 together with FIG. 25, the dummy pattern DEP may be formed on the sensing connection line RL_5 connected to one end of each of the contact electrodes CE_5 and extending in the second direction (Y-axis direction).

For example, the dummy pattern DEP may include a first dummy pattern DEP1, which is disposed on a first sensing connection line RL1_5 connected to one end of the first contact electrode CE1_5, and a second dummy pattern DEP2, which is disposed on a second sensing connection line RL2_5 connected to one end of a second contact electrode CE2_5.

The dummy patterns DEP disposed on the sensing connection lines RL_5 may be disposed to be spaced apart from each other along a second direction (Y-axis direction), which is an extension direction of the sensing connection lines RL_5. For example, the dummy patterns DEP are disposed to be spaced apart from each other on the sensing connection line RL_5, and accordingly, may be disposed as island patterns in plan view.

In addition, each of the dummy patterns DEP may be disposed at a different layer from the sensing connection lines RL_5. For example, each of the dummy patterns DEP may be disposed at the same layer as the first touch electrodes RE_5, the first dummy electrodes DE1_5, and the second dummy electrodes DE2_5 and may be disposed to be electrically disconnected to the first touch electrodes RE_5, the first dummy electrodes DE1_5, and the second dummy electrodes DE2_5, and accordingly, may be electrically insulated from the first touch electrodes RE_5, the first dummy electrodes DE1_5, and the second dummy electrodes DE2_5.

In addition, the dummy patterns DEP have a mesh shape or a net shape, similar to the sensing connection lines RL_5, and thus, the sub-pixels R, G, and B may not overlap the dummy patterns DEP. In FIG. 27, the first sensing connection line RL5_1 and the first dummy pattern DEP1 disposed on the first sensing connection line RL5_1 have been mainly illustrated, but the second sensing connection line RL5_2 and the second dummy pattern DEP2 disposed on the second sensing connection line RL5_2 may also have the same shape and arrangement as those illustrated in FIG. 27.

Specifically, as illustrated in FIG. 28, the first dummy pattern DEP1 may overlap the first sensing connection line RL1_5, which is disposed on the thin film encapsulation layer TFEL and formed of the first sensing conductive layer 171, in the thickness direction with the first sensing insulating layer TIL1 interposed therebetween, and the first dummy pattern DEP1 may be covered by the second sensing insulating layer TIL2.

In addition, the first dummy pattern DEP1 may be formed of the second sensing conductive layer 172 including the first touch electrode RE_5, the second touch electrode TE_5, the first dummy electrode DE1_5, and the second dummy electrode DE2_5 illustrated in FIG. 25. However, the present invention is not limited thereto, and the first dummy pattern DEP1 may be made of a material different from that of the second sensing conductive layer 172.

In FIG. 28, the first dummy pattern DEP1 and the first sensing connection line RL1_5 have been mainly described, but such a description may be substantially equally applied to a relationship between the second dummy pattern DEP2 and the second sensing connection line RL2_5.

According to the present embodiment, by removing the electrode part of the first touch electrode RE_5 overlapping the contact electrode CE_5 in the first touch electrode RE_5 connected to the contact electrode CE_5 and disposing the first dummy electrode DE1_5, it is possible to prevent generation of noise due to the overlapping between the contact electrode CE_5 and the first touch electrode RE_5, and by disposing the dummy pattern DEP on the sensing connection line RL_5 connected to the contact electrode CE_5, it is possible to prevent generation of noise due to the sensing connection line RL_5.

Figure 29:
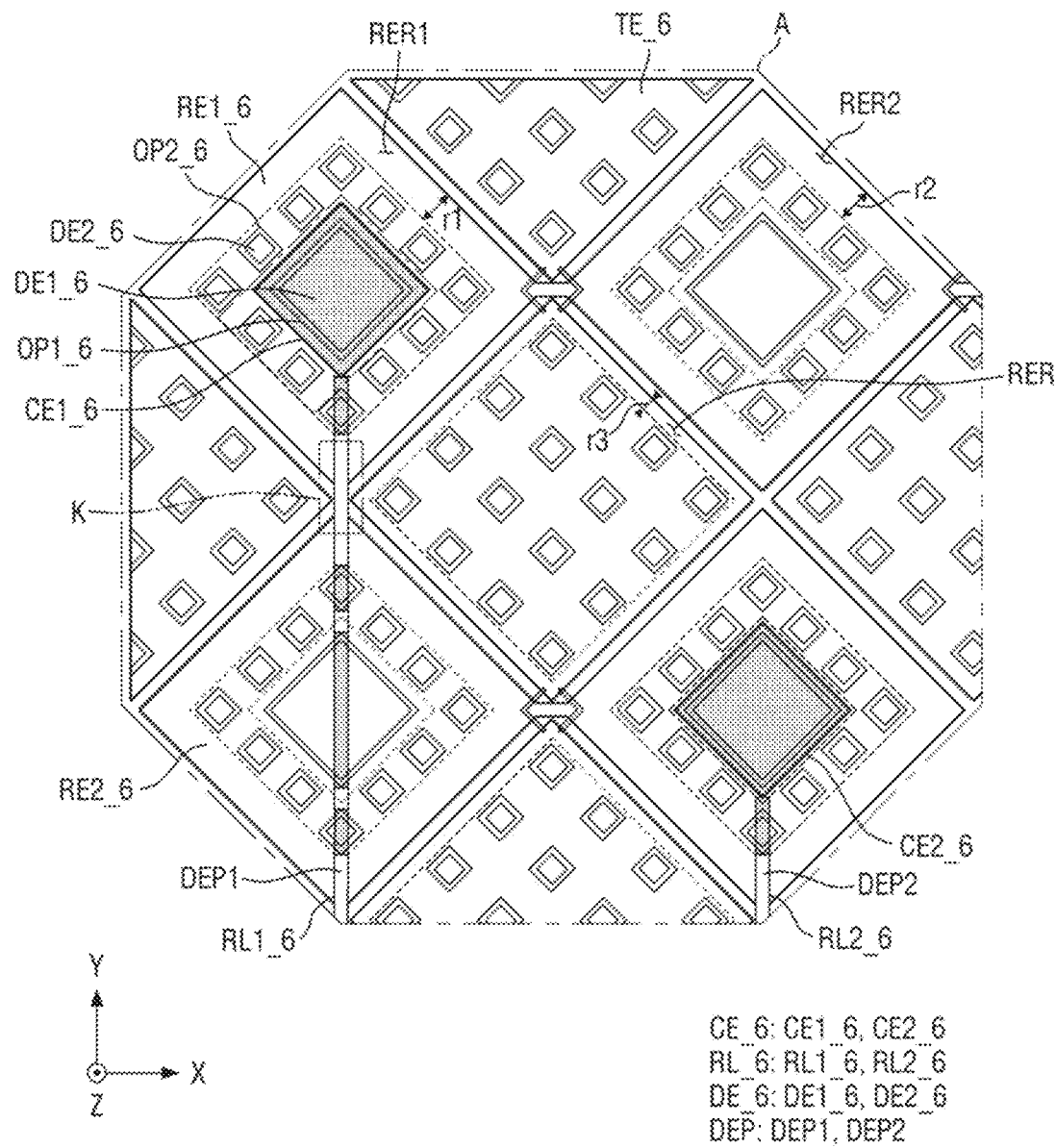
FIG. 29 is an enlarged view of area A of FIG. 4 according to an embodiment of the present invention.

FIG. 29 is an enlarged view of area A of FIG. 4 according to an embodiment of the present invention.

Referring to FIG. 29, unlike an embodiment illustrated in FIG. 25, also on first touch electrodes RE1_6 that are not connected to contact electrodes CE1_6, first dummy electrodes DE1_6 surrounded by first openings OP1_6 may be disposed to be electrically disconnected from first touch electrodes RE1_6. For example, in the present embodiment, the first dummy electrodes DE1_6 may be also disposed on the first touch electrodes RE_6 that are not connected to the contact electrodes CE1_6, and second dummy electrodes DE2_6 may be disposed to at least partially surround the first dummy electrodes DE1_6.

Accordingly, unlike an embodiment of the present invention illustrated in FIG. 25, arrangement forms of the first dummy electrodes DE1_6 and the second dummy electrodes DE2_6 in a plurality of first touch electrodes RE_6 may be the same as each other. In other words, arrangement forms of the first dummy electrodes DE1_6 and the second dummy electrodes DE2_6 in the first touch electrodes RE_6 below which the contact electrode CE_6 is disposed and the first touch electrodes RE_6 below which the contact electrode CE_6 is not disposed may be the same as each other.

Each of dummy patterns DEP disposed on a sensing connection line RL_6 that is connected to one end of each of the contact electrodes CE_6 might not be disposed in an area in which the first dummy electrodes DE1_6 and the sensing connection line RL_6 overlap each other. For example, each of the dummy patterns DEP might not overlap the first dummy electrodes DE1_6.

In addition, unlike an embodiment of the present invention illustrated in FIG. 25, in the present embodiment, a width r1 of a first electrode part RER1 of the first touch electrode RE_6, which is disposed below the contact electrode CE_6 and surrounds the second dummy electrodes DE2_6, may be the same as a width r2 of a second electrode part RER2 of the first touch electrode RE_6, which surrounds the second dummy electrodes DE2_6. For example, the arrangement forms of the first dummy electrode DE1_6 and the second dummy electrode DE2_6 in the first touch electrodes RE_6 are the same as each other, and accordingly, the width r1 of the first electrode part RER1 and the width r2 of the second electrode part RER2 may be substantially the same as each other.

Accordingly, the width r1 of the first electrode part RER1 and the width r2 of the second electrode part RER2 may be greater than a width r3 of a third electrode part RER3 of a second touch electrode TE_6 that does not include the first dummy electrodes DE1_6 and surrounds the second dummy electrodes DE2_6.

According to the present embodiment, by disposing the first dummy electrodes DE_6 also on the first touch electrodes RE_6 below which the contact electrode CE_6 is not disposed, it is possible to unify patterns of the first touch electrodes RE_6 disposed in the sensing area TSA.

Figure 30:
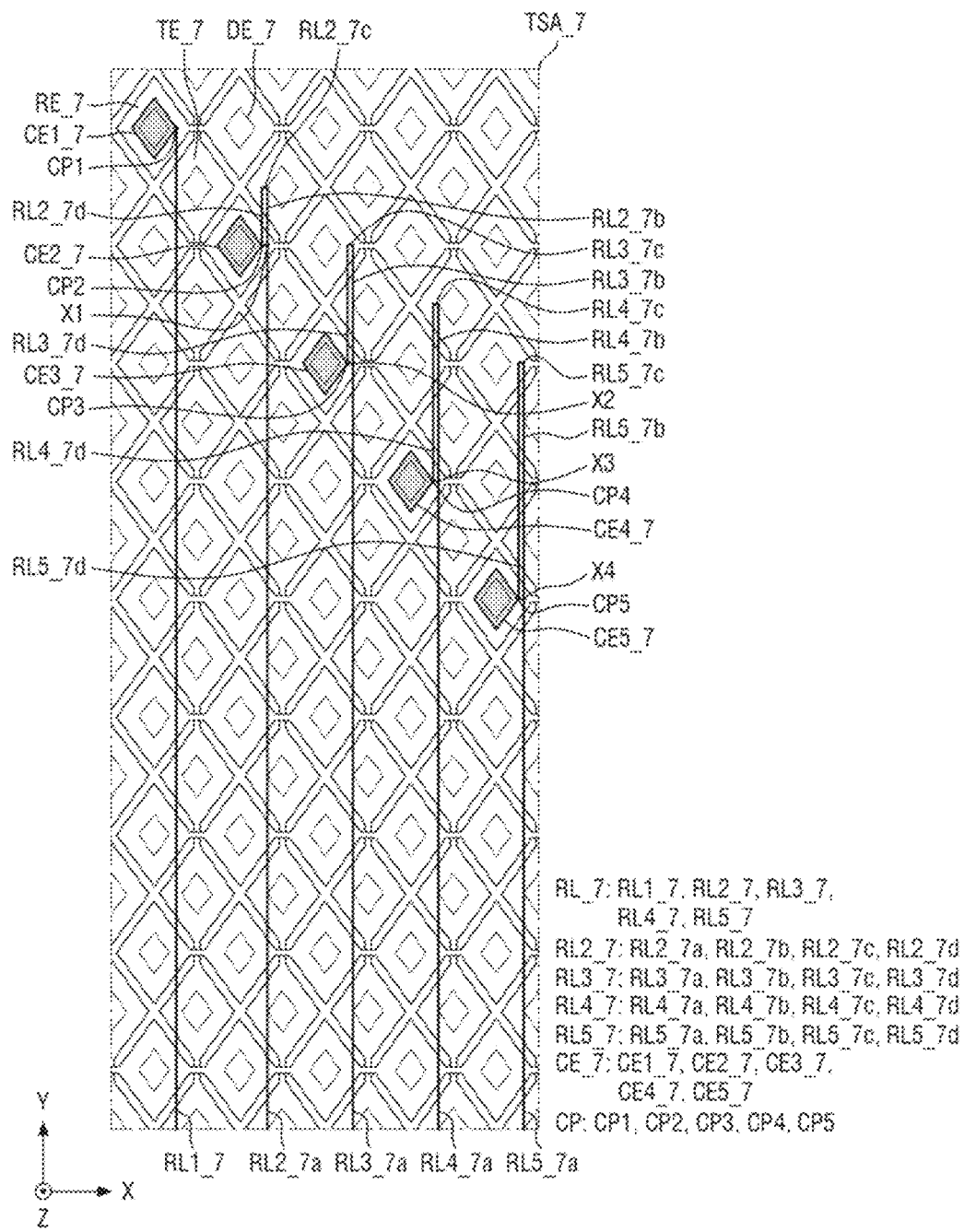
FIG. 30 is a plan view illustrating a sensing area of a display device according to an embodiment of the present invention.

FIG. 30 is a plan view illustrating a sensing area of a display device according to an embodiment of the present invention. Specifically, FIG. 30 is a plan view illustrating an arrangement form of sensing connection lines RL_7 disposed in a sensing area.

Referring to FIG. 30, the present embodiment is different from an embodiment illustrated in FIG. 4 in that all of the lengths of the sensing connection lines RL_7 connected to contact electrodes CE_7 and disposed in a sensing area TSA_7 are the same as each other, and each of the sensing connection lines RL_7 except for a first sensing connection line RL1_7 bypasses the contact electrode CE_7 and is connected to the contact electrode CE_7.

In addition, the present embodiment is different from an embodiment of the present invention illustrated in FIG. 4 in that all of the areas of the contact electrodes CE_7 in plan view are the same as each other.

As illustrated in FIG. 30, each of the sensing connection lines RL_7 is connected to a contact part CP positioned at a right vertex with respect to the center of the contact electrode CE_7 in plan view.

The first sensing connection line RL1_7 extends in the second direction (Y-axis direction) and is connected to a first contact part CP1, and does not include a bypass portion. In addition, each of the sensing connection lines RL_7 except for the first sensing connection line RL1_7 includes a first portion extending in the second direction (Y-axis direction) and a bypasses the contact electrode CE_7 and is connected to the contact electrode CE_7.

For example, a second sensing connection line RL2_7 may include a first portion RL2_7a, a second portion RL2_7b, a third portion RL2_7c, and a fourth portion RL2_7d. The first portion RL2_7a extends along one direction of the second direction (Y-axis direction) up to a first point X1, which is positioned on the same line as a second contact part CP2, along the first direction (X-axis direction). The second portion RL2_7b extends from the first point X1 along one direction of the second direction (Y-axis direction). The third portion RL2_7c extends from the second portion RL2_7b along the first direction (X-axis direction). The fourth portion RL2_7d has the same length as the third portion RL2_7c, and extends from the third portion RL2_7c in the other direction of the second direction (Y-axis direction). In addition, the fourth portion RL2_7d may be connected to the second contact part CP2 of a second contact electrode CE2_7.

A third sensing connection line RL3_7 may include a first portion RL3_7a extending along one direction of the second direction (Y-axis direction) up to a second point X2 positioned on the same line as a third contact part CP3 along the first direction (X-axis direction), a second portion RL3_7b extending from the second point X2 along one direction of the second direction (Y-axis direction), a third portion RL3_7c extending from the second portion RL3_7b along the first direction (X-axis direction), and a fourth portion RL3_7d having the same length as the third portion RL3_7c. In addition, the fourth portion RL3_7d may extend from the third portion RL3_7c in the other direction of the second direction (Y-axis direction), and may be connected to the third contact part CP3 of a third contact electrode CE3_7.

A fourth sensing connection line RL4_7 may include a first portion RL4_7a extending along one direction of the second direction (Y-axis direction) up to a third point X3 positioned on the same line as a fourth contact part CP4 along the first direction (X-axis direction), a second portion RL4_7b extending from the third point X3 along one direction of the second direction (Y-axis direction), a third portion RL4_7c extending from the second portion RL4_7b along the first direction (X-axis direction), and a fourth portion RL4_7d having the same length as the third portion RL4_7c. In addition, the fourth portion RL4_7d may extend from the third portion RL4_7c in the other direction of the second direction (Y-axis direction), and may be connected to the fourth contact part CP4 of a fourth contact electrode CE4_7.

A fifth sensing connection line RL5_7 may include a first portion RL5_7a extending along one direction of the second direction (Y-axis direction) up to a fourth point X4 positioned on the same line as a fifth contact part CP5 along the first direction (X-axis direction), a second portion RL5_7b extending from the fourth point X4 along one direction of the second direction (Y-axis direction), a third portion RL5_7c extending from the second portion RL5_7b along the first direction (X-axis direction), and a fourth portion RL5_7d having the same length as the third portion RL5_7c. In addition, the a fourth portion RL5_7d may extend from the third portion RL5_7c in the other direction of the second direction (Y-axis direction), and may be connected to the fifth contact part CP5 of a fifth contact electrode CE5_7.

The first portion of each of the first sensing connection line RL1_7 disposed in the sensing area TSA_7 and the sensing connection lines RL_7 except for the first sensing connection line RL1_7 may have a length in the second direction (Y-axis direction) decreasing from the first sensing connection line RL1_7 toward the fifth sensing connection line RL5_7.

In addition, the sum of a length of the second portion, a length of the third portion, and a length of the fourth portion of each of the sensing connection lines RL_7 except for the first sensing connection line RL1_7 may increase from the second sensing connection line RL2_7 toward the fifth sensing connection line RL5_7. For example, the sum of lengths of the second portion, the third portion, and the fourth portion of each of the sensing connection lines RL_7 except for the first sensing connection line RL1_7 may constantly increase from the second sensing connection line RL2_7 toward the fifth sensing connection line RL5_7.

For example, a length of the second portion and a length of the fourth portion of each of the sensing connection lines RL_7 except for the first sensing connection line RL1_7 may be the same as each other, and lengths of the third portions of the sensing connection lines RL_7 except for the first sensing connection line RL1_7 may be the same as each other. However, the present invention is not limited thereto, and a length of the second portion and a length of the fourth portion of each of the sensing connection lines RL_7 except for the first sensing connection line RL1_7 may be different from each other. Further, lengths of the third portions of the sensing connection lines RL_7 except for the first sensing connection line RL1_7 may be different from each other, and the sum of lengths of the second portion, the third portion, and the fourth portion of each of the sensing connection lines RL_7 except for the first sensing connection line RL1_7 may constantly increase from the second sensing connection line RL2_7 toward the fifth sensing connection line RL5_7.

In addition, lengths, in the second direction (Y-axis direction) of the second portion and the fourth portion of each of the sensing connection lines RL_7 except for the first sensing connection line RL1_7 may increase from the second sensing connection line RL2_7 toward the fifth sensing connection line RL5_7. For example, the lengths, in the second direction (Y-axis direction) of the second portion and the fourth portion of each of the sensing connection lines RL_7 except for the first sensing connection line RL1_7 may increase by ½ of a length of a first touch electrode RE_7 or a second touch electrode TE_7 in the second direction (Y-axis direction) from the second sensing connection line RL2_7 toward the fifth sensing connection line RL5_7.

Here, the length of the first touch electrode RE_7 or the second touch electrode TE_7 may refer to a length from a vertex positioned on one side, in the second direction (Y-axis direction), of the first touch electrode RE_7 or the second touch electrode TE_7 having a rhombus shape in plan view to a vertex positioned on the other side, in the second direction (Y-axis direction), of the first touch electrode RE_7 or the second touch electrode TE_7.

Figure 31:
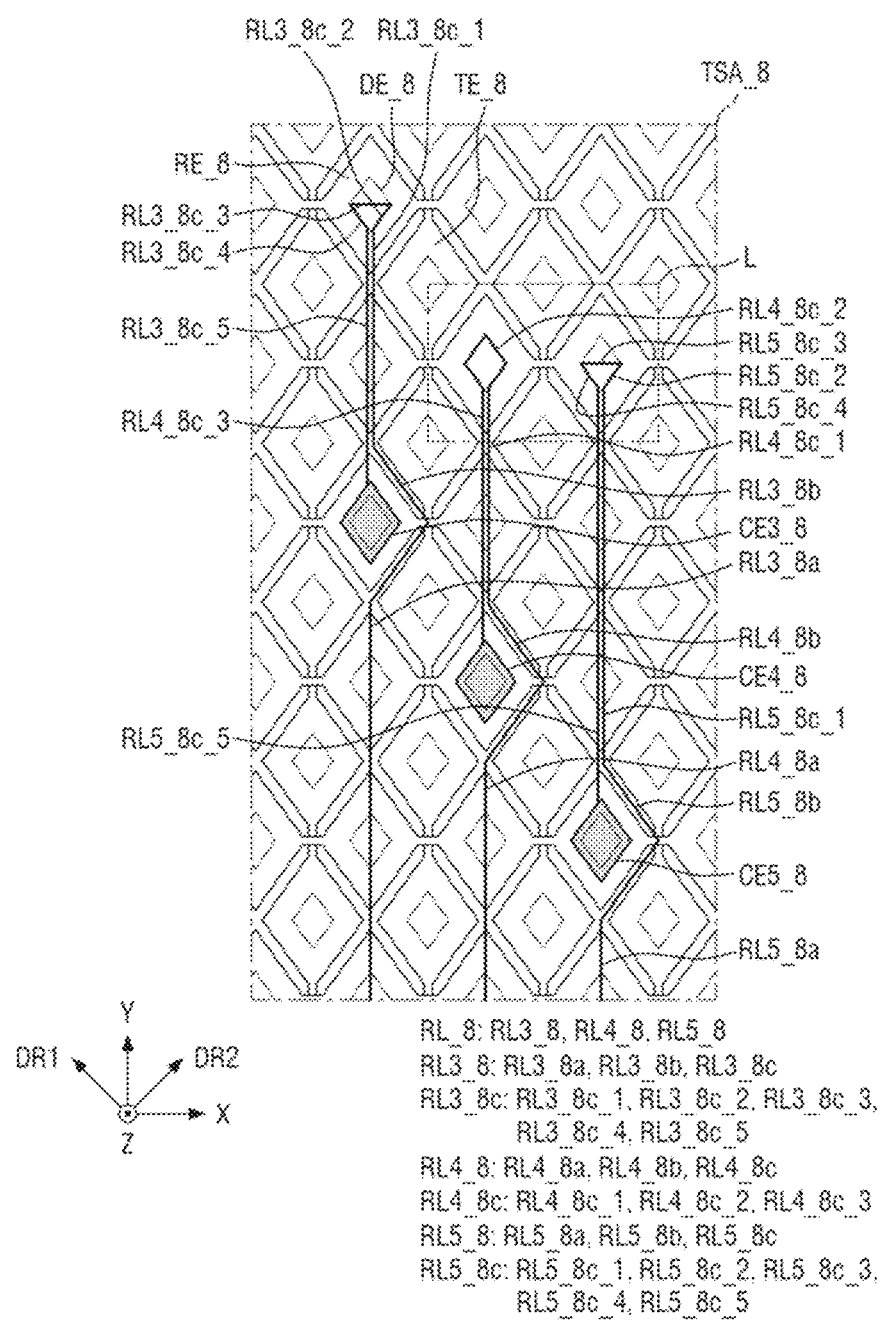
FIG. 31 is a plan view illustrating a sensing area of a display device according to an embodiment of the present invention.
Figure 32:
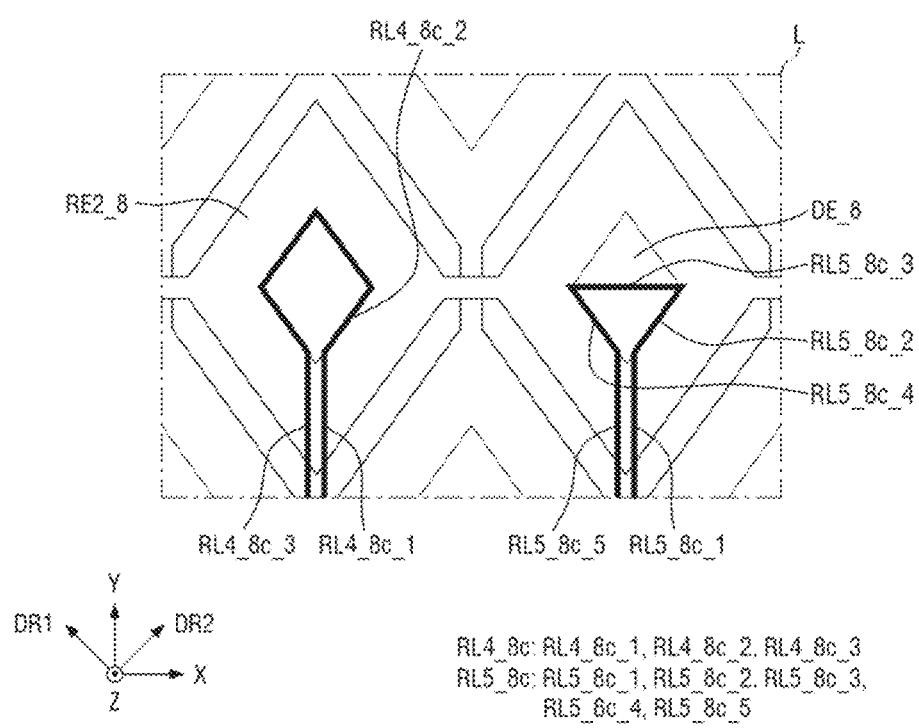
FIG. 32 is an enlarged view of area L of FIG. 31.

FIG. 31 is a plan view illustrating a sensing area of a display device according to an embodiment of the present invention. FIG. 32 is an enlarged view of area L of FIG. 31.

Figure 33:
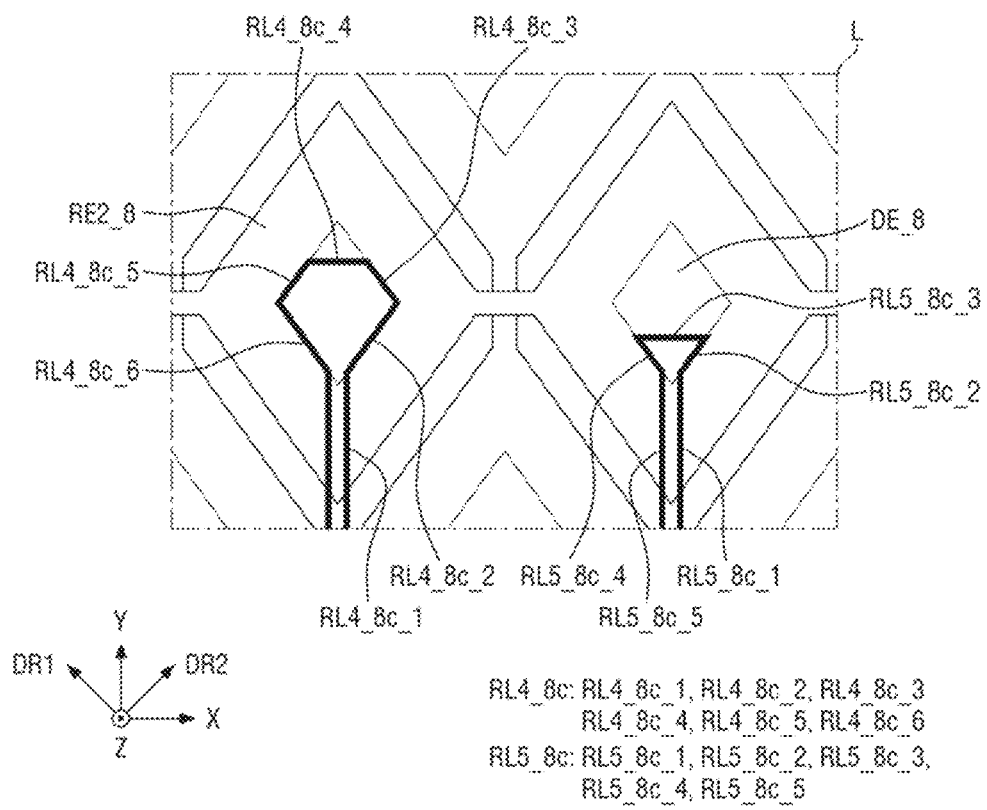
FIG. 33 is an enlarged view of area L of FIG. 31 according to an embodiment of the present invention.

FIG. 33 is an enlarged view of area L of FIG. 31 according to an embodiment of the present invention.

Specifically, FIG. 31 is a plan view illustrating some of sensing connection lines RL_8 disposed in a sensing area TSA_8 according to still another embodiment. For example, FIG. 31 is a plan view illustrating an arrangement form of a third sensing connection line RL3_8, a fourth sensing connection line RL4_8, and a fifth sensing connection line RL5_8 connected respectively to a third contact electrode CE3_8 disposed in a third column of a third row, a fourth contact electrode CE4_8 disposed in a fourth column of a fourth row, and a fifth contact electrode CE5_8 disposed in a fifth column of a fifth row among a plurality of first touch electrodes RE_8.

The present embodiment illustrated in FIGS. 31 to 33 is different from an embodiment illustrated in FIG. 30 in an arrangement form of the sensing connection lines RL_8 disposed in the sensing area TSA_8.

Referring to FIGS. 31 and 32, lengths of the third sensing connection lines RL3_8 to the fifth sensing connection lines RL5_8 may be the same as each other, and arrangement forms of the third sensing connection line RL3_8 to the fifth sensing connection line RL5_8 disposed in the sensing area TSA_8 may be different from each other.

For example, the third sensing connection line RL3_8 may include a first sub-sensing connection line RL3_8a, a second sub-sensing connection line RL3_8b, and a third sub-sensing connection line RL3_8c. The first sub-sensing connection line RL3_8a extends in one direction of the second direction (Y-axis direction). The second sub-sensing connection line RL3_8b extends from the first sub-sensing connection line RL3_8a and has a bent shape like ">". In addition, the second sub-sensing connection line RL3_8b is disposed along sides of a first touch electrode RE_8 connected to the third contact electrode CE3_8. The third sub-sensing connection line RL3_8c extends from the second sub-sensing connection line RL3_8b and includes portions overlapping a dummy electrode DE_8 and portions disposed along sides of the dummy electrode DE_8.

The third sub-sensing connection line RL3_8c of the third sensing connection line RL3_8 may include a first portion RL3_8c_1, a second portion RL3_8c_2, a third portion RL3_8c_3, a fourth portion RL3_8c_4, and a fifth portion RL3_8c_5. The a first portion RL3_8c_1 is connected to an end of the second sub-sensing connection line RL3_8b, and overlaps the first touch electrode RE_8 and the dummy electrode DE_8. In addition, the a first portion RL3_8c_1 extends in one direction of the second direction (Y-axis direction). The second portion RL3_8c_2 is connected to an end of the first portion RL3_8c_1 and is disposed along a side of the dummy electrode DE_8 extending in one direction of the second diagonal direction DR2. The third portion RL3_8c_3 is connected to an end of the second portion RL3_8c_2, and overlaps the dummy electrode DE_8. In addition, the third portion RL3_8c_3 extends in the first direction (X-axis direction). The fourth portion RL3_8c_4 is connected to an end of the third portion RL3_8c_3 and is disposed along a side of the dummy electrode DE_8 extending in the other direction of the first diagonal direction DR1. The fifth portion RL3_8c_5 is connected to an end of the fourth portion RL3_8c_4, and overlaps the first touch electrode RE_8 and the dummy electrode DE_8. The fifth portion RL3_8c_5 extends in the other direction of the second direction (Y-axis direction), and is connected to the third contact electrode CE3_8.

The fourth sensing connection line RL4_8 may include a first sub-sensing connection line RL4_8a extending in one direction of the second direction (Y-axis direction). The fourth sensing connection line RL4_8 may further include a second sub-sensing connection line RL4_8b extending from the first sub-sensing connection line RL4_8a, having a bent shape like ">", and disposed along sides of a first touch electrode RE_8 connected to a fourth contact electrode CE4_8. The fourth sensing connection line RL4_8 may additionally include a third sub-sensing connection line RL4_8c extending from the second sub-sensing connection line RL4_8b and including portions overlapping a dummy electrode DE_8 and portions disposed along sides of the dummy electrode DE_8.

The third sub-sensing connection line RL4_8c of the fourth sensing connection line RL4_8 may include a first portion RL4_8c_1 connected to an end of the second sub-sensing connection line RL4_8b, overlapping the first touch electrode RE_8 and the dummy electrode DE_8, and extending in one direction of the second direction (Y-axis direction). The third sub-sensing connection line RL4_8c further includes a second portion RL4_8c_2 connected to an end of the first portion RL4_8c_1 and disposed to surround all sides of the dummy electrode DE_8. The third sub-sensing connection line RL4_8c additionally includes a third portion RL4_8c_3 connected to an end of the second portion RL4_8c_2, overlapping the first touch electrode RE_8 and the dummy electrode DE_8, extending in the other direction of the second direction (Y-axis direction), and connected to the fourth contact electrode CE4_8.

The fifth sensing connection line RL5_8 may include a first sub-sensing connection line RL5_8a extending in one direction of the second direction (Y-axis direction). The fifth sensing connection line RL5_8 may further include a second sub-sensing connection line RL5_8b extending from the first sub-sensing connection line RL5_8a, having a bent shape like ">", and disposed along sides of a first touch electrode RE_8 connected to the fifth contact electrode CE5_8. The fifth sensing connection line RL5_8 may additionally include a third sub-sensing connection line RL5_8c extending from the second sub-sensing connection line RL5_8b and including portions overlapping a dummy electrode DE_8 and portions disposed along sides of the dummy electrode DE_8.

The third sub-sensing connection line RL5_8c of the fifth sensing connection line RL5_8 may include a first portion RL5_8c_1 connected to an end of the second sub-sensing connection line RL5_8b, overlapping the first touch electrode RE_8 and the dummy electrode DE_8, and extending in one direction of the second direction (Y-axis direction). The third sub-sensing connection line RL5_8c of the fifth sensing connection line RL5_8 may further include a second portion RL5_8c_2 connected to an end of the first portion RL5_8c_1 and disposed along a side of the dummy electrode DE_8 extending in one direction of the second diagonal direction DR2. The third sub-sensing connection line RL5_8c of the fifth sensing connection line RL5_8 may additionally include a third portion RL5_8c_3 connected to an end of the second portion RL5_8c_2, overlapping the dummy electrode DE_8, and extending in the first direction (X-axis direction). In addition, the third sub-sensing connection line RL5_8c of the fifth sensing connection line RL5_8 may include a fourth portion RL5_8c_4 connected to an end of the third portion RL5_8c_3 and disposed along a side of the dummy electrode DE_8 extending in the other direction of the first diagonal direction DR1. The third sub-sensing connection line RL5_8c of the fifth sensing connection line RL5_8 may also include a fifth portion RL5_8c_5 connected to an end of the fourth portion RL5_8c_4, overlapping the first touch electrode RE_8 and the dummy electrode DE_8, extending in the other direction of the second direction (Y-axis direction), and connected to the fifth contact electrode CE5_8.

Here, the dummy electrode DE_8 on which the second portion RL5_8c_2, the third portion RL5_8c_3, and the fourth portion RL5_8c_4 are disposed may be a dummy electrode DE_8 adjacent, in the first direction (X-direction), to the dummy electrode DE_8 surrounded by the second portion RL4_8c_2 of the third sub-connection line RL4_8c of the fourth sensing connection line RL4_8 described above. However, the present invention is not limited thereto.

The fifth sensing connection line RL5_8 is disposed in the sensing area TSA_8 in the same shape and length as the third sensing connection line RL3_8, but a length of the first sub-sensing connection line RL3_8a of the third sensing connection line RL3_8 extending in the second direction (Y-axis direction) may be greater than a length of the first sub-sensing connection line RL5_8a of the fifth sensing connection line RL5_8.

In addition, lengths of the first portion RL3_8c_1 and the fifth portion RL3_8c_5 of the third sub-sensing connection line RL3_8c of the third sensing connection line RL3_8 extending in one direction and the other direction of the second direction (Y-axis direction), respectively, may be smaller than lengths of the first portion RL5_8c_1 and the fifth portion RL5_8c_5 of the third sub-sensing connection line RL5_8c of the fifth sensing connection line RL5_8 extending in one direction and the other direction of the second direction (Y-axis direction), respectively, and accordingly, the length of the third sensing connection line RL3_8 and the length of the fifth sensing connection line RL5_8 may be substantially the same as each other.

FIG. 33 is an enlarged view illustrating an arrangement form of the third sub-connection line RL4_8c of the fourth sensing connection line RL4_8 and the third sub-connection line RL5_8c of the fifth sensing connection line RL5_8 according to an embodiment of the present invention.

Referring to FIG. 33, the present embodiment is different from an embodiment illustrated in FIG. 32 in an arrangement form of the third sub-connection line RL4_8c of the fourth sensing connection line RL4_8 and the third sub-connection line RL5_8c of the fifth sensing connection line RL5_8 disposed along sides of the dummy electrodes DE_8 to adjust lengths of the fourth sensing connection line RL4_8 and the fifth sensing connection line RL5_8.

For example, the third sub-sensing connection line RL4_8c of the fourth sensing connection line RL4_8 may include a first portion RL4_8c_1, a second portion RL4_8c_2, a third portion RL4_8c_3, a third portion RL4_8c_3, a fourth portion RL4_8c_4, a fifth portion RL4_8c_5, a sixth portion RL4_8c_6, and a seventh portion RL4_8c_7. A first portion RL4_8c_1 extends along one direction of the second direction (Y-axis direction). The second portion RL4_8c_2 is connected to the first portion RL4_8c_1 and disposed along a side of the dummy electrode DE_8 extending along one direction of the second diagonal direction DR2. The third portion RL4_8c_3 is connected to an end of the second portion RL4_8c_2 and disposed along a side of the dummy electrode DE_8 extending along one direction of the first diagonal direction DR1. The fourth portion RL4_8c_4 is connected to an end of the third portion RL4_8c_3 and extending in the first direction (X-axis direction). The fifth portion RL4_8c_5 is connected to an end of the fourth portion RL4_8c_4 and extends along a side of the dummy electrode DE_8 extending along the other direction of the second diagonal direction DR2. The sixth portion RL4_8c_6 is connected to an end of the fifth portion RL4_8c_5 and extends along the other direction of the first diagonal direction DR1. the seventh portion RL4_8c_7 is connected to an end of the sixth portion RL4_8c_6 and extends in the other direction of the second direction (Y-axis direction). Accordingly, unlike an embodiment illustrated in FIG. 32, the third sub-sensing connection line RL4_8c may expose portions of side surfaces of the dummy electrode DE_8 and be disposed along the sides of the dummy electrode DE_8.

In addition, the present embodiment is different from an embodiment illustrated in FIG. 32 in which the third portion RL5_8c_3 of the third sub-sensing connection line RL5_8c of the fifth sensing connection line RL5_8 extends in the first direction (X-axis direction) while connecting between the end of the second portion RL5_8c_2 and the end of the fourth portion RL5_8c_4 each positioned at vertices of the dummy electrode DE_8 neighboring to each other in the first direction (X-axis direction) in that the third portion RL5_8c_3 of the third sub-sensing connection line RL5_8c of the fifth sensing connection line RL5_8 extends in the first direction (X-axis direction) while connecting between an end of a second portion RL5_8c_2 positioned on a side of a dummy electrode DE_8 extending in one direction of the second diagonal direction DR2 and an end of a fourth portion RL5_8c_4 positioned on a side of the dummy electrode DE_8 extending in the other direction of the first diagonal direction DR1.

According to some embodiments illustrated in FIGS. 30 to 33, by minimizing a difference in length between the sensing connection lines disposed in the sensing area to compensate for or offset resistances according to the difference in length of the sensing connection lines, it is possible to reduce a difference in touch sensitivity between the touch electrodes disposed in the sensing area.

Figure 34:
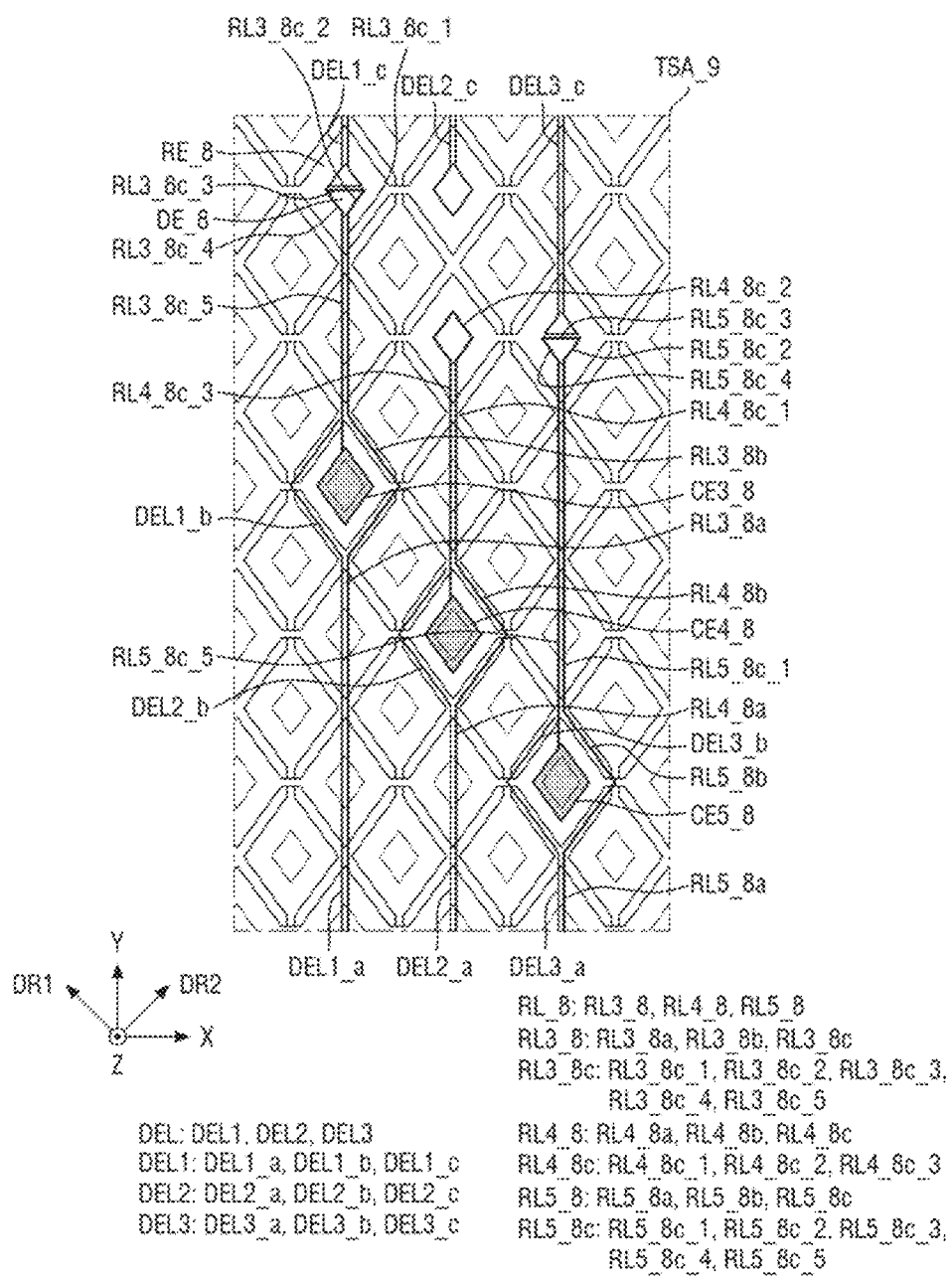
FIG. 34 is a plan view illustrating a sensing area of a display device according to an embodiment of the present invention.

FIG. 34 is a plan view illustrating a sensing area of a display device according to an embodiment of the present invention.

Referring to FIG. 34, the present embodiment is different from an embodiment illustrated in FIG. 32 in that a plurality of dummy lines DEL are included. For example, in the present embodiment, a first dummy line DEL1, a second dummy line DEL2, and a third dummy line DEL3 disposed in a sensing area TSA_9, having the same shapes as the respective portions of the third sensing connection line RL3_8, the fourth sensing connection line RL4_8, and the fifth sensing connection line RL5_8 in plan view, and disposed to be symmetrical to the respective portions of the third sensing connection line RL3_8, the fourth sensing connection line RL4_8, and the fifth sensing connection line RL5_8 in the first direction (X-axis direction) and the second direction (Y-axis direction) may be included.

For example, the first dummy line DEL1 may include a first sub-dummy line DEL1_a extending in the second direction (Y-axis direction) and disposed to be spaced apart from and symmetrical to the first sub-sensing connection line RL3_8a of the third sensing connection line RL3_8 in the first direction (X-axis direction), a second sub-dummy line DEL1_b connected to an end of the first sub-dummy line DEL1_a, having a bent shape like "<", and disposed to be symmetrical to the second sub-sensing connection line RL3_8b of the third sensing connection line RL3_8 in the first direction (X-axis direction) along sides of the first touch electrode RE_8 connected to the third contact electrode CE3_8, and a third sub-dummy line DEL1_c having the same arrangement shape as the third sub-sensing connection line RL3_8c of the third sensing connection line RL3_8 in plan view and disposed to be symmetrical to the third sub-sensing connection line RL3_8c of the third sensing connection line RL3_8 in the second direction (Y-axis direction).

The second dummy line DEL2 may include a first sub-dummy line DEL2_a extending in the second direction (Y-axis direction) and disposed to be spaced apart from and symmetrical to the first sub-sensing connection line RL4_8a of the fourth sensing connection line RL4_8 in the first direction (X-axis direction), a second sub-dummy line DEL2_b connected to an end of the first sub-dummy line DEL2_a, having a bent shape like "<", and disposed to be symmetrical to the second sub-sensing connection line RL4_8b of the fourth sensing connection line RL4_8 in the first direction (X-axis direction) along sides of the first touch electrode RE_8 connected to the fourth contact electrode CE4_8, and a third sub-dummy line DEL2_c having the same shape as the third sub-sensing connection line RL4_8c of the fourth sensing connection line RL4_8 in plan view and disposed to be symmetrical to the third sub-sensing connection line RL4_8c of the fourth sensing connection line RL4_8 in the second direction (Y-axis direction).

The third dummy line DEL3 may include a first sub-dummy line DEL3_a extending in the second direction (Y-axis direction) and disposed to be spaced apart from and symmetrical to the first sub-sensing connection line RL5_8a of the fifth sensing connection line RL5_8 in the first direction (X-axis direction), a second sub-dummy line DEL3_b connected to an end of the first sub-dummy line DEL3_a, having a bent shape like "<", and disposed to be symmetrical to the second sub-sensing connection line RL5_8b of the fifth sensing connection line RL5_8 in the first direction (X-axis direction) along sides of the first touch electrode RE_8 connected to the fifth contact electrode CE5_8, and a third sub-dummy line DEL3_c having the same arrangement form as the third sub-sensing connection line RL5_8c of the fifth sensing connection line RL5_8 and disposed to be symmetrical to the third sub-sensing connection line RL5_8c of the fifth sensing connection line RL5_8 in the second direction (Y-axis direction).

As described above, it is possible to prevent irregular patterns due to the sensing connection lines RL_8 disposed in the sensing area TSA_9 from being viewed, by the dummy lines DEL having the same arrangement form as a plurality of sensing connection lines RL_8 disposed as a single line or a plurality of lines in the sensing area TSA_9 and disposed to be symmetrical to the sensing connection lines RL_8.

While the present invention has been described with reference to the embodiments thereof, it will be understood by those of ordinary skill in the art that various changes in form and detail may be made thereto without departing from the spirit and scope of the present invention.

What is claimed is:

1. A display device comprising:
   a substrate;
   a light emitting element layer disposed on the substrate and including light emitting elements;
   an encapsulation layer disposed on the light emitting element layer; and
   a sensor electrode layer disposed on the encapsulation layer,
   wherein the sensor electrode layer includes:
   a plurality of first touch electrode groups extending along a first direction and arranged along a second direction crossing the first direction;
   a plurality of first touch electrodes, of each of the plurality of first touch electrode groups, arranged along the first direction;
   a plurality of second touch electrode groups extending along the second direction and arranged along the first direction;
   a first contact electrode connected to any one of the plurality of first touch electrodes of any one of the plurality of first touch electrode groups; and
   a second contact electrode connected to any one of the plurality of first touch electrodes of another of the plurality of first touch electrode groups, and
   wherein an area of the first contact electrode is greater than an area of the second contact electrode.

2. The display device of claim 1, wherein the sensor electrode layer further includes:
   a first connection line connected to the first contact electrode; and
   a second connection line connected to the second contact electrode,
   the sensor electrode layer has a sensing area and a peripheral area at least partially surrounding the sensing area,
   wherein each of the sensing area, the first connection line and the second connection line extend along the second direction, and
   wherein a length of the first connection line in the second direction is greater than a length of the second connection line in the second direction.

3. The display device of claim 2, wherein each the first contact electrode and the second contact electrode are disposed at a different layer from the first touch electrode and the second touch electrode, and
   each of the first contact electrode and the second contact electrode are disposed at the same layer as the first connection line and the second connection line.

4. The display device of claim 1, wherein the sensor electrode layer further includes:
   a plurality of dummy electrodes positioned at the same layer as the plurality of first touch electrodes, and
   a plurality of second touch electrodes included in each of the plurality of second touch electrode groups,
   wherein
   each of the plurality of first touch electrodes includes a first opening,
   each of the plurality of second touch electrodes includes a second opening,
   the plurality of dummy electrodes are positioned in the first opening and the second opening, respectively, and
   the plurality of dummy electrodes overlap the first contact electrode and the second contact electrode.

5. The display device of claim 4, wherein the first contact electrode includes a first electrode opening and a first contact electrode part surrounding the first electrode opening,
   the second contact electrode includes a second electrode opening and a second contact electrode part surrounding the second electrode opening, and
   an area of the first contact electrode part is greater than an area of the second contact electrode part.

6. The display device of claim 5, wherein the plurality of dummy electrodes overlap each of the first electrode opening and the second electrode opening, and
   the plurality of dummy electrodes do not overlap each of the first contact electrode part and the second contact electrode part.

7. A display device comprising:
a substrate;
a light emitting element layer disposed on the substrate and including light emitting elements;
an encapsulation layer disposed on the light emitting element layer; and
a sensor electrode layer disposed on the encapsulation layer,
wherein the sensor electrode layer includes:
a plurality of first touch electrodes extending along a first direction and arranged along a second direction crossing the first direction;
a plurality of second touch electrodes extending along the second direction and arranged along the first direction;
first dummy electrodes positioned in the plurality of first touch electrodes and the plurality of second touch electrodes;
a contact electrode connected to any one of the plurality of first touch electrodes;
a second dummy electrode positioned in any one first touch electrodes, and having an area different from that of the first dummy electrodes, wherein the second dummy electrode overlaps the contact electrode, and is surrounded by the first dummy electrodes;
a first touch electrode part surrounding the first dummy electrode in any one first touch electrodes;
a second touch electrode part surrounding the first dummy electrodes in the other first touch electrodes; and
a third touch electrode part surrounding the first dummy electrodes in the second touch electrodes.

8. The display device of claim 7, wherein the sensor electrode layer has a sensing area and a peripheral area at least partially surrounding the sensing area,
wherein the sensor electrode layer further includes:
a connection line connected to the contact electrode in the sensing area and extending in the second direction; and
a dummy pattern disposed on the connection line in the sensing area, and
the dummy pattern is disposed in the second direction and includes an island shape.

9. The display device of claim 7, wherein a width of the first touch electrode part is greater than each of a width of the second touch electrode part and a width of the third touch electrode part.

10. The display device of claim 7, wherein the sensor electrode layer further includes the second dummy electrode positioned in the other first touch electrodes and surrounded by the first dummy electrodes,
wherein a width of the first touch electrode part and a width of the second touch electrode part are the same as each other, and
wherein the width of the first touch electrode part and the width of the second touch electrode part are greater than a width of the third touch electrode part.

11. An electronic device comprising:
a display device, wherein the display device comprises:
a substrate;
a light emitting element layer disposed on the substrate and including light emitting elements;
an encapsulation layer disposed on the light emitting element layer; and
a sensor electrode layer disposed on the encapsulation layer and having a sensing area and a peripheral area surrounding the sensing area,
wherein the sensor electrode layer includes:
a plurality of first touch electrode groups extending along a first direction and arranged along a second direction crossing the first direction;
a plurality of first touch electrodes, of each of the plurality of first touch electrode groups, arranged along the first direction;
a plurality of second touch electrode groups extending along the second direction and arranged along the first direction;
a first contact electrode connected to any one of the plurality of first touch electrodes of any one of the plurality of first touch electrode groups, wherein the first contact electrode and the any one of the plurality of first touch electrodes overlap with each other;
a second contact electrode connected to any one of the plurality of first touch electrodes of another of the plurality of first touch electrode groups;
a first connection line connected to the first contact electrode in the sensing area; and
a second connection line connected to the second contact electrode in the sensing area,
wherein an area of the first contact electrode is the same as an area of the second contact electrode,
wherein the first connection line includes a plurality of first protrusion parts,
wherein the second connection line includes a plurality of second protrusion parts, and
wherein a number of first protrusion parts of the first connection line is greater than a number of second protrusion parts of the second connection line or a number of first protrusion parts and a number of second protrusion parts are the same as each other.

12. The electronic device of claim 11, wherein a width of the first connection line is greater than a width of the second connection line.

13. The electronic device of claim 11,
wherein an area of each of the first protrusion parts is greater than an area of each of the second protrusion parts.

14. The electronic device of claim 11, wherein the first connection line extends in the second direction, and
the second connection line includes:
a plurality of first sub-connection lines extending in the second direction;
a plurality of second sub-connection lines extending from ends of the first sub-connection lines in a third direction that is a diagonal direction crossing the first direction and the second direction; and
a plurality of third sub-connection lines extending from ends of the second sub-connection lines in a fourth direction orthogonal to the third direction.

15. The electronic device of claim 14, wherein the plurality of second sub-connection lines and the plurality of third sub-connection lines cross each other.

16. The electronic device of claim 11, wherein a length of the first connection line and a length of the second connection line are the same as each other.

17. The electronic device of claim 16, wherein the second connection line includes:
a first sub-connection line extending in one direction of the second direction;
a second sub-connection line extending in the second direction and connected to the second contact electrode; and a third sub-connection line connecting the first sub-connection line and the second sub-connection line to each other, wherein a first length at which the first sub-connection line of the second connection line and the second sub-connection line of the second connection line overlap each other in the second direction is the same as a difference between the length of the first connection line and a length of the first sub-connection line of the second connection line.

18. The electronic device of claim 17, wherein the sensor electrode layer further includes:
a third contact electrode connected to any one of the plurality of first touch electrodes of another of the plurality of first touch electrode groups; and
a third connection line connected to the third contact electrode and extending along the second direction,
wherein the third connection line includes:
a first sub-connection line extending in the one direction of the second direction;
a second sub-connection line extending in the second direction and connected to the third contact electrode; and
a third sub-connection line connecting the first sub-connection line and the second sub-connection line to each other,
wherein a difference between the first length and a second length at which the first sub-connection line of the third connection line and the second sub-connection line of the third connection line overlap each other in the second direction is the same as the difference between the length of the first connection line and the length of the first sub-connection line of the second connection line, and
wherein a length of the third connection line is a same as the length of the second connection line.

19. The electronic device of claim 11, wherein the sensor electrode layer further includes a plurality of dummy electrodes positioned at a same layer as the plurality of first touch electrodes,
wherein the first connection line includes:
a first sub-connection line extending in the second direction;
a second sub-connection line connected to an end of the first sub-connection line and bypassing the first touch electrode connected to the first contact electrode; and
a third sub-connection line having one end connected to the second sub-connection line and the other end connected to the first contact electrode,
wherein the third sub-connection line includes:
a first portion connected to an end of the second sub-connection line and extending in the second direction;
a second portion connected to an end of the first portion and extending along a third direction that is a diagonal direction crossing the first direction and the second direction;
a third portion connected to an end of the second portion and extending along the first direction;
a fourth portion connected to an end of the third portion and extending along a fourth direction orthogonal to the third direction; and
a fifth portion extending in the second direction and having one end connected to an end of the fourth portion and the other end connected to the first contact electrode.

20. The electronic device of claim 19, wherein the second connection line includes:
a first sub-connection line extending in the second direction;
a second sub-connection line connected to an end of the first sub-connection line and bypassing the first touch electrode connected to the second contact electrode; and
a third sub-connection line having one end connected to the second sub-connection line and the other end connected to the second contact electrode,
wherein the third sub-connection line includes:
a first portion connected to an end of the second sub-connection line and extending in the second direction;
a second portion connected to an end of the first portion and surrounding a side of any one of the plurality of dummy electrodes disposed in the same column as the first touch electrode connected to the second contact electrode; and
a third portion extending toward the second direction and having one end connected to an end of the second portion and the other end connected to the second contact electrode.

21. The electronic device of claim 20, wherein the plurality of dummy electrodes include:
a first dummy electrode adjacent to the first touch electrode connected to the first contact electrode, in the second direction; and
a second dummy electrode disposed to be spaced apart from the first touch electrode connected to the first contact electrode, in the second direction with the first dummy electrode interposed therebetween,
wherein the first portion of the third sub-connection line overlaps the first dummy electrode,
wherein the second portion, the third portion, and the fourth portion of the third sub-connection line overlap the second dummy electrode, and
wherein the fifth portion of the third sub-connection line overlaps the first dummy electrode, and is disposed to be spaced apart from the first portion of the third sub-connection line in the first direction.

22. The electronic device of claim 20, wherein the sensor electrode layer further includes a first dummy line and a second dummy line disposed in the sensing area,
wherein the first dummy line includes:
a first sub-dummy line disposed to be symmetrical to the first sub-connection line of the first connection line in the first direction;
a second sub-dummy line disposed to be symmetrical to the second sub-connection line of the first connection line in the first direction; and
a third sub-dummy line disposed to be symmetrical to the third sub-connection line of the first connection line in the one direction of the second direction, and
wherein the second dummy line includes:
a first sub-dummy line disposed to be symmetrical to the first sub-connection line of the second connection line in the first direction;
a second sub-dummy line disposed to be symmetrical to the second sub-connection line of the second connection line in the first direction; and
a third sub-dummy line disposed to be symmetrical to the third sub-connection line of the second connection line in the one direction of the second direction.

* * * * *